US 9,424,215 B2

(12) United States Patent
Hickey et al.

(10) Patent No.: US 9,424,215 B2
(45) Date of Patent: Aug. 23, 2016

(54) USB BASED VIRTUALIZED MEDIA SYSTEM

(75) Inventors: John Hickey, Ratoath (IE); Ken Power, Galway (IE); Martin McDonell, Ennis (IE); Paul Hough, Limerick (IE); Vincent Carr, Limerick (IE); Tom Gibbs, Ennis (IE); John Browne, Limerick (IE); Aidan Quinn, Ballina (IE); Iain Campbell, Sixmilebridge (IE); Mark Leyden, Ennis (IE)

(73) Assignee: Avocent Huntsville Corporation, Huntsville, AL (US)

( * ) Notice: Subject to any disclaimer, the term of this patent is extended or adjusted under 35 U.S.C. 154(b) by 0 days.

(21) Appl. No.: 11/889,268

(22) Filed: Aug. 10, 2007

(65) Prior Publication Data
US 2008/0168118 A1 Jul. 10, 2008

Related U.S. Application Data

(63) Continuation of application No. 11/707,863, filed on Feb. 20, 2007, now Pat. No. 7,555,570, and a continuation of application No. 11/707,879, filed on Feb. 20, 2007, now Pat. No. 8,718,147, and a continuation of application No. 11/707,880, filed on Feb. 20, 2007, now Pat. No. 7,689,677.

(60) Provisional application No. 60/836,649, filed on Aug. 10, 2006, provisional application No. 60/836,930, filed on Aug. 11, 2006, provisional application No. 60/848,488, filed on Sep. 29, 2006.

(51) Int. Cl.
*G06F 13/38* (2006.01)
*G06F 15/177* (2006.01)
*G06F 15/16* (2006.01)
*H04L 29/08* (2006.01)
*G06F 15/173* (2006.01)
*H04L 12/12* (2006.01)
*G06F 3/14* (2006.01)
*H04L 12/24* (2006.01)

(52) U.S. Cl.
CPC ............... *G06F 13/385* (2013.01); *G06F 3/14* (2013.01); *G06F 15/16* (2013.01); *G06F 15/173* (2013.01); *G06F 15/177* (2013.01); *H04L 12/12* (2013.01); *H04L 41/0213* (2013.01); *H04L 67/125* (2013.01)

(58) Field of Classification Search
USPC ........................................ 709/217, 223, 230
See application file for complete search history.

(56) References Cited

U.S. PATENT DOCUMENTS 3,710,011 A 1/1973 Altemus et al.
3,935,379 A 1/1976 Thornburg et al.
(Continued)

FOREIGN PATENT DOCUMENTS

EP 0495490 7/1992
EP 0899959 3/1999
(Continued)

OTHER PUBLICATIONS

Wikipedia, Mass Storage, pp. 1-3, Sep. 16, 2014.*
(Continued)

*Primary Examiner* — Backhean Tiv
(74) *Attorney, Agent, or Firm* — Davidson Berquist Jackson & Gowdey LLP

(57) ABSTRACT

In a virtualized desktop system an interfacing module is coupled to peripheral ports of a target device. The interfacing module is connected to a network. A digital user station is connected to the network. The digital user station is configured to be coupled to peripherals. The interfacing module and digital user station use respective hardware engines to communicate via said network.

5 Claims, 27 Drawing Sheets

(56) References Cited

U.S. PATENT DOCUMENTS

| | | |
|---|---|---|
| 4,005,411 A | 1/1977 | Morrin, II |
| 4,134,133 A | 1/1979 | Teramura et al. |
| 4,142,243 A | 2/1979 | Bishop et al. |
| 4,369,464 A | 1/1983 | Temime |
| 4,667,233 A | 5/1987 | Furukawa |
| 4,855,825 A | 8/1989 | Santamaki et al. |
| 4,873,515 A | 10/1989 | Dickson |
| 5,046,119 A | 9/1991 | Hoffert et al. |
| 5,300,949 A | 4/1994 | Rodriguez et al. |
| 5,325,126 A | 6/1994 | Keith |
| 5,339,164 A | 8/1994 | Lim |
| 5,379,071 A | 1/1995 | Parikh et al. |
| 5,465,118 A | 11/1995 | Hancock et al. |
| 5,497,434 A | 3/1996 | Wilson |
| 5,519,874 A | 5/1996 | Yamagishi et al. |
| 5,526,024 A | 6/1996 | Gaglianello et al. |
| 5,572,235 A | 11/1996 | Mical et al. |
| 5,630,036 A | 5/1997 | Sonohara et al. |
| 5,664,029 A | 9/1997 | Callahan et al. |
| 5,757,973 A | 5/1998 | Wilkinson |
| 5,796,864 A | 8/1998 | Callahan |
| 5,805,735 A | 9/1998 | Chen et al. |
| 5,812,169 A | 9/1998 | Tai et al. |
| 5,828,848 A | 10/1998 | MacCormack et al. |
| 5,835,791 A | 11/1998 | Goff et al. |
| 5,864,681 A | 1/1999 | Proctor et al. |
| 5,867,167 A | 2/1999 | Deering |
| 5,898,861 A | 4/1999 | Emerson et al. |
| 5,937,176 A * | 8/1999 | Beasley et al. ............... 710/317 |
| 5,968,132 A | 10/1999 | Tokunaga et al. |
| 6,008,847 A | 12/1999 | Bauchspies |
| 6,038,346 A | 3/2000 | Ratnakar |
| 6,040,864 A | 3/2000 | Etoh |
| 6,088,395 A | 7/2000 | Wang et al. |
| 6,094,453 A | 7/2000 | Gosselin et al. |
| 6,097,368 A | 8/2000 | Zhu et al. |
| 6,124,811 A | 9/2000 | Acharya |
| 6,154,492 A | 11/2000 | Araki et al. |
| 6,195,391 B1 | 2/2001 | Hancock et al. |
| 6,233,226 B1 | 5/2001 | Gringeri |
| 6,243,496 B1 | 6/2001 | Wilkinson |
| 6,304,895 B1 | 10/2001 | Schneider et al. |
| 6,327,307 B1 | 12/2001 | Brailean et al. |
| 6,360,017 B1 | 3/2002 | Chiu et al. |
| 6,373,890 B1 | 4/2002 | Freeman |
| 6,418,479 B1 * | 7/2002 | Houssein ............ G06F 13/4027 709/236 |
| 6,453,120 B1 | 9/2002 | Takahashi |
| 6,470,050 B1 | 10/2002 | Ohtani et al. |
| 6,496,601 B1 | 12/2002 | Migdal et al. |
| 6,512,595 B1 | 1/2003 | Toda |
| 6,539,418 B2 | 3/2003 | Schneider et al. |
| 6,542,631 B1 | 4/2003 | Ishikawa |
| 6,574,364 B1 | 6/2003 | Economidis et al. |
| 6,584,155 B2 | 6/2003 | Takeda et al. |
| 6,640,145 B2 * | 10/2003 | Hoffberg et al. ............... 700/83 |
| 6,661,838 B2 | 12/2003 | Koga et al. |
| 6,664,969 B1 | 12/2003 | Emerson et al. |
| 6,701,380 B2 | 3/2004 | Schneider et al. |
| 6,754,241 B1 | 6/2004 | Krishnamurthy et al. |
| 6,829,301 B1 | 12/2004 | Tinker et al. |
| 6,871,008 B1 | 3/2005 | Pintz et al. |
| 6,898,313 B2 | 5/2005 | Li et al. |
| 6,940,900 B2 | 9/2005 | Takamizawa |
| 6,978,335 B2 | 12/2005 | Lee |
| 7,006,700 B2 | 2/2006 | Gilgen |
| 7,013,255 B1 | 3/2006 | Smith, II |
| 7,031,385 B1 | 4/2006 | Inoue et al. |
| 7,085,319 B2 | 8/2006 | Prakash et al. |
| 7,093,008 B2 | 8/2006 | Agerholm et al. |
| 7,143,432 B1 | 11/2006 | Brooks et al. |
| 7,222,306 B2 | 5/2007 | Kaasila et al. |
| 7,272,180 B2 | 9/2007 | Dambrackas |
| 7,321,623 B2 | 1/2008 | Dambrackas |
| 7,336,839 B2 | 2/2008 | Gilgen |
| 7,373,008 B2 | 5/2008 | Clouthier et al. |
| 7,376,082 B2 * | 5/2008 | Barzilai et al. ............. 370/230.1 |
| 7,457,461 B2 | 11/2008 | Gilgen |
| 7,515,632 B2 | 4/2009 | Dambrackas |
| 7,515,633 B2 | 4/2009 | Dambrackas |
| 7,542,509 B2 | 6/2009 | Dambrackas |
| 7,555,570 B2 * | 6/2009 | Hickey ................ G06F 13/385 709/220 |
| 7,689,677 B2 * | 3/2010 | Hickey ................ G06F 1/266 700/17 |
| 8,718,147 B2 * | 5/2014 | Hickey ................ H03M 7/40 358/1.15 |
| 2001/0043273 A1 | 11/2001 | Herrod et al. |
| 2001/0043600 A1 * | 11/2001 | Chatterjee et al. ........... 370/390 |
| 2003/0048643 A1 | 3/2003 | Ishikawa |
| 2003/0184960 A1 | 10/2003 | Ferguson |
| 2003/0202594 A1 | 10/2003 | Lainema |
| 2004/0062305 A1 | 4/2004 | Dambrackas |
| 2004/0064198 A1 * | 4/2004 | Reynolds ................ G06F 1/266 700/17 |
| 2004/0122931 A1 | 6/2004 | Rowland et al. |
| 2004/0125806 A1 * | 7/2004 | Barzilai ................ H04L 29/06 370/395.21 |
| 2004/0228526 A9 | 11/2004 | Lin et al. |
| 2004/0268012 A1 * | 12/2004 | Ferguson ...................... 710/313 |
| 2005/0025248 A1 | 2/2005 | Johnson et al. |
| 2005/0057777 A1 | 3/2005 | Doron |
| 2005/0069034 A1 | 3/2005 | Dambrackas |
| 2005/0089091 A1 | 4/2005 | Kim et al. |
| 2005/0108582 A1 * | 5/2005 | Fung .................... G06F 1/3203 713/300 |
| 2005/0135480 A1 | 6/2005 | Li et al. |
| 2005/0198245 A1 * | 9/2005 | Burgess ................ G06F 3/14 709/223 |
| 2005/0249207 A1 | 11/2005 | Zodnik |
| 2005/0286790 A1 | 12/2005 | Gilgen |
| 2006/0039404 A1 | 2/2006 | Rao et al. |
| 2006/0092271 A1 | 5/2006 | Banno et al. |
| 2006/0120460 A1 | 6/2006 | Gilgen |
| 2006/0126718 A1 | 6/2006 | Dambrackas et al. |
| 2006/0126720 A1 | 6/2006 | Dambrackas |
| 2006/0126721 A1 | 6/2006 | Dambrackas |
| 2006/0126722 A1 | 6/2006 | Dambrackas |
| 2006/0126723 A1 | 6/2006 | Dambrackas |
| 2006/0161635 A1 | 7/2006 | Lamkin et al. |
| 2006/0203460 A1 * | 9/2006 | Aviv .................... H05K 7/1492 361/788 |
| 2006/0236347 A1 * | 10/2006 | Holovacs ................ H04L 12/28 725/80 |
| 2007/0019743 A1 | 1/2007 | Dambrackas |
| 2007/0036303 A1 * | 2/2007 | Lee et al. .................... 379/93.28 |
| 2007/0165035 A1 | 7/2007 | Duluk et al. |
| 2007/0180407 A1 | 8/2007 | Vahtola |
| 2007/0206497 A1 * | 9/2007 | Plamondon et al. ......... 370/231 |
| 2007/0248159 A1 | 10/2007 | Dambrackas |
| 2007/0253492 A1 | 11/2007 | Shelton et al. |
| 2007/0298779 A1 * | 12/2007 | Wolman ................ H04L 43/12 455/423 |
| 2009/0290647 A1 | 11/2009 | Shelton et al. |

FOREIGN PATENT DOCUMENTS

| | | |
|---|---|---|
| JP | 64-077374 | 9/1987 |
| JP | 63-108879 | 5/1988 |
| JP | 01-162480 | 6/1989 |
| JP | 01-303988 | 12/1989 |
| JP | H03-130767 | 4/1991 |
| JP | 8-33000 | 2/1996 |
| JP | 08-263262 | 10/1996 |
| JP | 09-233467 | 9/1997 |
| JP | 11-308465 | 4/1998 |
| JP | 10-257485 | 9/1998 |
| JP | 11-203457 | 7/1999 |
| JP | 11-313213 | 11/1999 |
| JP | 2001-169287 | 6/2001 |
| JP | 2002-165105 | 6/2002 |
| WO | WO 98/26603 | 6/1998 |
| WO | WO 00/11559 | 3/2000 |
| WO | WO 01/15130 | 3/2001 |

(56) References Cited

FOREIGN PATENT DOCUMENTS

| WO | WO 01/84291 | 11/2001 |
|---|---|---|
| WO | WO 02/062050 A2 | 8/2002 |
| WO | WO 2006/102613 | 9/2006 |

OTHER PUBLICATIONS

Wikipedia, Computer network, pp. 1-21.*
U.S. Appl. No. 11/707,863, filed Feb. 20, 2007, Hickey et al.
U.S. Appl. No. 11/707,879, filed Feb. 20, 2007, Hickey et al.
U.S. Appl. No. 11/707,880, filed Feb. 20, 2007, Hickey et al.
U.S. Appl. No. 60/774,186, filed Feb. 17, 2006, Hickey.
U.S. Appl. No. 60/836,649, filed Aug. 10, 2006, Hickey.
U.S. Appl. No. 60/836,930, filed Aug. 11, 2006, Hickey.
U.S. Appl. No. 60/848,488, filed Sep. 29, 2006, Hickey.
"Avocent Install and Discovery Protocol Specification," Version 1.3, Avocent Corporation Jul. 9, 2003 [30 pages].
"Avocent Secure Management Protocol Specification," Version 1.8, Avocent Corporation Apr. 8, 2005 [64 pages].
McCloghrie, K., "Management Information Base for Network Management of TCP/IP-based internets: MIB II," Network Working Group, Performance Systems International, Mar. 1991 [60 pages].
PCT International Search Report and Written Opinion for PCT/US07/17799, mailed Jul. 14, 2008.
U.S. Appl. No. 10/260,534, filed Oct. 1, 2002, Dambrackas.
U.S. Appl. No. 10/434,339, filed May 9, 2003, Dambrackas.
U.S. Appl. No. 10/629,855, filed Jul. 30, 2003, Johnson et al.
U.S. Appl. No. 10/875,678, filed Jun. 25, 2004, Gilgen.
U.S. Appl. No. 10/875,679, filed Jun. 25, 2004, Gilgen.
U.S. Appl. No. 11/282,688, filed Nov. 21, 2005, Dambrackas et al.
U.S. Appl. No. 11/339,537, filed Jan. 26, 2006, Dambrackas.
U.S. Appl. No. 11/339,541, filed Jan. 26, 2006, Dambrackas.
U.S. Appl. No. 11/339,542, filed Jan. 26, 2006, Dambrackas.
U.S. Appl. No. 11/340,476, filed Jan. 27, 2006, Dambrackas.
U.S. Appl. No. 11/528,569, filed Sep. 28, 2006, Dambrackas et al.
U.S. Appl. No. 11/819,047, filed Jun. 25, 2007, Dambrackas.
U.S. Appl. No. 60/795,577, filed Apr. 28, 2006, Shelton, Gary.
CA Appln. No. 2,627,037—Sep. 9, 2010 CIPO Office Action.
Chinese Appln. No. 03816346.2—Jun. 12, 2009 SIPO Office Action (Translation).
Chrysafis et al., "Line-Based, Reduced Memory, Wavelet Image Compression," Mar. 2000 [retrieved on Aug. 20, 2008], Retrieved from the internet: <http://sipi.usc.edu/~ortega/Students/chrysafi/doc/ChristosChrysafis_line_based_I_P2000.pdf>.
CN Appln. No. 200710167085.2—Jun. 26, 2009 SIPO Office Action.
CN Appln. No. 200710167085.2—Aug. 6, 2010 SIPO Office Action.
EP Appln. No. 03818864.5—Aug. 24, 2009 EPO Office Action.
EP Appln. No. 06758646.1—May 8, 2009 EPO Office Action.
IL Appln. No. 167787—Jul. 21, 2009 Office Action.
IL Appln. No. 171878—Apr. 28, 2009 Translation of Office Action.
International Preliminary Examination Report in PCT Application No. PCT/US2003/030650, mailed Aug. 25, 2006.
International Search Report and Written Opinion mailed Jul. 29, 2008 in PCT Application PCT/US07/17700.
International Search Report and Written Opinion mailed Sep. 14, 2010 in PCT Appln. No. PCT/US2010/001941.
International Search Report and Written Opinion mailed Sep. 4, 2008 in PCT/US07/10376.
JP Appln. No. 2005-510478—Jul. 7, 2009 Notice of Reasons for Rejection [English translation].
JP Appln. No. 2005-510478—Jul. 6, 2010 Decision of Rejection (English translation).
JP Appln. No. 2006-271932—Oct. 6, 2009 Office Action with English summary.
JP Appln. No. 2007-098267—Jul. 27, 2010 JPO Notice of Reasons for Rejection with translation.
Matsui et al., "High-speed Transmission of Sequential Freeze-pictures by Exchanging Changed Areas", IEEE Transactions on Communications, IEEE Service Center, Piscataway, NJ, vol. COM-29, No. 12, Dec. 1, 1981, XP002089584, ISSN: 0090-6778.
Office Action Issued Aug. 5, 2008 in Japanese Patent Application No. 2006271932 (with English translation).
Office Action Issued Jul. 11, 2006, in Japanese Patent Application No. 2006024444.
Office Action issued Jul. 31, 2007 in Japanese Patent Application No. 2006-024444 (with English translation).
Office Action Issued Jul. 4, 2006, in Japanese Patent Application No. 2006-024442.
Office Action Issued Jul. 4, 2006, in Japanese Patent Application No. 2006-024443.
Office Action Issued Mar. 7, 2006, in Japanese Patent Application No. 2004541433 (with English translation).
Office Action Issued Mar. 7, 2006, in Japanese Patent Application No. 2006024442 (with English translation).
Office Action Issued Mar. 7, 2006, in Japanese Patent Application No. 2006024443 (with English translation).
Office Action Issued Mar. 7, 2006, in Japanese Patent Application No. 2006024444 (with English translation).
Official Action issued Dec. 9, 2008 in JP Appln. No. 2005-510478 [with English translation].
PCT International Search Report and Written Opinion mailed Jan. 3, 2006 in PCT/US05/17626, International filing date Jan. 3, 2006.
PCT International Search Report and Written Opinion mailed Oct. 25, 2005 in PCT/US05/19256, International filing date Oct. 25, 2005.
PCT International Search Report for PCT/US03/10488, mailed Jul. 28, 2003.
PCT International Search Report in PCT Application No. PCT/US2003/030650 mailed Apr. 20, 2006.
Search Report and Written Opinion mailed Aug. 26, 2008 in PCT Appln. No. PCT/US2006/021182.
Search Report and Written Opinion mailed Jul. 16, 2008 in PCT Appln. No. PCT/US2007/17699.
Thyagarajan K. S. et al., "Image Sequence Coding Using Interframe VDPCM and Motion Compensation", ICASSP, IEEE International Conference on Acoustics, Speech and Signal Processing—proceedings 1989 Publ. by IEEE, vol. 3, 1989, pp. 1858-1861, XP010082957.
U.S. Appl. No. 11/282,688—Apr. 28, 2010 PTO Office Action.
U.S. Appl. No. 11/339,537—May 13, 2009 PTO Office Action.
U.S. Appl. No. 11/790,994—Jun. 2, 2009 PTO Office Action.
U.S. Appl. No. 11/790,994—Feb. 2, 2010 PTO Office Action.
U.S. Appl. No. 11/819,047—Aug. 26, 2009 PTO Office Action.
U.S. Appl. No. 12/318,074—Sep. 14, 2009 PTO Office Action.
CA Appln. No. 2,524,001—Nov. 30, 2009 CIPO Office Action.
CA Appln. No. 2,524,001—Aug. 30, 2010 CIPO Office Action.
EP Appln. No. 07836654.9—Jan. 8, 2013 EPO Extended European Search Report.
EP Appln. No. 07872608.0—Feb. 6, 2013 EPO Extended European Search Report.
Search Report and Written Opinion mailed Apr. 24, 2008 in International Application No. PCT/US2007/017701.
Search Report and Written Opinion mailed Jul. 14, 2008 in PCT Application No. PCT/US2007/017799.
TW Appln. No. 96127270—Apr. 19, 2013 Patent Office Official Letter.

* cited by examiner

USB BASED VIRTUALIZED MEDIA SYSTEM

RELATED PATENTS AND APPLICATIONS

The present application claims priority to each of: U.S. Provisional Application Ser. No. 60/836,649, filed Aug. 10, 2006, 60/836,930, filed Aug. 11, 2006, and 60/848,488, filed Sep. 29, 2006 the entire contents of each of which are incorporated herein by reference. This is a continuation of:

1. U.S. application Ser. No. 11/707,863, entitled "Device and Method for Configuring a Target Device," filed Feb. 20, 2007; and
2. U.S. application Ser. No. 11/707,879, entitled "Video Compression Algorithm," filed Feb. 20, 2007; and
3. U.S. application Ser. No. 11/707,880, entitled "Power Cycling," filed Feb. 20, 2007.

Aspects of KVM systems, switches and related matter, including their operation, are described in the following U.S. patents and U.S. patent applications, the entire contents of each of which are fully incorporated herein by reference:

U.S. Pat. No. 6,304,895, titled "Method and system for intelligently controlling a remotely located computer," filed Jul. 23, 1999 and issued Oct. 16, 2001;

U.S. Pat. No. 6,567,869, titled "KVM switch including a terminal emulator," filed Feb. 22, 2002 and issued May 20, 2003;

U.S. Pat. No. 6,681,250, titled "Network based KVM switching system," filed May 3, 2000 and issued Jan. 20, 2004;

U.S. Pat. No. 6,112,264, titled "Computer interconnection system having analog overlay for remote control of the interconnection switch," filed Feb. 4, 1999 and issued Aug. 29, 2000;

U.S. Pat. No. 6,378,009 titled "KVM (Keyboard, Video, and Mouse) switch having a network interface circuit coupled to an external network and communicating in accordance with a standard network protocol," filed Aug. 20, 1999 and issued Apr. 23, 2002; and U.S. patent application Ser. No. 09/951,774 titled "Passive video multiplexing method & apparatus," filed Sep. 14, 2001, published Oct. 3, 2002, Publication No. 2002-0143996.

FIELD OF THE INVENTION

This relates to a virtualized media system with high-quality audio-video performance and high-performance virtual USB extension.

INTRODUCTION

This system is a platform for the creation of an Ethernet-based IP KVM system with high-quality audio-video performance and high performance virtual USB extension. This enables a high-quality desktop experience for back-racked client target devices. Target devices are typically PCs and servers. The system architecture provides high-quality digital extension and back-racking. This includes extending KVM devices and USB peripherals, such as mass storage devices, over a network. The system is typically employed over a LAN, but as the underlying connection is IP-based it can be extended to work over a WAN. The system is designed to be implemented with minimal user initial configuration. It is an innovative solution to the weakness of current Thin-Clients (based on RDP or ICA) by ensuring constant video and audio experience no matter what the user is doing on the computer. Further, the system uses hardware engines that enable the full Ethernet pipe to be filled whether 10 Mbps, 100 Mbps or 1 Gbps. This is different from prior art KVM over IP implements in which this layer is performed in a software stack.

Glossary

To the extent these terms are used herein, they have the following meanings:

AAA Authentication, Authorization, and Accounting.

ACL Short for access control list, a set of data that informs a computer's operating system which permissions, or access rights, that each user or group has to a specific system object, such as a directory or file. Each object has a unique security attribute that identifies which users have access to it, and the ACL is a list of each object and user access privileges such as read, write or execute.

Microsoft Active Directory: Microsoft Active Directory® is the directory service included with Microsoft® Windows® 2000.

ADSAP2: Short for Avocent DS Authentication Protocol, this protocol is used for authentication and authorization of appliance connections. This is an SSL based protocol that uses X.509 certificates.

Access Rights: Access Rights is a generic term to refer to
a. Target PCs a user is allowed access
b. The DUS a user is allowed login from
c. The Media Sessions allowed
d. The Media session properties allowed AGC Automatic Gain Control AIDP: Avocent Install and Discovery Protocol, this protocol is used to install out-of box appliances that do not have an IP address assigned and to discover existing appliances that do have an address assigned. This UDP based protocol is not encrypted and only public information is passed over this link. AIDP uses UDP port 3211 by default, but this value may be configurable. AIDP is described in U.S. Patent Application No. 60/836,930.

Active Session Inactivity Timer: Often referred to as the Session Inactivity Timer.

Appliance: See, Managed Appliance.

ASMP: Avocent Secure Management Protocol, this protocol is used to configure settings in Managed Appliances securely. This TCP based protocol uses an SSL encrypted communications link. Typically AMSP uses TCP port 3211, but this value may be configurable. ASMP is described in U.S. Patent Application No. 60/836,930.

ASMP MIB: This is a MIB accessible via the ASMP protocol. Public objects are accessible through standard SNMP. In the Malta context it is DTView that uses the ASMP MIB to manage the Malta appliances. MIB is described in U.S. Patent Application No. 60/836,649.

Audit Log: See, Event Log.

Auditing: The process of tracking activities of users by recording selected types of events in the event log of the DTView Server.

Auth Server: An Auth Server is a network device that provides authentication services.

Authentication: Validation of a user's logon information.

Authorization The process of granting or denying access to a resource. Most computer security systems are based on a two-step process. The first stage is authentication, which ensures that a user is who he or she claims to be. The second stage is authorization, which allows the user access to various resources based on the user's identity.

Common Internet File System (CIFS): Common Internet File System is a protocol that defines a standard for remote file access using millions of computers at a time.

DETwo: Dynamic Host Configuration Protocol. DHCP is an Internet protocol for automating the configuration of computers that use TCP/IP. DHCP can be used to automatically assign IP addresses, to deliver TCP/IP stack configuration parameters such as the subnet mask and default router, and to provide other configuration information such as the addresses for printer, time and news servers.

Digital Certificate: An attachment to an electronic message used for security purposes. The most common use of a digital certificate is to verify that a user sending a message is who he or she claims to be, and to provide the receiver with the means to encode a reply. The most widely used standard for digital certificates is X.509.

DIP: Digital Interface Pod, an adaptor/dongle that connects to a host PC/Server and digitizes the video, keyboard, mouse, audio and virtualizes the USB connection so they can be extended across an IP network.

DNS: Domain Name System (or Service or Server), an Internet service that translates domain names into IP addresses.

DSR: A family of KVM over IP switches commercialized by Avocent Corporation of Huntsville, Ala., that deliver a secure KVM and vMedia session to a software client called DSView.

DSView: A server-based application that provides AAA for access to servers and video viewing via a Web Browser interface. DSView provides management and access to KVM, Serial and other infrastructure appliances.

DTView: Abbreviation for Malta Management Application.

DTView Client: A customer provided computer that has a web browser installed. The web browser accesses the DTView Server software and provides the user interface for the DTView system. This user interface enables users to access and administer the DTView Server, Managed Appliances and Target Devices.

DTView Client Session: Represents a single HTML session between the client web browser and the DTView Server. For each DTView Client Session, the user must log into the DTView Server. Multiple DTView Client Sessions can exist between a given client machine and the DTView Server. This occurs when the user launches another browser window and connects to the same DTView Server.

DTView Console: The main graphical user interface of DTView.

DTView Server: A customer-provided computer that has the DTView Software installed.

DTView System: Components that provide the DTView functionality, which may include the DTView Server, DTView Client, Managed Appliances, Target Devices and External Authentication Server.

DUS: Digital User-Station, a hardware appliance that receives video, keyboard, mouse, audio and virtual USB traffic from an IP network and transforms them to drive attached peripherals such as keyboard, mouse, monitor, speakers.

Event Log: The location in the DTView Software where events are stored.

External Authentication Server: An optional component(s) outside of the DTView system that enables the customer to select an authentication method and have the DTView Server broker authentication requests (LDAP etc).

Hot key: A keystroke that may be assigned and then used to cause a specific action or set of actions to occur within a user interface.

HTTPS: See, Secure Hypertext Transport Protocol

ICMP: Internet Control Message Protocol, an extension to the Internet Protocol (IP) defined by RFC 792. ICMP supports packets containing error, control, and informational messages. The PING command, for example, uses ICMP to test an Internet connection.

IE: Microsoft Internet Explorer

LAN: Local Area Network

LDAP: Lightweight Directory Access Protocol, a set of protocols for accessing information directories. LDAP is based on the standards contained within the X.500 standard, but is significantly simpler. And unlike X.500, LDAP supports TCP/IP, which is necessary for any type of Internet access. Because it's a simpler version of X.500, LDAP is sometimes called X.500-lite.

LongerView: A 1000 ft analogue extender based on AMX technology.

Malta: A name that identifies a specific family of products. The term Malta is also along with an extension the internal name for the projects. i.e. Malta-PR (Malta Premium), Malta-BC (Malta Basic).

Malta Management Application: The DTView application Managed Appliance.

Managed Appliances: DIP and DUS Appliances.

MIB: Management Information Base, a database of objects that can be monitored by a Network Management System (NMS). SNMP uses standardized MIB formats that allow any SNMP tools to monitor any device defined by a MIB.

OAM: Operations Administration and Maintenance.

OSCAR: Short for On-Screen Configuration and Activity Reporting, a graphical tool that is built into Avocent DUS appliances that allows a user have a graphical interface to the appliance.

Secure Hypertext Transport Protocol: An extension to the HTTP protocol to support sending data securely over the World Wide Web.

Secure Sockets Layer (SSL): A commonly-used protocol for managing the security of a message transmission on the Internet. SSL has recently been succeeded by Transport Layer Security (TLS), which is based on SSL. SSL enables communications privacy over networks by using a combination of public key cryptography and bulk data encryption SNMP Short for Simple Network Management Protocol, a set of protocols for managing complex networks. The first versions of SNMP were developed in the early 80s. SNMP works by sending messages to different parts of a network. SNMP-compliant devices, called agents, store data about themselves in Management Information Bases (MIBs) and return this data to the SNMP requesters.

Spoke DTView Server: An DTView Server that is responsible for initiating Database Replication with the Hub DTView Server. A Spoke Server sends its database changes to the Hub Server and receives database changes from the Hub Server. Note that a Hub Server and a Spoke Server both offer the same Software functionality to a user. The distinction of "Hub" or "Spoke" only has to do with the Database Replication role the server plays and not with the DTView Software functionality the server offers to the user.

SSH: Secure Shell.

Target Device Target device (TD): See, Target PC.

Target PC: The computer to which the Avocent DIP is attached. This can be a PC, Server, Sun Machine, MAC machine, etc.

TCPIP: Transmission Control Protocol, and pronounced as separate letters. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent.

TLS: Transport Layer Security. A security protocol from the IETF that is based on the Secure Sockets Layer (SSL) 3.0 protocol developed by Netscape. TLS uses digital certificates to authenticate the user as well as authenticate the network (in a wireless network, the user could be logging on to a rogue access point). The TLS client uses the public key from the server to encrypt a random number and send it back to the server. The random number, combined with additional random numbers previously sent to each other, is used to generate a secret session key to encrypt the subsequent message exchange TTM Time to market.

User Datagram Protocol (UDP): Abbreviated UDP, a connectionless protocol that, like TCP, runs on top of IP networks. Unlike TCP/IP, UDP/IP provides very few error recovery services, offering instead a direct way to send and receive datagrams over an IP network. It's used primarily for broadcasting messages over a network.

vMedia: Virtual Media provides a mechanism to remotely mount and use a USB mass storage device such as a Flash Drive or CD drive. The drive is attached to local console while it is used on the remote device.

vUSB: Virtual USB provides a mechanism to remotely mount and use a USB device such as a mass storage device, a USB keyboard, a USB DVD drive, a thumb-print scanner or a USB printer. The USB device is attached to local console while it is used on the remote device.

WAN: Wide Area Network. Typically refers to a network that is distributed at multiple sites and connected by a relatively slow link between those sites. Frequently, the WAN is implemented via a VPN on the Internet.

Web Server: A computer equipped with server software to respond to HTTP requests, such as requests from a Web browser. A Web Server uses the HTTP protocol to communicate with clients on a TCP/IP network.

WMI: Windows Management Instrumentation. WMI is a new management technology allowing scripts to monitor and control managed resources throughout the network. Resources include hard drives, file systems, operating system settings, processes, services, shares, registry settings, networking components, event logs, users, and groups. WMI is built into clients with Windows 2000 or above, and can be installed on any other 32-bit Windows client.

WOL: Wake on LAN—The ability for your computer to wake from a "standby" or "sleep" mode by a request from the LAN. Another name for Magic Packet technology.

X.509: The most widely used standard for defining digital certificates. X.509 is actually an ITU Recommendation, which means that has not yet been officially defined or approved. As a result, companies have implemented the standard in different ways. For example, both Netscape and Microsoft use X.509 certificates to implement SSL in their Web servers and browsers. But an X.509 Certificate generated by Netscape may not be readable by Microsoft products, and vice versa.

B. High Level Overview of the System Functions

This system is a platform for the creation of an Ethernet-based IP KVM system with high-quality audio-video performance with high performance USB extension.

There are three main components in the system—(1) a digitalizing interface pod (DIP) that connects to the target PC/Server (2) a digital user-station (DUS) that connects to the keyboard, mouse, monitor, audio device and USB peripherals (3) a management application (DTView) that provides authentication, access control and accounting services for a network of DIPs and DUSs. FIG. 1b shows an example of a typical configuration.

The system also interfaces to a number of external systems, including (1) DNS server (the DNS server is used for a number of functions including Target PC host name and Appliance host name to address translation), (2) DHCP Server (in Desktop mode the DUS and DIP can obtain their IP address data from a DHCP server, (3) Target PCs (for example, DTView communicates with the Target PC over the IP network for Remote Wake up functionality), and (4) External Authentication services (for example, DTView will interface to Microsoft Active Directory using LDAP for authentication).

The system can operate in two alternative modes: extender mode and desktop/matrix mode. In the extender mode, a DIP connects point-to-point with a DUS. In desktop/matrix mode, a DUS can connect to a specific DIP out of many potential DIPs on a network. The extender and desktop/matrix modes are discussed in greater detail below.

a. The DIP

The DIP compresses/encrypts the video from the PC/server while the DUS does the reverse. The DIP is an adaptor/dongle connected to a host (PC/Server). It transports the I/O streams between the PC and the Network. It presents the following interfaces to the PC:

a video connection (VGA, DVI)
audio in/out connections
a USB connection for USB Keyboard, Mouse, Mass Storage and other USB peripherals
Serial connections can also be provided.

The DIP can be powered from its USB connection(s) to the server.

The DIP is in a small form-factor unit in a plastic housing with connections to PC services—Video, Audio and USB for Keyboard, Mouse and VMedia. After power-up the DIP shall accept session establishment attempts from a DUS. If an X.509 cert has been written to the DIP (by DTView when setting up a session), subsequent session establishment attempts are only accepted from the identified DUS, until the Cert is cleared or overwritten. If a session establishment attempt is received and the DUS has the factory default session cert, it will setup the session as instructed in the session cert it receives from the DUS (accommodates extender mode). By default, the DIP assumes it's in an IP network and defaults to using DHCP to find IP address data, unless configured via its ASMP MIB interface or through the AIDP discovery protocol to operate using static IP addressing. When a DUS-DIP session is active, the DIP shall monitor the presence of the DUS. When loss of DUS is detected (network fault or DUS reset/power cycled) the DIP shall close its open SSL associations with the DUS. This shall enable a DUS to reestablish sessions if required.

The DIP responds to session establishment attempts from the DUS independent of the session cert "Session Retry Timeout" and "Session Retry Count" parameters. The session cert is maintained persistently on the DIP, so that it survives Target PC resets and the session can be reestablished quickly on powered. The DIP shall provide via its ASMP MIB interface the current session status. The status shall include:

Duration of the session
The IP address of the associated DUS
Indication of the media sessions active (Video, Audio, Mass Storage, Keyboard/Mouse The DIP sends an SNMP Trap after each successful or unsuccessful session establishment.

Remote administration of the DIP (through DTView) shall be facilitated through the ASMP MIB presented by the DIP.

The following DUS initiated OAM functions shall be facilitated by the DIP:

The DIP shall provide via the ASMP MIB interface the ability to view the hardware, FPGA, Boot and application image version information currently running on the DIP.

When a session exists on the DIP, the DIP shall provide via its ASMP MIB interface the MAC address, IP address, IP subnet, Default Gateway and EID of the DIP.

When a session exists, the media session properties of the sessions on the DIP can be modified by the DUS via an ASVP control channel between the DUS and DIP.

Remote administrator level operations and maintenance functions are facilitated via the AIDP discovery and IP address configuration protocol and the ASMP MIB.

The DIP provides via the MIB and the internal serial interface the ability to set the IP address mode to Static or DHCP. When set to static IP addressing, the administrator programs the IP Address, subnet-mask and default gateway to be used by the DUS. The DIP shall contain a factor default static IP address of 0.0.0.0, Subnet mask of 0.0.0.0 and default gateway of 0.0.0.0.

The DIP is operating mode agnostic. It does not differentiate between Extender and desktop modes.

The DIP provides via its ASMP MIB and the DUS internal serial interface the ability to reboot the DIP.

The DIP provides via its internal debug serial interface a command to enable the transfer of an appliance image to the DIP. The image shall be transferred using the xmodem protocol. The DIP provides via its internal serial interface a command to initiate the upgrade of the DIP. The DIP upgrades itself, only if the appliance release version is different to that already running on the appliance. The upgrade of the appliance shall not require user intervention.

The DIP maintains performance statistics that can be read from the appliance via the internal debug serial port. The specific statistics reported will be defined during product development.

The DIP reports events via SNMPV1 Traps to the configured destination trapaddresses. In Desktop mode one of the destinations is always DTView where comprehensive audit trails and event logs shall be maintained.

The DIP will have two USB connections to connect to the target PC. One port is used to support keyboard, mouse and Mass Storage extended devices. The second is used only to provide power to the DIP. Preferably, the DIP is ultra-sonic welded plastic housing. The DIP has the following physical connectors:

3.5 mm Line-in, Line-out cables to connect to target PC;

a male DVI-I video connector attached on a cable to main body of DIP for to receive DVI-I video.

Two male USB connectors on separate cables to attach to target PC.

A RJ45 connector for connection to an Ethernet network.

A 3.5 mm stereo jack shall be used for the connection to the Line-Out port of the target device.

A 3.5 mm stereo jack shall be used for the connection to the Microphone-In port of the target device.

The DIP convert analog audio signals to an Ethernet network compatible digital format. An example sampling rate for the incoming analog audio signals will be 44.1 KHz (CD quality). The audio signal will be stereo and transmitted over the network on two channels each with a resolution of 16 bits. The DIP also converts network compatible digital audio information to analog audio signals, with sufficient internal buffer to cover 350 ms of jitter across the network. The sampling rate for the audio signals received via the network will be 44.1 kHz over a single channel at a resolution of 16 bits.

The DIP provides support for USB 2.0 compliant devices. It provides support for Full and High speed USB interfaces.

On each USB Port the DIP shall enumerate to the Target PC as device with the following information:

idVendor ID=Avocent 0x0624 (1572*d*).

idProduct=0x0300 (Malta-PR DIP)

iManufacturer=Avocent iProduct=DIP iSerialNumber=Mac Address of DIP expressed as an ASCII string.

This enumeration shall result in the default keyboard and mouse drivers being loaded by the Target PC. The full capabilities of the default keyboard and mouse drivers when working with one keyboard/mouse endpoint shall be utilized by the system.

Prior to connections being established the DIP shall enumerate on one of it's two USB ports to the Target PC as a composite device with the following end points Keyboard.

Mouse.

When a connection is established by the DUS with the DIP, the USB port is re-enumerated with the report descriptor of the keyboard and mouse peripheral attached to the DUS. This port shall be known as USB port A.

Prior to connections being established the DIP shall enumerate on one of the two USB ports to the Target PC as a single device with the following end points Keyboard. Keyboard and mouse will not be active on this port. It is enumerated only to enable the Target PC to provide power.

When a connection is established by the DUS with the DIP, the USB port is reenumerated as a mass storage device with two endpoints. In this way hot-plug of mass storage devices can be accommodated without interference with keyboard and mouse. Hot plugging the keyboard or mouse does not interfere with vMedia transfers. This port shall be known as USB port B.

During the establishment of a keyboard and mouse connection, the DIP ensures that the Target PC has been provided with the report descriptor of the actual keyboard or mouse attached to the DUS (i.e. the Target PC re-enumerates the USB port). When a PS/2 keyboard or mouse is used on the DUS, the Malta-PR defined USB format keyboard and Mouse report descriptor is used. This shall ensure that the Target PC can interpret the native USB keyboard and mouse reports provided by the peripheral, and that the DIP can pass USB format keyboard and mouse streams without translation.

b. The DUS

The DUS is essentially the inverse of a DIP. It transports I/O streams between the network and the attached peripherals. It presents the following peripheral interfaces:

a video connector (VGA.DVI)

audio in/out connectors

PS/2 keyboard and mouse connectors

USB connectors for USB peripherals (Keyboard, Mouse, Mass Storage, and other USB peripherals)

RS232 Serial interface

In a point to point Extender configuration (described below) all administration and configuration shall be achieved through the DUS OSD or serial interface. The OSD on the DUS shall enable user and administrator level configuration. The serial interface on the DUS shall provide commissioning, general administration and debug capabilities.

General USB peripherals are supported on the DUS and extended to the "connected" DIP and Target PC.

The DUS can have a speaker internally with support for external stereo speakers.

The DUS can be designed to connect on back of LCD monitor stand.

The DUS is the console users use to access their computing resource. It is in a small form-factor box with a basic on-screen display (OSD). The DUS provides user services such as KVM, audio and Mass Storage. In Desktop (login and auto login) mode, all connection associated configuration information will be maintained on DTView. The connection information on DTView is associated with a User and Target PC. The DUS is a slave responding to DTView OAM commands, providing unsolicited SNMP Traps to notify DTView of significant events. In Extender mode connection related information is stored on the DUS. The DUS is the OAM master sending OAM commands to the DIP as required.

In Desktop mode the DUS initiates a session with a DIP after the user login completes successfully and DTView has written an X.509 cert describing the required media sessions and target DIP to the DUS. In Extender mode, the DUS initiates a session with the DIP using a persistently stored extender mode session cert, after it has discovered the DIP, handset its IP data. The DUS after connection establishment (irrespective of mode) reads the DIP version information and will indicate to the User via the OSD if the firmware versions are potentially incompatible. Attempts to establish a connection is not prohibited in anyway by perceived incompatible versions. The DUS shall consider a DIP's firmware incompatible if the major version number is not the same as that of the firmware running on the DUS. Firmware shall have a revision number that contains Major and Minor change indicators. AR242 The DUS session cert shall contain at least the following session related properties:

DIP IP address
Cert Timeout
Session Retry Timeout
Session Retry Count
Video Session Properties
   Enable/Disable
   Color Depth
   Maximum Frames per second
Audio Session Properties
   Enable/Disable
   Play-out buffer size
Virtual Media Session Properties
   Enable/Disable
   Ratio of network bandwidth with respect to Video In Extender mode the DUS automatically uses its static IP address. If none has been configured it uses the factory default IP address. The DUS after discovery of its partner DIP will configure the DIP with the Static IP address data it contains for the DIP. If none has been configured, the DUS will use its factory default DIP IP address data. The DUS will continually monitor for other DUSs or DIPs. If other DUS or DIP are detected all established connections are immediately removed and the DUS enters Desktop mode.

When Desktop mode is selected the DUS uses the configured DHCP or Static IP addressing mechanism to obtain its IP address.

When a DUS-DIP session is active, the DUS shall monitor the presence of the DIP. When loss of DIP is detected (network fault or DIP reset/power cycled) the DUS shall close its open SSL associations with the DIP, so that it can be capable of reestablishing the connection if required.

The DUS behavior on establishment or re-establishment of a connection is determined by the "Session Retry Timeout" and "Session Retry Count" settings. These values are configurable per User on DTView, and via the serial interface. The DUS will continue establishment attempts with a DIP for the configured "Session Retry Timeout" period. If unsuccessful the User is informed of the failedsession establishment attempt. "Session Retry Count" is used to determine how many times the DUS will attempt to establish/re-establish a connection with a DIP. This is useful to configure expected connection persistence.

After an unsuccessful connection attempt in Desktop Login mode, the DUS will:
   If the "Session Retry Count" is zero, display the login screen and make no further attempts to establish the session.
   If the "Session Retry Count" is non zero, wait for the "Session Retry Timeout" period before attempting to establish the connection again. The DUS will continually cycle through session establishment attempts in a duty cycle determined by the "Session Retry Timeout" value, until the number of retry period has reached the configured "Session Retry Count" value.
   If the "Session Retry Count" is 99 (meaning that the connection is retried forever), the DUS will try until the user Logout. The DUS keeps the User informed of its connection attempt activities via messages displayed on the screen to the user.

After unsuccessful connection attempt in Desktop-AutoLogin or Extender mode, the DUS will:
   Ignore the "Session Retry Count" parameter.
   Wait for the "Session Retry Timeout" period before attempting to establish the connection again. The DUS will continually cycle through session establishment attempts in a duty cycle determined by the "Session Retry Timeout" value.

After the initial successful session establishment (successful user login in Desktop-Login Mode, after power-up in Desktop-AutoLogin and Extender Mode) the DUS monitors the DUS-DIP association using AVSP keep alive packets. If the DIP becomes unresponsive, the DUS shall immediately initiate a session reestablishment attempt for the configured "Session Retry Timeout" period, after which the defined unsuccessful session establishment behavior is followed.

The DUS (irrespective of operating mode), maintains a count of the number of session retry periods it has invoked since it was last power cycled. This counter shall be available via the ASMP MIB interface. The Session Retry Timeout can have values from 10 seconds to 60 seconds, with a default of 30 seconds. The Session Retry Count can have values from 0 to 99, with a default of 99. 0 means no retry, 99 means retry forever. Setting the Session Retry to 99 has the effect of making the connection persistent.

The DUS authenticate that it is connecting to the correct DIP by exchanging the DUS and DIP session certs during the creation of secure SSL sessions between the DUS and DIP for control and media traffic. The Cert Timeout parameter specifies the time the DUS has to establish the initial connection before the Cert expires. On expiry of the cert the connection attempt is deemed to have failed. The Cert timeout shall have a range between 10 and 60 seconds, with a default of 10 seconds.

The DUS provides via its ASMP MIB interface the current session status. The status shall include:
  Duration of the session
  The IP address of the associated DIP
  Indication of the media sessions active (Video, Audio, Mass Storage, Keyboard/Mouse The DUS sends an SNMP Trap after each successful or unsuccessful session establishment.

The DUS provides a local password protected administrator interface via its serial port for local administration of the DUS. The DUS provides via the MIB and the serial interface the ability to set the IP address mode to Static or DHCP. When set to static IP addressing, the administrator shall be able program the IP Address, subnet-mask and default gateway to be used by the DUS. The DUS contains a default static IP address, default Subnet mask and default gateway. The DUS shall provide via the ASMP MIB and the serial interface the ability to set the operating mode of the DUS to:
  Extender, or
  Desktop When configured for Extender mode, the DUS shall automatically enable Static IP addressing.

For use when in Extender mode, the DUS shall contain an IP address for its partner DIP (will program DIP on discovery using the Avocent AIDP protocol). The address shall be modifiable via the serial interface. The DUS receives a factory default IP Address of the DIP.

Because the extender mode auto discovery protocol currently operates within a single broadcast domain (i.e. single subnet) the DIP Subnet Mask is set to that used by the DUS and the default gateway is the same default described above.

The DUS provides via the ASMP MIB interface the ability for the Desktop operating mode to be configured as "Login" or "AutoLogin" Mode. DTView automatically creates a user account for the "Autologin User" when setting the mode. When configured for Desktop-Login Mode the DUS user shall be prompted to enter username and password, which are then sent to DTView for authentication and subsequent initiation of a connection to the Target PC. When configured in Desktop-AutoLogin Mode the DUS will not prompt the user for a password and username, instead it will automatically use a persistently stored username and password in the login request to DTView. The DUS shall provide via its ASMP MIB and serial interface the ability to reboot the DUS. The DUS serial interface can also be used to reboot the DIP. AR045 The DUS shall provide via its ASMP MIB and Serial interface the ability to set the IP address of DTView. This is required in Desktop mode to inform the DUS of DTView to which it will initiate a login request to.

After a session has been established, the media session properties of the established connection can be modified via the serial interface to optimise the experience at the DUS. The modified session properties shall remain for the lifetime of the DUS-DIP Session.

In Desktop mode session properties are made persistent by changing the configuration on DTView. When operating in Extender mode, an option on the serial interface shall enable persistent storage of the parameters.

In Desktop Mode it is not possible via the serial interface to modify the media session properties to values greater than those used in the session cert that established the session. If a media session is disabled in the initial connection it cannot be enabled. This shall enable the administrator to manage the maximum network bandwidth utilized by specific DUS-DIP sessions. In Extender Mode media session property modification does not have these restrictions.

The DUS shall provide via its serial interface a command to enable the transfer of an appliance image to the DUS. The image shall be transferred using the xmodem protocol. The DUS shall provide via its serial interface a command to initiate the upgrade of the DUS or DIP with the downloaded image file. Upgrading of a DIP by a DUS is required in Extender mode.

The DUS can maintain performance statistics that can be read via the serial port administration menus or using the hidden debug CLI option. In Desktop mode the DUS reports events via SNMPV1 Traps to DTView where comprehensive audit trails and event logs shall be maintained.

The DUS has the following connectors:
  Two PS/2 (MiniDin6) connectors to allow for PS/2 keyboard and mouse connections to the rear.
  A DVI-I female connector for video at the rear. DVI and RGB video will be delivered to the connector.
  Four USB type A connectors on the rear.
  A 2.5 mm power jack on the rear.
  A DB9 connector for serial connectivity on the rear.
  A RJ45 for connection to Ethernet network.
  Line-Out shall be a 3.5 mm stereo socket.
  Microphone shall be a 3.5 mm stereo socket.

The DUS unit will be mountable to the back of a flat panel monitor.

Audio transmission shall be sent over the Ethernet network. The assumption is the jitter between audio/video streams is <50 ms on the LAN. In Desktop mode the audio feature shall be enabled/disabled on the user's configuration in DTView. The DUS is instructed by DTView via the Session Cert if it is to establish an Audio session. In Desktop mode audio is on by default. Audio is off when no connection exists with DIP or a connection exists but the Audio session is disabled. When audio is off, it remains so irrespective of whether a device plugged in or not—the Codec is turned off.

The DUS converts analog audio signals to an Ethernet network compatible digital format. The sampling rate for the incoming analog audio signals is 44.1 KHz (CD quality). The audio signal will be carried as a single channel across the network with a resolution of 16 bits.

The DUS converts network compatible digital audio information to analog audio signals. It shall have a play-out buffer capable of handling up to 350 ms of network jitter. The sampling rate for the analog audio signals received via network will be 44.1 kHz, with a resolution of 16 bits per channel. The audio out signal is in stereo.

The DUS serial port shall always be enabled and provide a serial administration interface.

The DUS USB provides support for low, Full and High speed USB devices. The DUS provides support for USB keyboard and mouse. The DUS shall ensure that USB keyboard and Mouse streams can utilize the full set of features supported of the Target PC default keyboard and mouse drivers when utilizing a single USB Endpoint. The DUS achieves this by informing the DIP of the USB report descriptors on connection establishment. The DIP subsequently informs the Target PC. This enables the Target PC to interpret the native peripheral USB keyboard and mouse reports, enabling the DUS to pass keyboard and mouse reports directly to the DIP without translation.

The DUS also provide support for PS/2 Keyboard and Mouse. The DUS translates PS/2 keyboard and mouse streams to a common USB format optimized to enable full support of Target PC default keyboard and mouse drivers. The DUS informs the DIP of the common USB report descriptor format on connection establishment. The DIP subsequently informs the Target PC. This enables the Target PC to interpret the USB keyboard and mouse reports generated by the DUS.

The DUS supports hot plugging of USB keyboards and Mice, as well as USB Mass storage peripherals.

c. Software

The Management Application provides a central administration function for a Malta appliances on an IP network. It also provides authentication and access control for users establishing DUS-DIP connections across the IP network. The Management Application shall provide a web interface that enables administrator access via a standard web browser.

User authentication can be achieved via a locally defined database of users/passwords or via 3rd party authentication systems using standard protocols such as LDAP.

Access control is configurable by the administrator on a per user basis.

This section contains the detailed requirements for the DTView Software.

The DTView Software is capable of addressing appliances using fixed IP addresses or using a Domain Name Service (DNS) domain name. For DNS to operate, the server on which DTView is hosted must be configured to access a DNS server that can resolve the appliance domain name (e.g. myappliance@domain.com) into an IP address (e.g. 192.168.0.1).

The DTView Software installation program verifies that the target system meets the minimum Operating System requirements for running the DTView Software. This check occurs before any prompts for information (License Key, End User License Agreement, etc.) are displayed to the user. The DTView Software installation program also verifies that the TCP ports required by the Web Application Server are available. If the ports are not available, the installation program prompts the user for the TCP ports to use. TCP Ports used by the Web Application Server will default to IANA assigned port numbers. If another web server is running it is likely that the standard Web Application Server port for HTTPS (443) will be in use.

Once the DTView Software installation program verifies that it has successfully installed and started, a Browser Session is launched from the installation program to complete the DTView Software configuration. For reference purposes, this portion of the installation shall be referred to as the "DTView Software Setup interface."

The DTView Client does not require an installation program since it is browser based.

The DTView supports the ability to set the network settings on a Malta-PR appliance.

The DTView Client authenticates with the DTView Software. Specifically, DTView Clients that do not successfully authenticate with the DTView Server shall be denied access to DTView. Authentication requests between the DTView Client and DTView Server are performed over an HTTPS encrypted link.

Optionally, the DTView Software can attempt to command the browser on the DTView Client not to store the password used for client authentication.

The DUS appliance user also authenticates with the DTView Software. DUS appliance users who fail to authenticate with the DTView Server shall be denied access to their Target PC. Authentication requests between the DUS appliance and DTView Server are performed over an ASMP (SSL) encrypted link. The DUS appliance user enters login credentials via a login screen presented by the DUS to initiate a connection to a target device (PC). The DUS presents the credentials to the DTView Software for authorization.

When there is an abrupt termination of the DUS connection with the target PC without an explicit user logout from the DUS (DUS power cycle, DIP power cycle, etc.) the appliance notifies the DTView Software of the termination. In each case the DTView Software updates its active session status accordingly.

The DTView Software inform the DUS of failed authentication attempts (internal or external), it is the responsibility of the DUS to inform the DUS user appropriately via its OSD.

Authentication of clients and appliances can be by internal authentication or external authentication. If internal, the DTView Software allows DTView Clients and DUS Appliance Users using login credentials to be authenticated against user account information (username/password) stored in the centralized DTView Software database. If external, the DTView Software external authentication service sends authentication requests to External Authentication Servers (including up to 10 such servers).

The DTView Software creates three built-in user groups when the DTViewSoftware is first installed, specifically:

DTView Administrator

DUS User

DUS AutoLogin

The User and Autologin User group are not allowed access to the DTView server via the DTView Client. The DTView Administrator group is given authority to fully administer the DTView, including: logging-in from the DUS appliance to connect to a PC, accessing DTView through the browser, and enabling and disabling autologin on a DUS appliance. On enabling autologin, the DTView software shall automatically create a user account using the autologin username and password stored on the DUS. Subsequent modification of that username or password shall result in DTView automatically updating the autologin username and password stored on the DUS. Note: The autologin mechanism enables the DTView Software to manage DUS AutoLogin connections in the same way as User login connections.

The DTView Software provides a HTML user interface that allows new user accounts to be created or deleted in the DTView Software database. This HTML interface prompts for:

1) Authentication Service

2) Username to add the user account to.

The DTView Software provides an HTML user interface that allows the administrator to list users who are logged in (i.e. with currently active Sessions) and indicate which Managed Appliances (DUS, DIP) and Target Device (PC) each user is connected to, and the duration of the connection. The DTView Software provides an HTML user interface that allows the administrators to view the active Session information for each user. The active Session information can include Managed Appliances (DUS, DIP) with which the user is currently conducting Sessions, the Target Device (PC) for each session, the type of each Session (Video, Keyboard/Mouse, Audio, vMedia), and the duration of each session. The DTView Software provides a HTML user interface that allows the administrator to view the media session properties for each user. The DTView Software provides an HTML user interface that allows the administrator to configure media session properties associated with a user. The following media session parameters shall be configurable:

Cert Timeout
Session Retry Timeout
Session Retry Count
Video Session Properties
　Enable/Disable
　Color Depth
　Maximum Frames per second
Audio Session Properties
　Enable/Disable
　Playout buffer size
Virtual Media Session Properties
　Enable/Disable
　Ratio of network bandwidth with respect to Video
Keyboard/Mouse Sessions Properties
　Enable/disable DTView contains the following predefined Video property categories to enable ease of administration. The following categories shall be supported:
Normal Desktop
Advanced Desktop
User-Defined Desktop A user configured with the User-Defined Desktop category, can have their video properties tuned by configuring the properties to any valid value, the default values being that of the Advanced Desktop category.

The DTView Software provides a HTML user interface that allows the administrator to search a range of IP addresses for appliances and then select one or more appliances to be added to the DTView Software database. MR121 The DTView Software provides a HTML user interface that allows a single appliance at a given IP address to be added to the DTView Software database. DTView can set the IP address, Subnet Mask, and Default Gateway. The DTView Software allows the Admin to discover, locate and configure appliances that already have IP addresses assigned. The DTView Software allows the Administrator to discover, locate and configure appliances that do not have an IP address.

The DTView Software does not prohibit the discovery of appliances that have already been added to another DTView System. The addition of appliances to the DTView database shall not be allowed if the appliance is being administered by another DTView server (i.e. appliances with a non zero DTView IP address parameter that is not equal to the discovering DTView's IP address).

The DTView Software maintains properties in the DTView Software database for managed appliances (DUS, DIP), such as Host Name, Part Number, Serial Number, IP Address, Assigned DTView Server, MAC address, versions, etc. On discovery, properties available on Appliance MIB are automatically populated.

The DTView Software maintains properties in the DTView Software database for managed Target Devices, such as Host Name, Serial Number, Part Number, IP Address, MAC address, DIP MAC address, etc. On discovery properties available from the Target device shall be automatically populated.

The DTView Software provides an HTML user interface that allows the administrator to modify property values associated with target devices and managed appliances.

The DTView Software enables the administrator to backup the DTView Software database, and to fully restore a DTS system from a backup.

The DTView Software accepts network connections from the DTView Client's browser via the HTTPS protocol. The DTView Software shall provide an HTML user interface that allows the administrator to configure which HTTPS TCP port shall be used for DTView Client access to the DTView Software for this DTView Server the user is logged into.

The DTView Software provides an HTML user interface to view the list of target devices (PCs) and managed appliances (DUSs & DIPs. This list displays the unit name and optional property fields for the units. The list can be filtered and sorted according to name or any of the optional property fields. The DTView Software shows target device status information for each target device in the Unit List using colorized icons. Status information can include 1) Active (If a KVM, Audio or vMedia Session is active), 2) Idle (No active Sessions), or 3) Not Responding. The DTView Software running on each DTView Server can periodically perform a health poll on appliances to determine if the appliance is still "alive" and responding. When communication with the appliance is lost or regained, an event shall be written to the event log and the appliance status information shall be updated.

The DTView Software shall show appliance status (DUS, DIP) information for each appliance in the Unit List using colorized icons, including statuses of 1) Not Responding (Appliance Does Not Respond to Status Health Poll), 2) Session In Use (one or more active Sessions), or 3) Idle (no active sessions).

The DTView Software supports the use of network based remote wake up mechanisms to enable powerup of Target devices. The DTView Software shall provide a HTML interface to enable the administrator to "manually" wake up a Target Device (PC). The administrator must first select the Target Device. For discussion purposes that shall be called "manual Target device wakeup.

The DTView Software uses the "ASMP protocol" for managing appliances. For a secure ASMP session, the DTView Software shall use certificate-based authentication to authenticate itself with each Managed Appliance. The DTView Software provides an HTML user interface that allows the administrator to manage appliance FLASH files, including the ability to upload FLASH files to a DTView Server, view information about the files (version, supported languages, supported appliance types), and delete files previously uploaded but no longer needed. The DTView Software also provides an HTML user interface that allows the administrator to FLASH upgrade the firmware of a DUS or DIP appliance. To facilitate, the HTML user interface displays the list of FLASH versions (from the FLASH file repository) available for the selected appliance.

Appliances implement an SNMPv1 agent, MIB-II, enterprise MIBs and trap MIBs. Appliances shall make public any enterprise MIB objects which have potential use to customers using an Enterprise SNMP Manager. An enterprise MIB is created for the DUS and DIP appliances.

Managed appliances (DUS, DIP) allows the community name for each type of SNMP access (read, write and trap) to be changed via ASMP and the enterprise MIB MR219 The DTView Software is capable of setting the community name for each type of SNMP access (read, write and trap), via the ASMP protocol and enterprise MIB, in each appliance (DUS and DIP). The DTView Software is, via the ASMP protocol and enterprise MIB, capable of enabling/disabling SNMP read and write access in each appliance. Regardless of this setting, ASMP read and write access shall always be available to properly authenticated DTView Software using ASMP. The appliance may send enabled SNMP traps even if SNMP read and write access is disabled The DTView Software shall be, via the ASMP protocol and enterprise MIB, capable of viewing and setting the IP addresses of SNMP trap hosts in each appliance.

The DTView Software is, via the ASMP protocol and enterprise MIB, capable of enabling and disabling ICMP pings via the ASMP protocol. When disabled, the Managed Appliance shall not respond to an ICMP ping request.

The DTView Software is, via the ASMP protocol and enterprise MIB, capable of commanding each Managed DUS and DIP Appliance to execute a warm reboot.

The DTView Software uses information received in SNMP traps sent by the appliances to update unit status cached in the DTView Server for Managed Appliances. The unit status read by the DTView Software "Status Polling" function is used in addition to the SNMP trap information to keep the cached unit status stored in each DTView Server up to date.

The DTView Software shall provide a feature that audits DTView System events (including Audit events and SNMP events) and stores these events in the DTView Software database, including the following types of events if enabled:

1. DTView Software Started (Service)
2. Successful DTView Client Session Authentication
3. Failed DTView Client Session Authentication
4. DTView Client Session Logout
5. Error Accessing DTView Software External Authentication Service
6. DTView Authentication Service Added, Modified, Deleted (includes password policy)
7. DTView User Added, Modified, Deleted
8. DTView Unit Added, Modified, Deleted
9. DTView User Permissions Assignment or Modification
10. DTView Task Added, Modified, Deleted, Started, Stopped, etc
11. DTView Backup or Restore Started/Completed
12. DTView Global Option Modified
13. Target Device Session Started
14. Target Device Session Stopped
15. Target Device Session Terminated
16. Managed Appliance State Change
17. Managed Appliance Flash Upgrade Requested
18. Managed Appliance Reboot Requested (sent by appliance prior to rebooting after receiving a reboot request)
19. DTView Concurrent Session License Exceeded The DTView Software provides a SNMP trap listener service that listens and reads SNMP traps from the network. In such a case, the DTView Software adds an SNMP trap type event to the audit log upon receipt of an SNMP trap from a DUS or DIP appliance. The DTView Software provides an HTML user interface that allows the administrator to enable or disable specific SNMP Trap type audit log events added for DUS and DIP appliances. This user interface shall allow the user to independently enable or disable each trap defined in the associated appliance's trap MIB.

The DTView Software shall provide an HTML user interface to view the list of audit log events. The DTView Software shall provide a mechanism to page through the list of audit log events, delete them, configure how long audit log events are retained, and export them to, for example, a Comma Separated Values (CSV) file (and thereafter export the CSV file to a local or network-mapped drive).

The DTView Software configures and sends email messages using the Simple Mail Transport Protocol (SMTP) upon receipt of selected audit log events. Administrators may configure which audit log events trigger email messages and which users receive these messages. The subject and text of the email message shall be based on the event. This SMTP email mechanism may be used to deliver messages to a variety of devices including standard email, pagers (user@skytel.com). and SMS (Short Message Service) enabled cell phones.

All data stored in the DTView Software database can be encrypted to prevent a person attempting to directly manipulate the database files from being able to read and understand the contents of the files. A unique database password shall be computed for every DTView System. The database password shall be computed by the DTView Software at runtime and shall be used internally by the DTView Software to establish SQL connections to the database. If a person somehow got a copy of the database and wanted to try and connect to it using a standard SQL browse utility or using software they have written themselves, the person would need the database password. Since the password is computed and not stored in the DTView System, the person would not be able to discover this information and would have to randomly guess at the password.

The DTView Software database may store the following fields with example limit lengths of:
  User account fields according to the following:
    Username Min=1 Max=64
    Full Name Min=0 Max=64
    Password Min=Password Policy Max=64
    Home Phone Min=0 Max=64
    Business Phone Min=0 Max=64
    Mobile Phone Min=0 Max=64
    Business Mobile Phone Min=0 Max=64
    Business Pager Min=0 Max=64
    Home Address Min=0 Max=256
    Business Address Min=0 Max=256
    Default E-mail Address Min=0 Max=64
    Additional E-mail Address Min=0 Max=64
    Comment Min=0 Max=512
  external authentication server fields according to the following.
    External Authentication Server Name Min=1 Max=64
    Active Directory Domain Name Min=1 Max=256
    Host Name Min=1 Max=256
  Department and Location values
    Department Min=1 Max=64
    Location Min=1 Max=64
  Managed Appliance and Target device properties as follows:
    Name Min=1 Max=64
    Type Min=1 Max=64
    Part Number Min=1 Max=64
    Serial Number Min=0 Max=64
    Model Number Min=0 Max=64
    Asset Tag Number Min=0 Max=64
    Icon Selected from list
    Department Selected from list
    Location Selected from list
    IP Address Min=7 Max=15
    Description Min=0 Max=64
    Contact Min=0 Max=64
    Contact Phone Min=0 Max=64
    Comment Min=0 Max=512
    Assigned DTView Server Min=0 Max=512
    MAC address Min=0 Max=64
    FPGA version Min=0 Max=64
    Boot version Min=0 Max=64
    Application version Min=0 Max=64
    EID Min=0 Max=64 d. Extender Mode

The Malta system components can be deployed in three primary configurations.
1. Extender Mode
2. DeskTop Mode
3. Matrix Mode In overview, in Extender Mode there is no Management Application present. The DUS and DIP are physically interconnected by direct cable or over an IP subnet as illustrated in FIG. 14 and FIG. 15 respectively. The DUS automatically connects to the DIP with user intervention on powerup. In Extender mode the Malta-PR auto-connects a DIP to a DUS on a point-to-point link—there is no DTView. The DUS and DIP can auto-connect over the point-to-point link in the same way as existing extender type products.

In Extender Mode, a DUS connects to a specific DIP based on direct physical connection, no login is required. In Extender mode a DUS and a DIP pair are connected with a UTP cable (cross-over performed in PHYs in DIP/DUS if required). There is a fixed physical association between DUS and Target PC. The user gains access to their Target PC by powering up the associated DUS. The user remains connected to the Target PC until the DUS or Target PC is powered down. The "UTP cable" may also be an IP subnet where the DUS and DIP can safely use their factory default IP addresses. In Extender mode, the DUS "broadcasts" onto local subnet and DIPs and DUS on the network reply. If a DUS or more than one DIP is detected, the system will move into "Desktop" mode waiting for DTView to configure them.

On power-up a DUS configured for Extender Mode operation automatically detects the presence of a DIP and establishes a connection with the DIP without user intervention. The DUS and DIP communicate using IP based connections, and all media session are established by default (Video, Keyboard, Mouse, Audio, vMedia). If an IP path exists between the DUS and the target PC, then remote wakeup (Wake On LAN) mechanisms can be used to power-up the target PC over the network should it be powered down. The DUS on powerup in Extender mode uses its Static IP address configuration and on discovering a DIP configures it with the DIP static IP address data stored on the DUS. The IP addresses used by the DUS for itself and the DIP can be modified to enable the DUS and DIP to operate correctly within any IP subnetwork. In an enterprise IP network it is possible to have more many DUS-DIP pairs operating.

The DUS can use a broadcast based discovery protocol to find the partner DIP either on a direct cable or on a specific subnet. Extender configurations are also possible without the auto discovery protocol. In this scenario the DUS would continually attempt to establish a connection to the DIP IP address it is configured with. This method would require the DIP to powerup using a known IP address (obtained through DHCP or statically configured). The factory default IP addresses of the DUS and DIP shall use IP addresses from one of the designated "private" address blocks. Addresses from these address blocks are not passed by routers to external networks. When operating in extender mode using a broadcast discovery protocol, a DUS will automatically detect another DUS or DIP on the same subnet and enter Desktop mode. If a connection was established the DUS will remove the connection prior to entering Desktop mode.

DUS and DIP administration can be performed through the OSD or RS232 port of the DUS. The general principle is that Administration activities are performed through the DUS serial port, and general user level configurations and activities are performed through the OSD. The OSD can be summoned by simply hitting the OSD hotkey sequence, no security is required. Administrators shall require login access control at the serial port. If it is deemed necessary to provide administration functions through the OSD, administrator login shall be required.

In extender mode, the DUS OSD enables the user to:
1. Set local DUS console related items (keyboard layout for the OSD, OSD inactivity timer etc); and
2. View the DUS and connected DIP version, identification and addressing information.

The DUS Serial port enables the administrators to:
1. Update firmware of the DUS and connected DIP;
2. Configure the DUS operating Mode (Extender or Desktop/Matrix);
3. View the DUS and connected DIP; hardware, FPGA and firmware version information;
4. View the DUS and connected DIP; naming, Mac and IP address data; and
5. Enable/disable and configure media session properties (Video, Audio, Keyboard/Mouse, VMedia, persistently stored on DUS).

The DUS is explicitly configured on installation to be in Extender or Desktop/Matrix configuration. Preferably, it defaults to Extender mode so no actual configuration is required when in Extender mode. The DIP is a slave device, it is not mode aware and does not require explicit configuration on installation in an Extender configuration.

e. Desktop and Matrix Modes

The Desktop Mode enables a DUS to connect to a specific DIP out of many potential DIPs on the network. The specific DIP to connect to is configured by the administrator on DTView. The DUS user is not presented with a list of Target PCs from which to select from. A DIP is associated with a specific user, in which case the DIP connected is independent of the DUS used or a specific DUS can be configured to connect to specific DIP, independent of the user using the DUS.

In the desktop mode, the DUS and DIP can connect over an IP network. The IP network can contain many DUS and DIP. The external (not in DIP or DUS) Management Application does the authentication, access control and accounting functions. Essentially, the Management Application receives a message from the DUS of the connection it would like to make and tells both DUS and DIP they can speak to each other. It gives the DUS and DIP a unique token that enables the specific DUS and DUS to communicate. The Management Application can be server based like DSView or integrated into a network switch or appliance (similar to the way AAA is provided in AMX).

In Desktop mode, the DUS and DIP reside on an IP network, and DTView is present. A user gains access to their Target PC by logging into any DUS on the Network. There is a fixed (configurable) association between the User and a Target PC. It shall be possible to configure the Desktop mode so that there is a fixed association between a DUS and Target PC. The user gains access to their Target PC by powering up the associated DUS. This is commonly referred to as "Autologin." The user remains connected to the Target PC until the DUS or Target PC is powered down.

In DeskTop and Matrix modes, the DUS and DIP appliances and the Malta Management Application are connected to an IP network as illustrated in FIG. 19. The user logs into the Malta system via the DUS.

In Desktop mode, a DUS connects to a specific DIP on a network of DIPs and DUSs. A user logs into the DUS to establish the connection. Login and Auto login modes are available. The association of a User, DUS and DIP is configured on the Management Application.

In Matrix mode, a DUS connects to a specific DIP on a network of DIPs and DUSs. A user logs into the DUS to obtain a list Target PCs (DIPs). A specific connection is established on selection of the Target PC (DIP). Login and Auto login modes are available The association of a User, DUS and a list of accessible Target PCs (DIPs) is configured by the administrator on the Management Application. On login, in DeskTop mode, the Management Application will automatically pre-authorise a specific connection on the DUS and a Target PC (DIP), after which the DUS connects to the specified DIP. The specific DUS-DIP connection is pre-configured on a per user basis on the Management Application by the administrator.

On login in Matrix mode, the Management Application will provide the DUS with a list of Target PCs the user has been authorised to access. After the DUS user has selected the required Target PC, the Management Application will pre-authorise the selected connection on the DUS and the DIP associated with the selected Target PC, after which the DUS connects to the specified DIP.

In both Desktop and Matrix modes, the DUS can be configured to automatically login using a configured username and password, eliminating the need for the user to explicitly login. The "autologin" user can be configured on the Management Application so that on login a connection to a specific Target PC (Desktop mode) is created, or a list of Target PCs from which a person with physical access to the DUS can choose from (Matrix mode). The number of active DUS-DIP sessions allowed at any one time will be controlled by a licensing mechanism.

To facilitate fault tolerance and geographical scaling of the solution Management Application can facilitate a network of secondary/backup Management Application installations that maintain synchronization with the primary Management Application.

On power-up of a DUS configured for desktop/Matrix mode operation, the DUS will initialize itself, inform the Management Application of its presence, and present the login OSD screen to the DUS user and wait quietly on the IP network. The DUS will have obtained its IP address through DHCP or via statically configured IP data.

On power-up of the DIP it initializes itself, inform the Management Application of its presence and wait quietly on the network. The DUS will have obtained its IP address through DHCP or via statically configured IP data. The Management Application on power-up shall check the availability and status of DUS and DIP appliances in its database, making the status visible to the Administrator. The availability of appliances in its database is monitored using a polling scheme augmented by events received from the DUS and DIP appliances.

The administrator can add new appliances to the administered system by entering the appliance IP address or host name, triggering the Management Application to communicate with the device, configure it for operation in the system, and add it to its database. Alternatively the Management Application can be used to automatically discover DUS and DIP appliances on specified subnets instead of explicitly entering each appliance IP address.

Before connections can be established, the administrator must configure users and associate access rights and operating mode (Desktop/Matrix) on a per DUS basis. A specific user could be configured to connect in DeskTop or Matrix mode depending on the DUS logged in from. With the Management application configured, users can login successfully at a DUS. On login of a user configured for Desktop mode from the DUS being used to login at, the Management Application places an X.509 session certificate on the DUS and DIP associated with the connection (this pre-authorizes the connection, only these specific DUS and DIP can make this connection). After pre-authorization is completed the DUS establishes a secure connection with the DIP setting to the media sessions (Video, Keyboard/Mouse, Audio, vMedia) specified in the x.509 session cert provided by the Management Application.

On login of a user configured for Matrix mode from the DUS being used to login at, the Management Application provides the DUS with a list of Target PC (DIPS) that the user is allowed access. After the user selects a Target PC the Management Application places an X.509 session certificate on the DUS and DIP associated with the connection (this pre-authorizes the connection, only these specific DUS and DIP can make this connection). After pre-authorization is completed the DUS establishes a secure connection with the DIP setting to the media sessions (Video, Keyboard/Mouse, Audio, vMedia) specified in the x.509 session cert provided by the Management Application. If the Target PC attached to the require DIP is powered down, the Management Application shall use remote wake up mechanisms (Wake On LAN, Magic Packet, etc.) to power up the Target PC via its network port.

The Management Application will be able use Hostnames to communicate with Malta appliances, using DHCP and DNS services to manage IP addressing and will support the use of external authentication services to authenticate usernames and passwords. The maximum number of active DUS-DIP connections will be controlled by a licensing mechanism.

A specific DUS can be configured via the Management Application to Auto-login with a configured username and password. On power-up the DUS does not display the login screen, instead it automatically logs in using the auto login username and password configured (persistent) on the DUS.

Matrix mode facilitate the connection of more than one DUS to a specific Target PC (DIP). This is known as a shared connection. Sharing introduces the notion of connection types (Private and Shared) and Pre-emption levels. Only connections that are created as being a "shared" type connection can be shared. When a shared connection is requested to a Target PC/DIP on which one or more shared connections already exist, the existing DUS users are informed by the Management Application of the requesting username and asks if the user will allow the connection. The pre-emption level primarily determines if a user can disconnect another user's connection. It can also be used to determine if a DUS user can "silently" share a connection (i.e. without asking already sharing users permission).

When a connection is shared, each DUS user obtains the video and audio stream from the Target PC, however the Keyboard, Mouse and Mass storage device access can only be owned by one DUS user at a time.

In Desktop and Matrix modes all administration is performed using the Management Application. Local DUS user level administration can be performed through the OSD as for the Extender mode.

The DUS OSD on the initial Malta products shall at a minimum enable the user to:
1. Set local DUS console related items (keyboard layout for the OSD, OSD inactivity timer etc); and
2. View the DUS and connected DIP version, identification and addressing information.

The DUS Serial port on the initial Malta products shall at a minimum enable administrators to:
1. Configure the DUS operating Mode (Extender or Desktop/Matrix);
2. View the DUS and connected DIP; hardware, FPGA and firmware version Information:
3. View the DUS and connected DIP; naming, Mac and IP address data; and
4. Enable/disable and configure media session properties (Video, Audio, Keyboard/Mouse, vMedia). The changes to properties are valid for the current connection only, and are not persistent. Persistent changes to media session parameters need to be made at the Management Application, and will be provide to the appliance in the X.509 session cert on subsequent connection establishments.

The Management Application can at a minimum enable administrators to
1. View and modify configuration data on all Malta appliances;
2. View the connection status and details of established connections
3. Maintain Audit trails and Event logs
4. Configure user authentication and connection authorization data
5. Upgrade firmware on Malta appliances
6. Retrieve and process performance data from Malta appliances
   i. Firewalls:
The Malta System will be designed to reduce the number of TCP ports required when operating through a firewall. However the initial Malta releases shall recommend network configurations where the DUS, DIP and Management Application reside within the same firewall zone.

If the DIPs and DUSs are in a different zone from the Management Application, the firewall would need to be configured to pass the TCP ports required for the protocols used by the Management Application in communicating with the DUS & DIP.

Because DUSs may be widely distributed in practice, they may not be in the same firewall zone as the Management Application and DIPs. In addition to considering the protocols used by the Management Application consideration must be given to the protocols operating between the DUS and DIP for media session establishment and data transfer. Consideration also needs to be given to the fact that SNMP traps are sent from the DNX appliances to the Management Application.

Management Application administrator browser clients may also require access through a firewall. This interface uses standard web browsing protocols.

The Malta products can use fixed port numbers at the client and server side (meaning that the media streams do not have the standard TCP setup phase and by implication do not have the standard TCP client/server port allocation scheme).
   ii. NAT
Network Address Translation (NAT) devices enable a company to user more internal IP addresses than they have assigned. These devices provide private IP addresses that are not exposed outside of the device.

DTView administration browser clients will work without issues to access an enterprise Malta Management Application server through a NAT.

If the Malta appliances and Management Application have a NAT between them, consideration would need to be given to the fact that both the Management Application and the Appliances can initiate communications to one another.

f. System Protocols
The Malta functional components, primary interfaces and behaviour are described in this section.

Extender and Desktop/Matrix operating mode functional models are illustrated in FIG. 18 and FIG. 25 respectively. The diagrams illustrate the primary functional partitioning and core interfaces of a Malta system. The Malta system behavior is described using a combination of Usecases and high level message sequence diagrams illustrating the high level procedures and protocols involved. Table 1 provides a summary of the protocols used on the identified communication interfaces in FIG. 18 and FIG. 25.

TABLE 1

| Protocol | Interfaces | Usage |
| --- | --- | --- |
| ASMP | Management App. - DUS Management App - DIP DUS - DIP | Used for Operations, Administration and Maintenance (OAM) functions. |
| SNMP | Management App - DUS Management App - DIP DUS-DIP (Extender Mode) | Used for Trap generation, and access to public MIBs and MIB sections. |
| AVSP | DUS - DIP | Used to control the DUS - DIP connection and associated media sessions. |
| ADSAP2 | Management App - DUS Management App - DIP | Used to manage x.509 certificates on the DUS and DIP. |
| WOL | Management App - Target PC | Management Application can wakeup the Target PC by sending an Wake on LAN packet to the Target PC. |
| WMI | Management App - Target PC | Used by the Management App. to obtain information identifying the Target-PC, and the attached DIP, enabling auto association of DIP and Target-PC. |
| MALTA-Video | DUS-DIP | Digitised Video streaming from DIP to DUS |
| MALTA-Keyboard-Mouse | DUS-DIP | Keyboard/Mouse transactions between DUS and DIP |
| MALTA-Mass Storage | DUS-DIP | Mass Storage media transfer between DUS and DIP |
| MALTA-Audio | DUS-DIP | Digitized audio Transfer between DUS and DIP |

The I/O streams (video, audio, keyboard/mouse, USB peripherals) are transported over the network between DUS and DIP using 128 Bit AES encrypted SSL streams using a hardware based encryption/decryption and network communications engine.

The video is compressed and decompressed in hardware using the scheme described in U.S. patent application Ser. No. 11/707,879, entitled "Compression Algorithm." This is essentially a real-time compression/decompression scheme optimized to provide 30 fps while maintaining up to 24-bits of color depth to minimize mouse latency. System supports 24-bit color depth with hardware based compression engine optimized to maintain >30 fps over a standard Ethernet 1 Gbps LAN—system expected to deliver ~60 fps for standard windows desktops.

If the administrator wants to setup a new system in Extender mode, the administrator first connects a DIP to a Target PC and powers up the Target PC. Then the DUS is connected to a DIP (cable or IP subnet) and the DUS is powered up. The DUS has a default static IP address and the DIP in its factory default configuration has no IP address so the DUS provides the DIP with its IP address in Extender mode. The static IP address is automatically configured on the DIP by the DUS and he DUS shall automatically connect to DIP on all subsequent power ups.

If the administrator wants to setup a system in Desktop mode the administrator first installs DTView and then connects (1) DIPs to the Target PCs (and powers up the Target PCs), (2) DIPs to the IP Network, and (3) DUSs to the IP network (and powers up the DUSs). Then, DTView discovers the Appliances (appliances are discovered irrespective of operating mode i.e. Desktop or Extender) and sets initial data settings on appliances (SNMP Trap destinations, DTView IP address, setting mode to Desktop etc). The administrator adds Target PC data, creates user accounts, associations between DIPs and Target PCs, and associations between Users and Target PCs. The system is then ready for users.

i. Connection Management (Extender Mode)

No user interaction with the DUS is required to establish connections with the DIP. Once powered up the DUS automatically establishes media sessions as per the factory default on the DUS. The default session cert (media sessions and session properties) parameters can be modified by the administrator via the DUS serial port and stored persistently. The admin can change the mode of a DUS to Extender or Desktop via serial port CLI or DTView.

In Extender mode, the DUS is continually monitoring for other DUS or DIP appliances. If another DUS or more than one DIP is detected the DUS closes all open media sessions with the DIP, notifies the DUS user via a message on the screen, and enters Desktop mode. On subsequent power cycle, the DUS returns to the mode it was configured for from the serial port CLI (Extender or Desktop). The "auto-detect" and move into Desktop mode does not cause a permanent mode-change update. This can only be done by an admin-action on serial port CLI or DTView.

ii. Connection Management (Desktop Mode)

After user login at the DUS the system will automatically establish the required media sessions between the DUS and the DIP. The connection to be created is defined by the user properties stored in DTView. These properties will include target DIP for a user and the media sessions the user is allowed (e.g. keyboard, mouse, vMedia, audio, etc.). The system shall create the media session using the functional principles described in the following sequence:

1. The DUS passes the user name and password to DTView.
2. DTView authenticates the login username and password. Internal or external authentication can be used.
3. DTView identifies the DUS used to login from and verifies that the user is allowed login from that DUS.
4. DTView reads the Target PC (and associated DIP) associated with the user.
5. DTView reads the media session properties configured for the User-Target PC association. If the Target-PC is not available the DTView Application will attempt to wake up the Target PC (notifying the DUS user as appropriate). If unsuccessful the user's backup Target PC shall be used.
6. DTView configures Session Certs describing the pre-authorized connection on the DUS and DIP appliances
7. The DUS establishes the media sessions indicated in its Session Cert. Each appliance authenticating the session by exchanging session Certs during the SSL link establishment.
8. The DUS and DIP notify DTView of the status of the media establishment attempt.
9. DTView updates its store of active connections.

On user logout from the DUS the system shall close down the media session using the functional principles described in the following sequence:

1. The user selects logout on the DUS OSD.
2. The DUS informs DTView of a logout request
3. The DUS shall then remove the media sessions established with the DIP.
4. The DUS and DIP will inform DTView of the session closure. DTView updates its store of active connections.

On power-down of DIP or DUS the connection will be torn-down and DTView will update records/database. If DTView is not contactable due to server power-loss or network issue all established connections will continue to operate until the user logs out from the DUS. No new connections can be made. The remote wake up of the Target PC by DTView shall utilize the Wake on LAN protocol. The Target PC OS may need to be configured to enable remote wakeup capability. The remote wake up of the Target PC shall be transparent to the DUS.

The DUS shall be capable of being configured to "Auto login" when in Desktop mode. This configuration is only done through DTView. When in this mode the DUS does not present the user with the login screen, it sends a login request to DTView using a defined username and password. This is set by factory default to be "DUS & MAC Address" for both username and password. An admin can only change the name and password via DTView.

The Desktop mode can be sub-selected as a Normal mode with video properties of 8-bit Color depth with a maximum frame rate of 30 fps across the network and Advanced with 24-bit Color depth with a maximum frame rate of 60 fps across the network. Alternatively, a User-Defined Desktop can be designated that allows users to have customized video session properties. The DUS and DIP receive the explicit video properties from DTView as part of connection establishment in Desktop mode.

The Audio session properties are configured on a per user basis on DTView. The Audio properties include: (1) Enable/Disable and (2) Play-out buffer (of approx 22 ms-350 ms, with a default of 87 ms The Keyboard/Mouse session properties are also configured on a per user basis on DTView. The properties are (1) Enable/Disable, default Enable.

The vMedia session properties are configured on a per user basis on DTView. The vMedia properties are: (1) Enable/Disable and (2) Allocated DUS-DIP vMedia bandwidth with respect to video expressed as % & (ratio) (for example, 50% (1:1), 33% (1:2), 25%, (1:3), or 20% (1:4)).

The DUS and DIP receive the explicit vMedia properties from DTView as part of connection establishment in Desktop mode.

BRIEF DESCRIPTION OF THE DRAWINGS

The following description, given with respect to the attached drawings, may be better understood with reference to the non-limiting examples set forth with the drawings which are as follows.

DETAILED DESCRIPTION OF THE PRESENTLY PREFERRED EXEMPLARY EMBODIMENTS

Figure 1A:
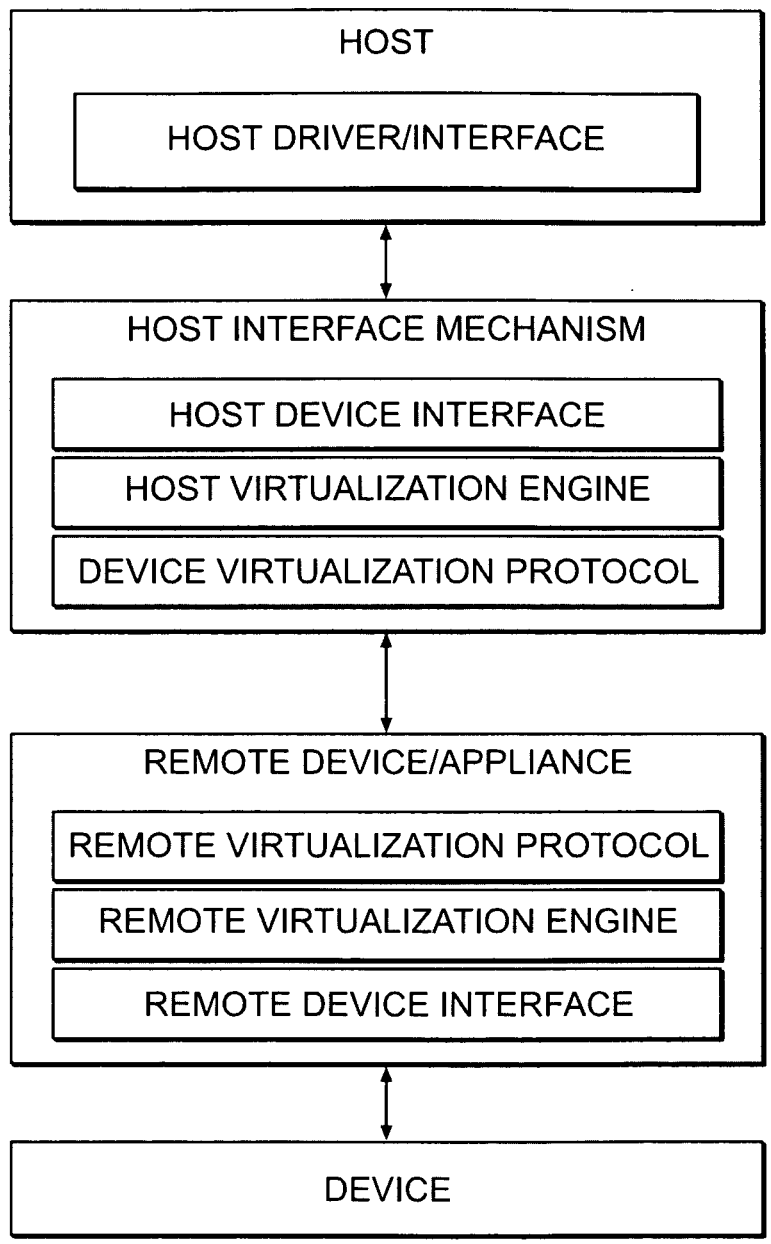
FIG. 1*a*: a schematic illustrating virtualization.

FIG. 1*a* is a schematic summarizing of the operation of remote virtualization of the system. The system creates a mechanism to virtualize so that a device driver on a host does not realize the device is remote and being accessed over a network. The system is realized with a combination of software and hardware.

FIG. 1*a* shows two components—the host interface mechanism and the remote interface mechanism. The host interface mechanism is connected to the software driver layer in a host. This connection is over the normal host interfaces such as PCI or PCIe. The host interface mechanism looks to the software driver as the device that is being virtualized. For example, for virtualization of a USB Host Controller it provides the same register set and completes operations as if the actual USB Host Controller was there— the difference is the Host Interface Mechanism has to handle the fact that the action is actually happening in the Remote Interface Mechanism. The Remote Interface Mechanism actually drive the device being virtualized. The Remote Interface Mechanism receives commands from the Host Interface Mechanism and sends back replies to Host Interface Mechanism.

The host interface mechanism and remote interface mechanism are unique to the class of device being virtualized. For example, they would be unique remote and host interface mechanism for virualizing a USB Host Controller chip and Audio chip. When virtualizing devices presenting industry standard interfaces the Remote Interface Mechanism and Host Interface mechanisms exchange capabilities and can auto negotiate to agree the virtualization capability set. In this way Remote Interface Mechanisms supporting different physical devices can interoperate with a specific Host Interface Mechanism.

The system addresses, in part, virtualizing a device so that it can be remotely accessed. This requires mechanisms to handle remoting of the interface mechanisms. This invention allows this virtualizing of a device to be performed without the software driver being aware of it.

The Host interface Mechanism and Remote Interface Mechanism interact with the host side device drivers and the remote virtualized device to make the host driver believe it is communicating with a local device. The Host Interface Mechanism and Remote Interface Mechanism are each composed of three core functional components.

The Host Device Interface is the device interface presented to the Host system (typically across a PCI or PCIe bus). The Host Device Interface is identical in register set and behavioural model to the device being virtualized. The Host system uses the same drivers and applications used with the real device to communicate across the Host Device Interface.

The Host Device Virtualization Engine maps the Interface presented to the Host to the Device Virtualization Protocol for communication with the Remote Interface Mechanism. The Host Virtualization Engine is aware of the remoting sensitivities of a specific device and applies a device specific virtualization algorithm that interacts with a compatible Remote Virtualization Engine in the Remote Interface Mechanism to "hide" the remoting of the real device from the Host system.

The Host Device Virtualization Engine and Remote Device Virtualization Engine communicate using the transport independent Device Virtualization Protocol.

The Remote Virtualization Engine interacts with the real device through the Remote Device Interface which communicates with the actual Virtualized device.

The Device Virtualization Engines operate with awareness of the device functionality and host system driver requirements to effectively virtualize devices over remote links. The associated algorithms are specifically optimized to accommodate bandwidth and latency characteristics of remote links. For example a set of specific algorithms accommodate virtualization of a USB 2.0 Host Controller, each algorithm focused on specific remoting aspect of a the USB 2.0 Host Controller Interface.

Alternative approaches used to solve this problem have been to emulate a device at both ends. The system described herein enables the virtualized device to behave and function as if locally connected using its native device drivers and exploiting the devices full functionality. This approach is not concerned with remoting the output from a specific hardware device being virtualized and as such does not have to content with resultant data transformation performed by the device. Such transformations are optimized for communicating with local peripherals and devices. This approach leads to an efficient and true virtualization of the device.

Figure 1B:
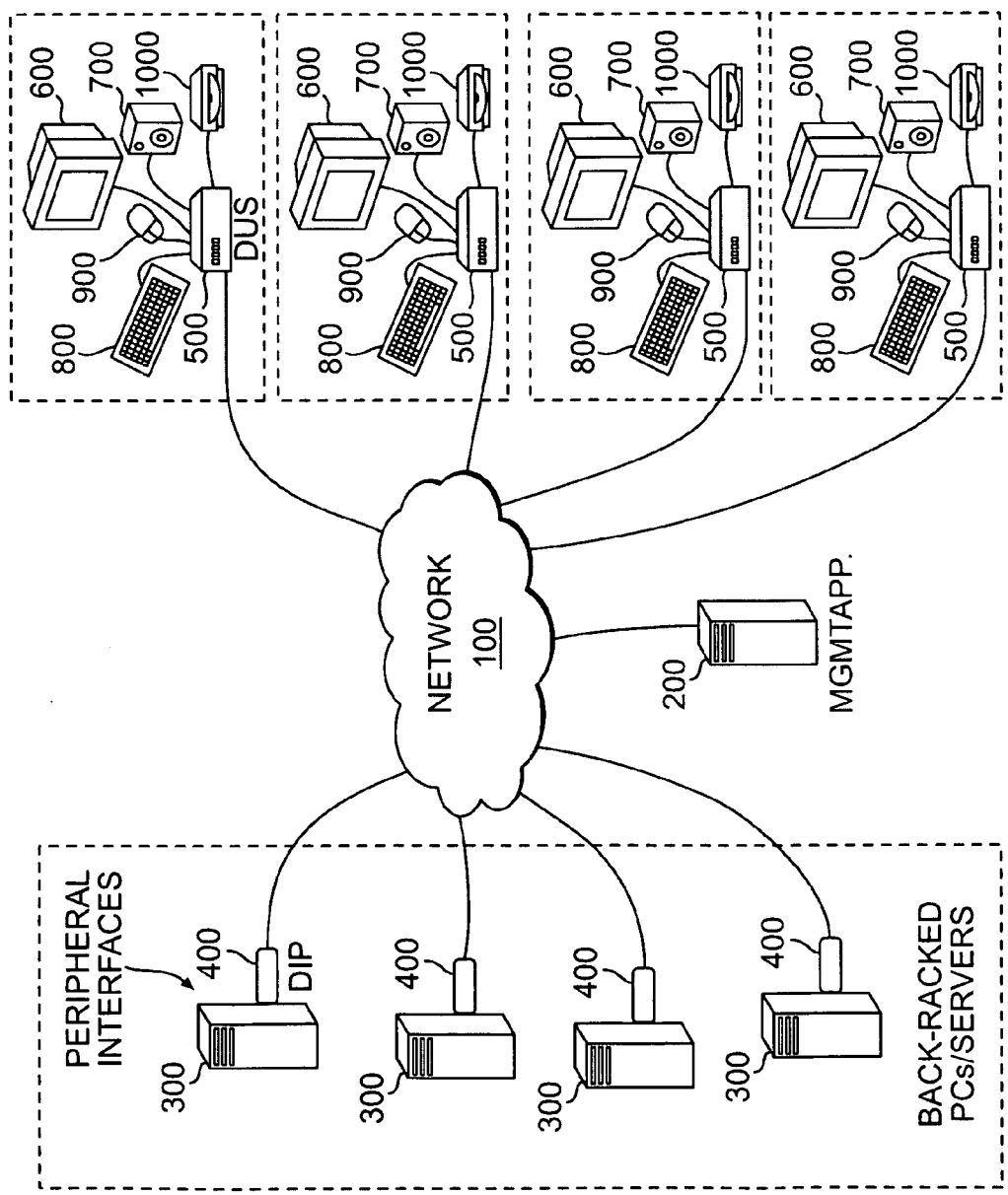
FIG. 1*b*: an exemplary virtualized media system.

FIG. 1b shows a general exemplary configuration of a virtualized media system and illustrates the main components in the system and basic connections between components. FIG. 1b is an exemplary embodiment of the schematic of 1a. The purpose of the system is to allow peripherals (KVM peripherals and a wide range of USB based peripherals) to access a target device across a network. In the exemplary embodiment there are four types of information that are transmitted across network 100. The four types of information are: video information, keyboard/mouse information, audio information, and media information. Each type of information is transmitted in a media stream. There are three main components of the system connected to network 100: Digitalizing Interface Pod (DIP) 400, Digital User-Station (DUS) 500, and Management Application (MgmtApp) 200. Network 100 is typically an IP-based LAN/WAN network. It should be noted, components will be able to work without issue if Network Address Translation (NAT) devices are used on network 100. In the exemplary embodiment, DUS 500 and DIP 400 will be hardware units and MgmtApp 200 will be a software application. In alternative embodiments, this could change so DIP 400 and DUS 500 are software embodiments and MgmtApp 200 embodied in hardware.

DIP 400 connects to the peripheral interfaces of a target device 300. DIP 400 transports the I/O streams between a target device 300 and network 100. Target devices 300 are typically back-racked PCs or servers, as shown in FIG. 1b, but are not limited to such. Target devices 300 can include any device with peripheral ports (e.g. media player, PDA, Set top box, etc.).

In some respects, DUS 500 is the inverse of a DIP 400. DUS 500 connects to various peripherals at a user station. DUS 500 transports I/O streams between network 100 and connected peripherals. Exemplary peripherals connected to DUS 500 shown in FIG. 1 include: PS/2 keyboard 800, PS/2 mouse 900, monitor 600, audio device 700, and USB peripherals 1000. USB peripherals 1000 can include any type of USB device including mass storage devices, a USB mouse and a USB keyboard.

Any number of combinations of DIPs 400 and DUSs 500 can be used in the system. However, in some instances, there is a single DUS 500 and DIP 400 pair. In such instances, network 100 can comprise a single cable directly connecting the pair or an IP subnet. Exemplary DUS 500 and DIP 400 will have network interfaces that enable them to operate over a 100 BT or 1 Gig copper cabled Ethernet network.

MgmtApp 200 is a software application that provides authentication, access control, and accounting services for a network of DIPs 400 and DUSs 500. MgmtApp 200 includes a database that stores information about each DIP 400 and DUS 500 connected to the network 100. It should be noted that MgmtApp 200 is not necessary when there is a single DUS 500 and DIP 400 pair. The single DUS 500 and DIP 400 pair is described in greater detail in accordance with FIG. 15. This MgmtApp 200 can be server based as shown or integrated into a network switch or appliance.

Figure 2:
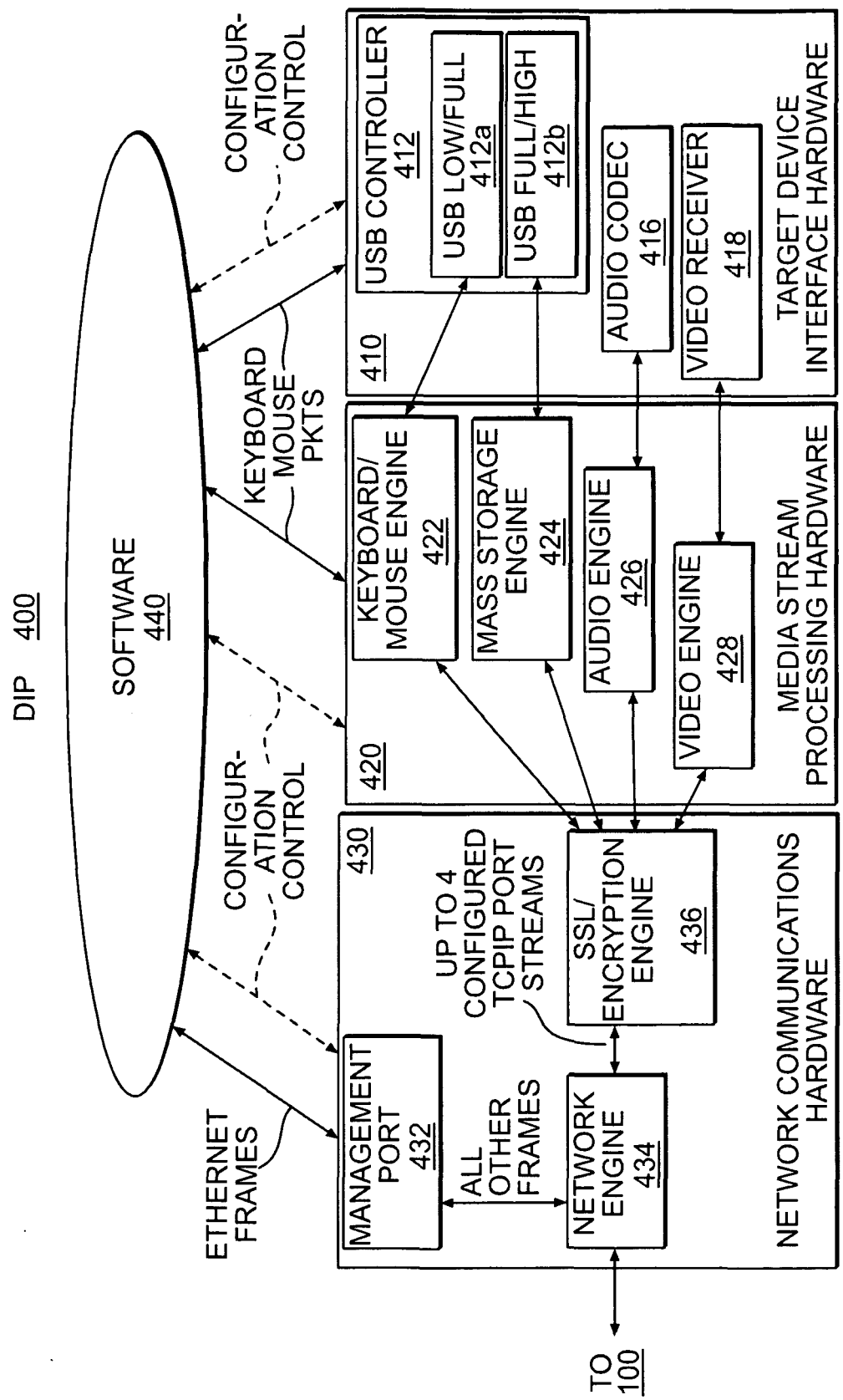
FIG. 2: an exemplary Digitizing Interface Pod.

An exemplary DIP 400 is shown in FIG. 2. DIP 400 is typically implemented as an external dongle that connects to the peripheral ports of a target device 300. However, a DIP 400 can also be embedded inside a target device 300. This may be in the form of a PCI card or as an embedded chip-set to be integrated by OEMs. Exemplary DIP 400 presents a target device 300 with a video connection, an audio connection, and a pair of USB connections.

For descriptive purposes, exemplary DIP 400 is shown as being comprised of three hardware functional blocks: target device interface hardware 410, media stream processing hardware 420, and network communications hardware 430. Each of the hardware functional blocks interacts with a software layer 440. Functional hardware blocks are typically embodied by an FGPA, but can also be implemented using an ASIC or other hardware implementations or combinations thereof. Using three functional blocks to describe DIP 400 is not intended to limit the ways in which a DIP 400 can be physically implemented.

Target device interface hardware 410 interfaces a target device's peripheral ports and media stream processing hardware 420. Target device interface hardware 420 converts data communicated between target device's peripheral ports and media stream processing hardware 420. An example of such a conversion is converting analog data output from a target device into a digital data form the can be processed by media stream processing hardware 420. Target device interface hardware 410 includes a USB peripheral controller 412, an audio codec 416, and a video receiver 418, each of which is described in greater detail with their respective media stream. Although not shown in FIG. 2, target device interface hardware 410 can also provide a serial connection for interfacing a target device's serial port.

Media stream processing hardware 420 interfaces target device interface hardware 410 and network communication hardware 430. Media stream processing hardware 420 packetizes/depacketizes data communicated between target device interface hardware 420 and network communication hardware 430. Media stream processing hardware 420 includes a keyboard/mouse engine 422, a mass storage engine 424, an audio engine 426, and a video engine 428, each of which is described in greater detail with their respective media stream.

Network communications hardware 430 interfaces network 100 and media stream processing hardware 420. Network communication hardware 430 receives data packets from media stream processing hardware 420 and converts the data into a form compatible with network 100. Network communication hardware 430 also receives data from network 100 and converts it into a form compatible with media stream processing hardware 420. Network communications hardware 430 includes management port 432, network engine 434, and SSL/encryption engine 436, each of which is described in greater detail in accordance with FIGS. 5 and 6.

Figure 3:
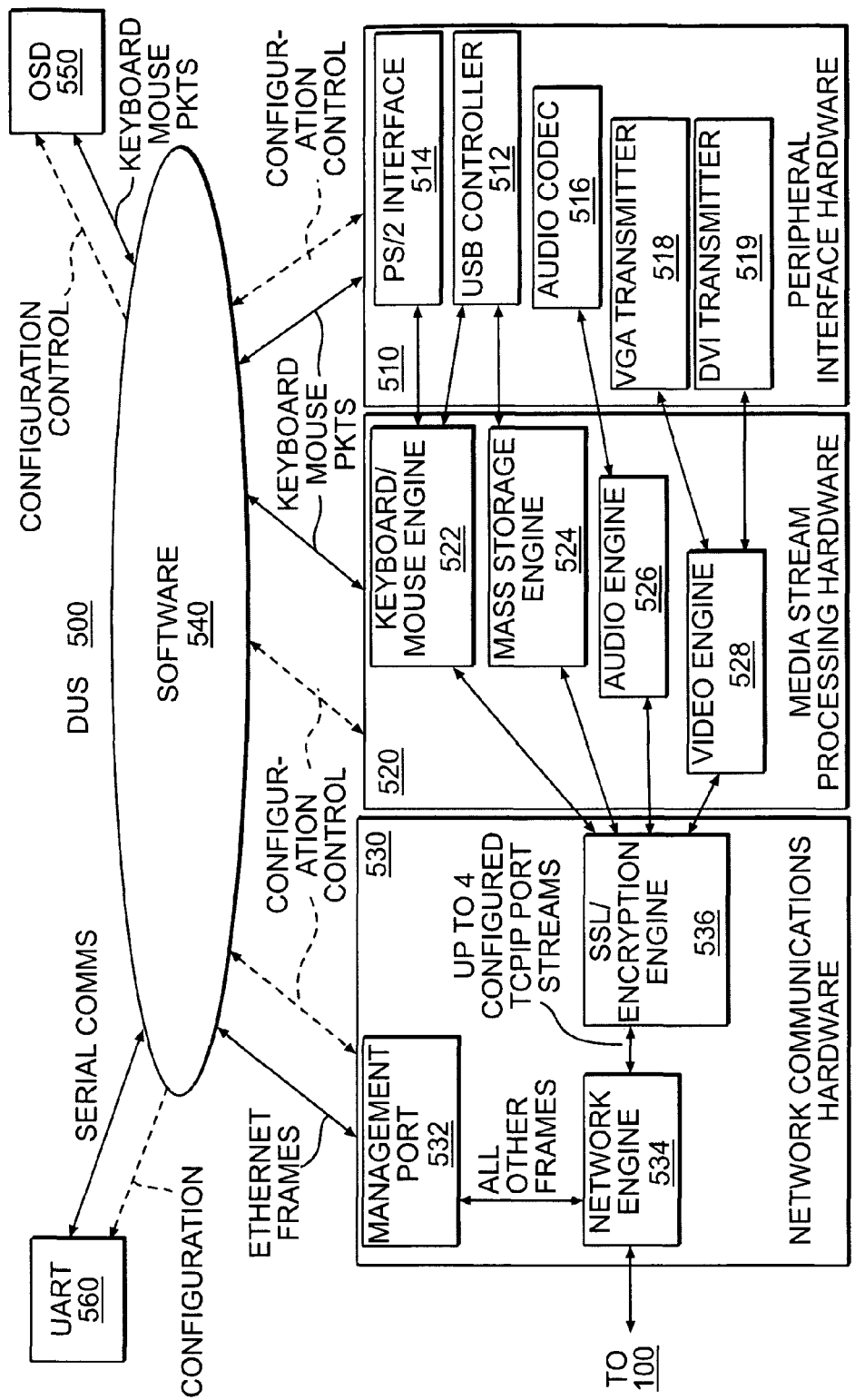
FIG. 3: an exemplary Digital-User Station.
Figure 4:
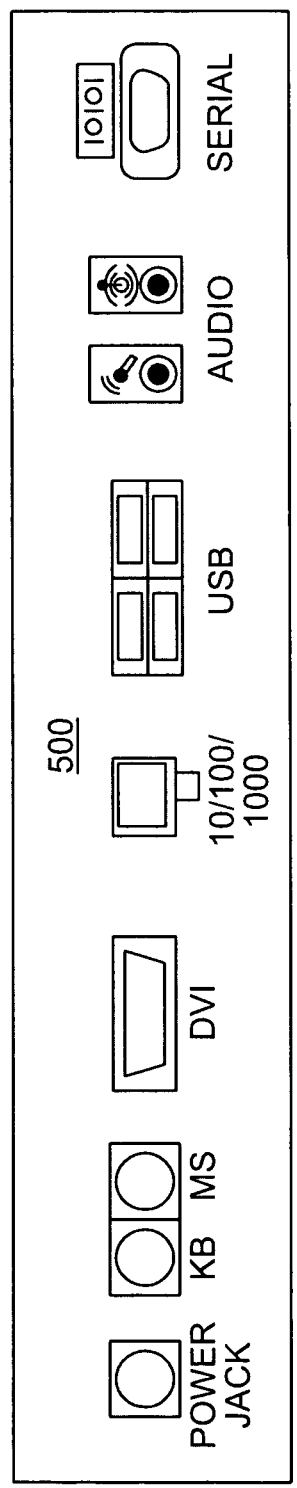
FIG. 4: an exemplary Digital-User Station interface panel.

An exemplary DUS 500 is shown in FIG. 3. Exemplary DUS 500 presents the following peripheral interfaces: a video connection (e.g. VGA and/or DVI), audio in/out connectors, PS/2 keyboard and mouse connectors, USB connectors for USB peripherals (e.g. keyboard, mouse, mass storage, and other USB peripherals), and a serial interface (e.g. RS232). FIG. 4 shows an exemplary DUS 500 panel illustrating interfaces.

For descriptive purposes, exemplary DUS 500 is shown as being comprised of three hardware functional blocks: peripheral interface hardware 510, media stream processing hardware 520, and network communications hardware 530. Each of the hardware functional blocks interacts with a software layer 540. DUS 500 also includes an on screen display (OSD) hardware 550 and universal asynchronous receiver/transmitter (UART) hardware 560. Using three functional blocks to describe DUS 500 is not intended to limit the ways in which a DUS 500 can be physically implemented.

Peripheral interface hardware 510 interfaces peripherals and media stream processing hardware 520. Peripheral interface hardware 510 converts data communicated between peripherals and media stream processing hardware 520. Peripheral interface hardware 510 includes USB controller 512, PS/2 interface 514, audio codec 516, VGA Transmitter 518, and DVI transmitter 519, each of which is described in greater detail with their respective media stream.

Media stream processing hardware 520 interfaces target device interface hardware 510 and network communication hardware 530. Media stream processing hardware 520 packetizes/depacketizes data communicated between target device interface hardware 420 and network communication hardware 430. Media stream processing hardware 520 includes a keyboard/mouse engine 522, a mass storage engine 524, an audio engine 526, and a video engine 528, each of which is described in greater detail with their respective media stream.

Network communications hardware 530 interfaces network 100 and media stream processing hardware 520. Network communication hardware 530 receives data packets from media stream processing hardware 520 and converts the data into a form compatible with network 100. Network communication hardware 530 also receives data from network 100 and converts it into a form compatible with media stream processing hardware 520. Network communications hardware 530 includes management port 532, network engine 534, and SSL/encryption engine 536, each of which is described in greater detail in accordance with FIGS. 5 and 6.

OSD hardware 550 provides a GUI that allows a local user to configure DUS 500.

UART 560 interfaces a serial port on DUS 500 and that allows data to be transferred to DUS 500. For example, a firmware upgrade of a DUS 500 can be accomplished by connecting a PC using XMODEM over a local RS232 port.

In the exemplary embodiment network communication hardware blocks 430 and 530 will transmit and receive up to four AES encrypted SSL/TPCIP streams. These streams are used to transport video, mass storage, audio, keyboard and mouse data between DUS 500 and DIP 400. The media stream processing hardware blocks 420 and 520 contains specific media processing hardware engines that source and sink data over the SSL/TCPIP streams. The four SSL streams shall be used as follows by the media processing engines:

Video—A dedicated SSL/TCPIP Port
Audio—A dedicated SSL/TCPIP Port
Keyboard & mouse—A dedicated SSL/TCPIP Port
Mass storage(vMedia)—A dedicated SSL/TCPIP Port The DUS 500 and DIP 400 require minimal software involvement to transfer the associated data streams. The hardware and software involvement in the data stream transport is described in greater detail below, in accordance the descriptions architecture and processing required for each media stream (video, mass storage, keyboard/mouse, audio). All other network communications go through the management ports 432 and 532.

Figure 5:
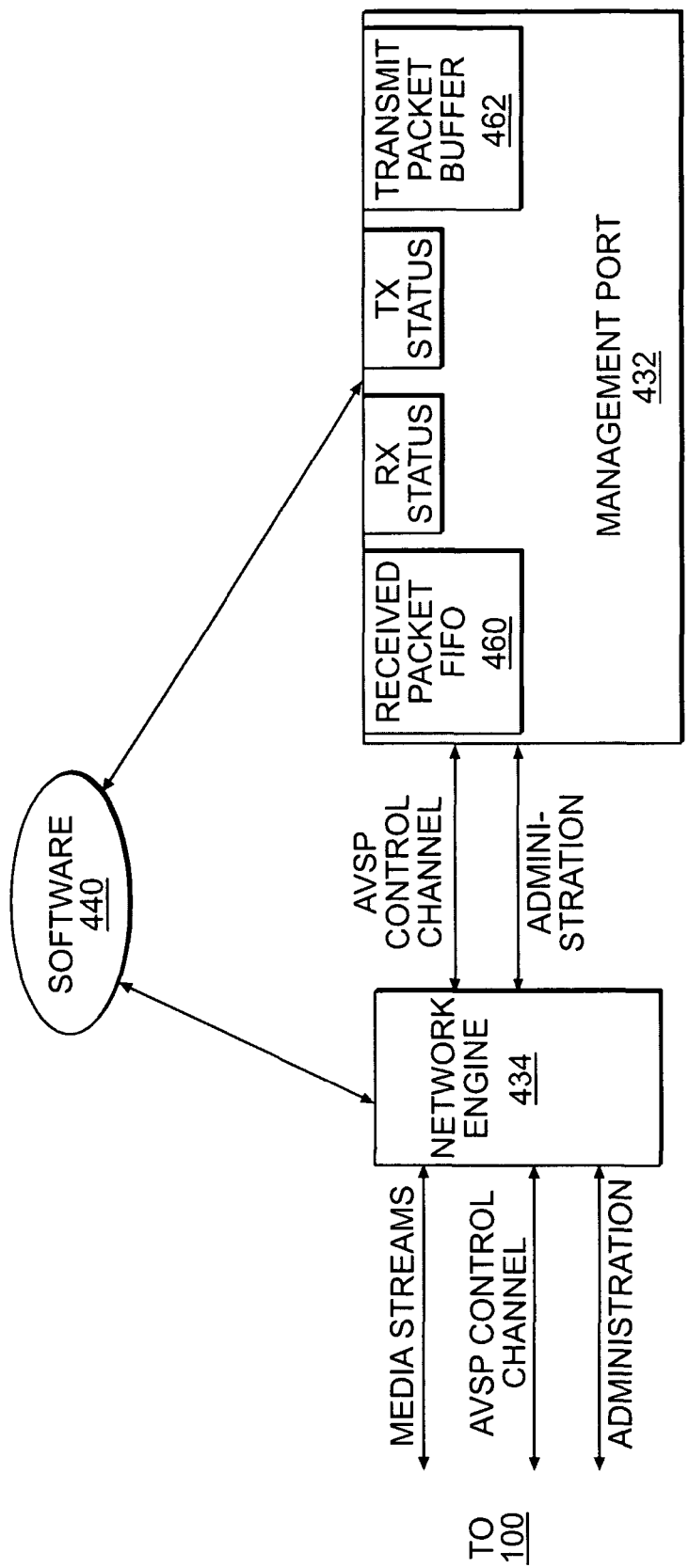
FIG. 5: exemplary management port architecture.
Figure 6:
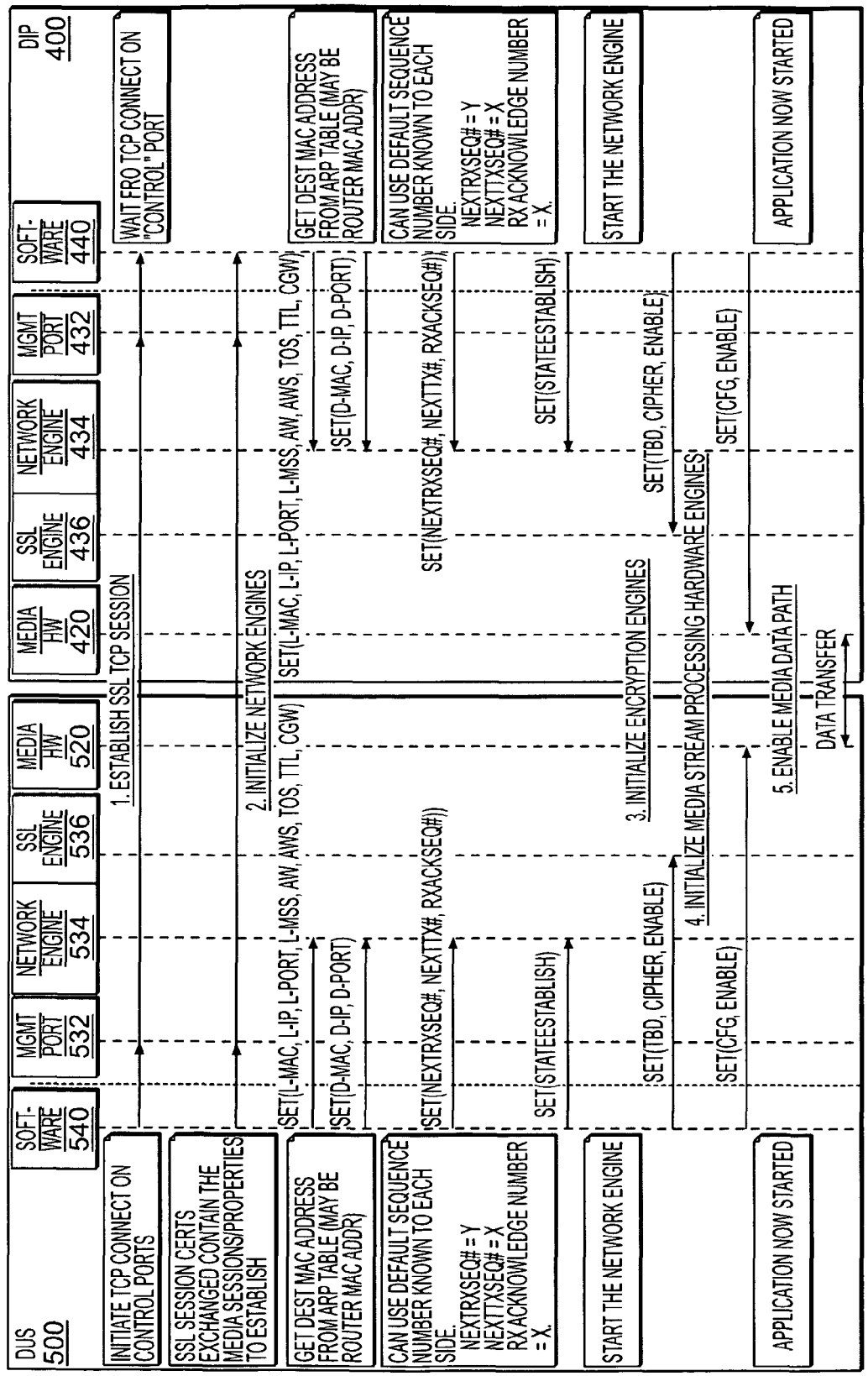
FIG. 6: an exemplary diagram illustrating a generic media session setup.
Figure 7:
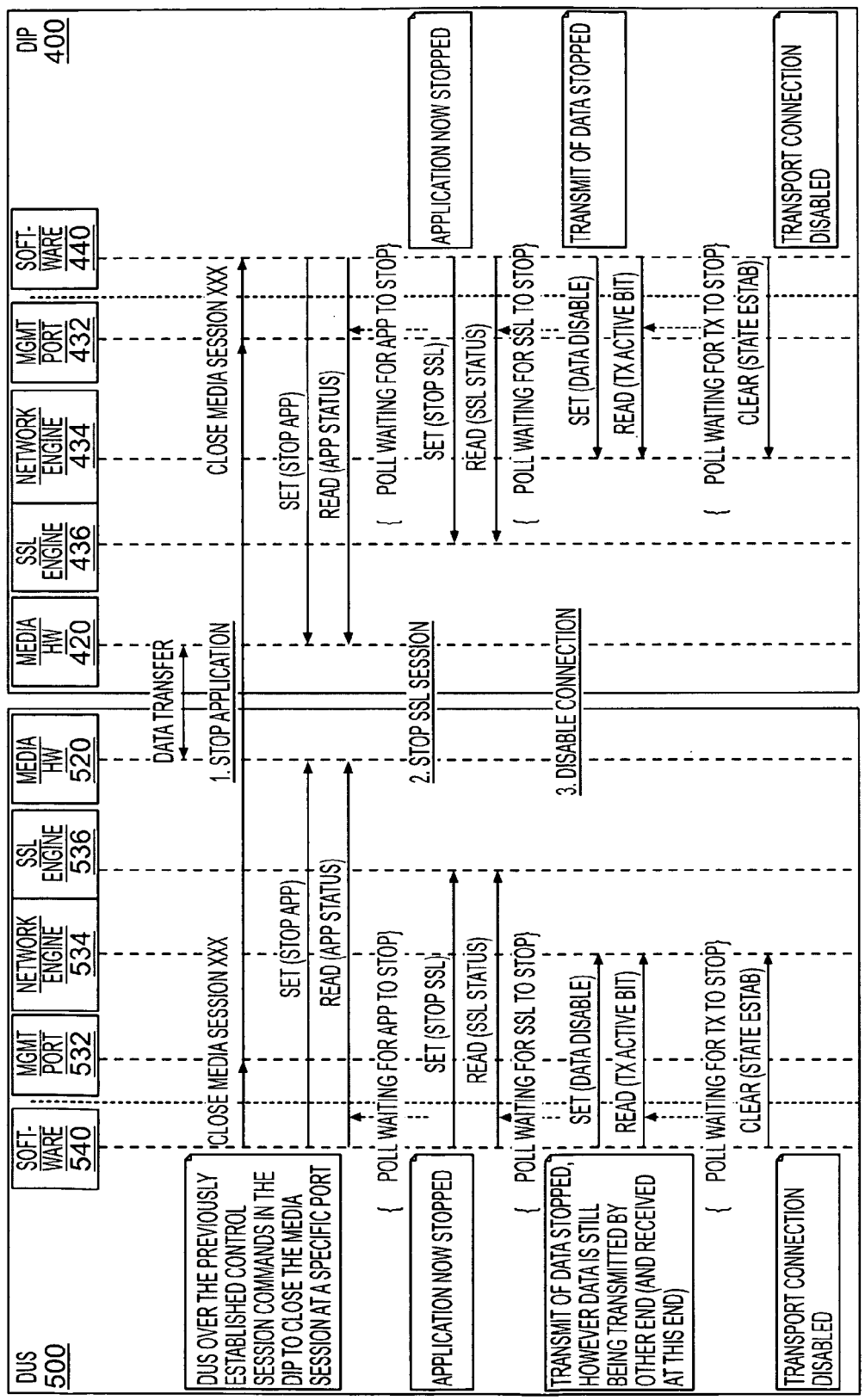
FIG. 7: an exemplary diagram illustrating a generic media session teardown.

The top level collaboration of software 440 and 540, media stream processing hardware 430 and 530 and network communication hardware components (i.e. management ports 432 and 532, network engines 434 and 534, and SSL engines 436 and 536) and the role they play in the establishment and teardown of a media transfer session (Video, Keyboard/Mouse, Audio, vMedia) for an initialized DIP/DUS pair is illustrated in FIGS. 5-7.

FIG. 5 illustrates an exemplary management port 432. The management port 432 presents a MAC level device interface to the software 440. All packets except those associated with TCP ports active on the network engine 434 are received by management port 432 and presented to software 440. The management port 432 has a receive packet FIFO buffer 460 and transmit packet buffer 462. In the exemplary embodiment, receive packet FIFO buffer 460 is an 8 Kbyte buffer and transmit packet buffer 462 is a 1.5 Kbyte buffer. All LAN packets addressed to the unicast MAC address programmed on the network engine 434 and broadcast IP and ARP packets are received and placed in the receive FIFO 460. Multicast packets are not received. A high watermark system will be used whereby if receive buffer 460 is filled over a specific percentage (e.g. 50%) all broadcast packets are discarded and counted until the receive buffer level reduces. If the receiver FIFO buffer 460 fills, unicast packets are also discarded and counted. Transmit buffer 462 stores packets that before they are transmitted to network 100. The management port 432 has little explicit configuration other than that packet reception can be enabled/disabled and can be configured to interrupt when a packet transmit is complete or when a packet is in the receive FIFO buffer 460. It should be noted that management port 532 is similar to management port 432 and for the sake of brevity is not described herein.

In the exemplary embodiment, software 440 and 540 creates a TCP control channel between a DUS 500 and a DIP 400, after which the network engines 434 and 534 are configured at each end (a TCP port for each media stream) and TCP data transfer commences abruptly on the media session TCP ports (no SYN or FIN phases in media session establishment or teardown).

The exemplary embodiment uses an Avocent (Huntsville, Ala.) commercially available AVSP protocol format. It should be noted that although the exemplary embodiment is described using AVSP, other protocols can be used. An AVSP control channel is used to establish the session. The AVSP session is used for control of media sessions using a small subset of the AVSP message set. The media (video, keyboard, mouse, etc) transfer messages of AVSP are not used in the exemplary embodiment, all media transfer flows through the network hardware engines 434 and 534 using the specific media transfer sessions. The network engines 434 and 534 are architected to provide efficient data transfer using TCPIP sessions. The establishment and teardown of the TCPIP sessions is achieved in cooperation with a software SSL/TCP stack. The control channel is used for out of band media session control and session monitoring. All messages on this link use the AVSP protocol format. The exemplary embodiment uses a small and extended subset of the available AVSP messages, it does not use the media/data transfer AVSP messages, and the hardware engines use their own protocol. The channel is used to exchange session control messages between the DUS 500 and DIP 400 (changing media session properties etc).

FIG. 6 illustrates the process that is used for establishment of a media session. As shown in FIG. 6, the process is described as consisting of the following five steps: (1) Establish SSL TCP Session; (2) Initialize Network Engines; (3) Initialize Encryption Engines; (4) Initialize Media Stream Processing Hardware Engines; and (5) Enable Media Data Path.

In the Establish SSL TCP Session step, the DUS 500 initiates the connection to the AVSP server port on the DIP 400 (e.g. port 2068) and establishes an AVSP SSL connection with the DIP 400. The exemplary system shall only allow one AVSP session on a DIP 400. The session is authenticated using the session certs on the DUS 500 and DIP 400. In the exemplary embodiment x.509 certification is used. The DUS 500 and DIP 400 exchange session certs. The DUS 500 SSL client verifies the x.509 certification provided by the DIP 400 as part of the SSL session creation. The DUS 500 starts the AVSP keep alive between DUS 500 and DIP 400.

After the SSL TCP session is established, the Initialize Network Engines step occurs. Network engines 434 and 534 need to be configured with MAC and IP addressing information as well has having the TCPIP windowing and general operating parameters configured. If exponential back off is required, then software 440 and 540 must set the timeout accordingly.

The following core communication parameters must be configured on the hardware network engines 434 and 534:

MAC Data

Source MAC (L-MAC): This is the MAC address of the appliance (i.e. DIP 400 or DUS 500). It is available in persistent storage of the appliance.

Dest. MAC (D-MAC): The address is retrieved from the ARP table of the software stack after the DUS-DIP AVSP control session is established. This may not necessarily be the MAC address of the partner appliance involved in the connection.

IP Data

Source IP Address (L-IP): Obtained through DHCP or via static configuration of the IP address information on the appliance.

Destination IP Address (D-IP): Provided to the Appliance in the Session Cert. for the connection.

TOS: Type of Service field, describing the quality of service requested by the sender. The byte is composed of:
  Precedence field (provides an indication of the priority): 0=normal, 1=priority, 2=immediate, 3=Flash, 4=Flash Override, 5=Critical, 6=Interwork Control, 7=Network Control. Recommend Setting to 5.
  Delay Bit: 0 indicates can be delayed, 1 cannot be delayed. Recommend setting to 1.
  Throughput Bit: 0=normal, 1=high, recommend setting to 1
  Reliable bit: specifies if a reliable sub network is required. 0=not, 1=yes, set to yes.
  TTL: Time to live. Number of Hops for IP packet, the following default value is recommended 255.

TCP Data

Port # (D-Port, L-Port): The following port numbers are recommended for the media transfer protocols:
  Video: 4459
  Audio: 4460
  Keyboard/Mouse: 4461
  Mass Storage: 4462

Max Segment Size (L-MSS): The largest block of data TCP will send to the other side. The recommended value for exemplary embodiment is 1460 bytes, the largest value that will keep each TCP transaction within one Ethernet packet so that the need to segment and reassemble the TCP packet is not required.

Advertised Window Size and Scale (AW and AWS): The size and scale of the TCP window that will be advertised to the other side. This effectively tells the other side of the connection how much data this unit can buffer and thus how much the other side can send. The optimum values can be determined through performance analysis of the system.

Congestion Window Size (CGW): If software 440 and 540 wishes to perform congestion control (the connection is frequently retransmitting packets and there may be congestion) it can use the "Congestion window size" to reduce the amount of data transmitted. When there is no congestion the congestion window is set to be the receivers' advertised window size. That is, a transmitter uses the receiver's advertised window to determine how much data to send. If it is determined that congestion is being experienced, the congestion window size can be reduced while congestion is being experienced, this reduces the window of data transmitted. A transmitter determines amount of data to transmit as being the smaller of the window advertised by the receiver and the local congestion window setting.

Retransmission Timeout Value: This value controls that retransmission and retransmission backoff. The retransmission timeout value is generally changed (using formula) based on the estimated Round Trip Time (RTT) for a connection. If variable retransmission timers and backoff are required, then software 440 and 540 needs to request the network engine 434 and 534 to calculate the RTT at intervals, and then use a smoothed average (SRTT) and the variance (RTTVAR) of the RTT samples to calculate a suitable timeout value as follows: Timeout=SRTT+4*RTTVAR.

Software 440 and 540 can also elect not to dynamically modify the timeout value, and set the retransmission timeout to a conservative value (possibly based on the initial value of RTT read) and maintain for the duration of the connection. This will be sufficient in well defined and controlled networks.

In addition to setting the parameters described above, software 440 and 540 needs to do the SYN transactions to establish the TCPIP session, and then transfer the sequence numbers (NextRxSeq#, NextTx#, and RxAckSeq#) to the network engine 434 and 534 for the data transfer.

After the network engines 434 and 534 are initialized, the Initialize Encryption Engine step occurs. DIP 400 and DUS 500 initialize the encryption engines 436 and 536 associated with each media stream that is enabled in the session cert. The encryption engines 436 and 536 encrypt and decrypt data transported by the TCPIP network engines 434 and 534. The engines 436 and 536 use 128 bit AES encryption on the media streams. The engine 436 and 536 will be used to encrypt video, mass storage, keyboard and mouse streams. The encryption must be configured with the 128 bit cipher key. This cipher key obtained as a result of the creation of the DUS-DIP AVSP control session SSL connection is used to seed the encryption of each media session. Thus, the key required to seed the SLL hardware encryption engines 436 and 536 is the same key that was generated after software SSL session negotiation. This guarantees that the key changes with each new connection.

After encryption engines 436 and 536 are initialized, the Initialize Media Stream Processing Hardware Engines step occurs. The DIP 400 and DUS 500 initialize the media application engines within media stream processing hardware 420 and 520. The DIP 400 and DUS 500 respective media engines (e.g. video processing engines 428 and 528) "tunnel" application specific control, setup, and session management data (known sequence numbers) through the AVSP control channel to enable setup to the specific media stream.

Once the respective media engines are initialized, The Enable Media Data Path step occurs. A connection is established between DUS 500 and DIP 400 and data streams are transferred by the hardware TCP "lite" engine called TOE- Lite. The "lite" is used to refer to some basic optimizations made on the network engines 434 and 534 due to the fact that the system is optimized to run over a LAN.

On connection establishment, an external observer will see the media carrying TCP sessions start by transferring data without a TCPIP setup (SYN) or teardown (FIN) stage. Transferring data without a SYN or FIN stage will be tolerated by layer 3 switches and routers. However, going through layer 4 aware equipment like firewalls is an issue unless the specific ports are opened up on the firewall. The system of the exemplary embodiment will use fixed port numbers for each media stream on the DUS 500 and DIP 400, this way the specific ports can be opened on firewalls. The exemplary embodiment only uses the facility to enable keyboard, Mouse and vMedia session control entities on the DUS 500 and DIP 400 and to pass descriptors between the DUS 500 and DIP 400. However, it is available should other media applications require specific DUS-DIP communications.

FIG. 7 illustrates the process that is used for the teardown of a media session. As shown in FIG. 7, the process is described as consisting of the following three steps: (1) Stop Application; (2) Stop SSL Session; and (3) Disable connection. Software 540 initiates the FIN transactions to tear down the TCP session, again extracting the sequence number from the network engines 434 and 534. To the outside world the TCPIP session looks like one seamless session.

In FIG. 7, the Stop Application Step involves DUS 500 commanding DIP 400 to close a specific media session its specified port. After the application is stopped, the SSL session is stopped at the Stop SSL Session step. After the SSL session is stopped, that is transmission of data is stopped, the Disable connection, step disables the transport connection.

FIGS. 8-13 illustrate operation of DUS 500 and DIP 400 for each specific media stream.

Figure 8:
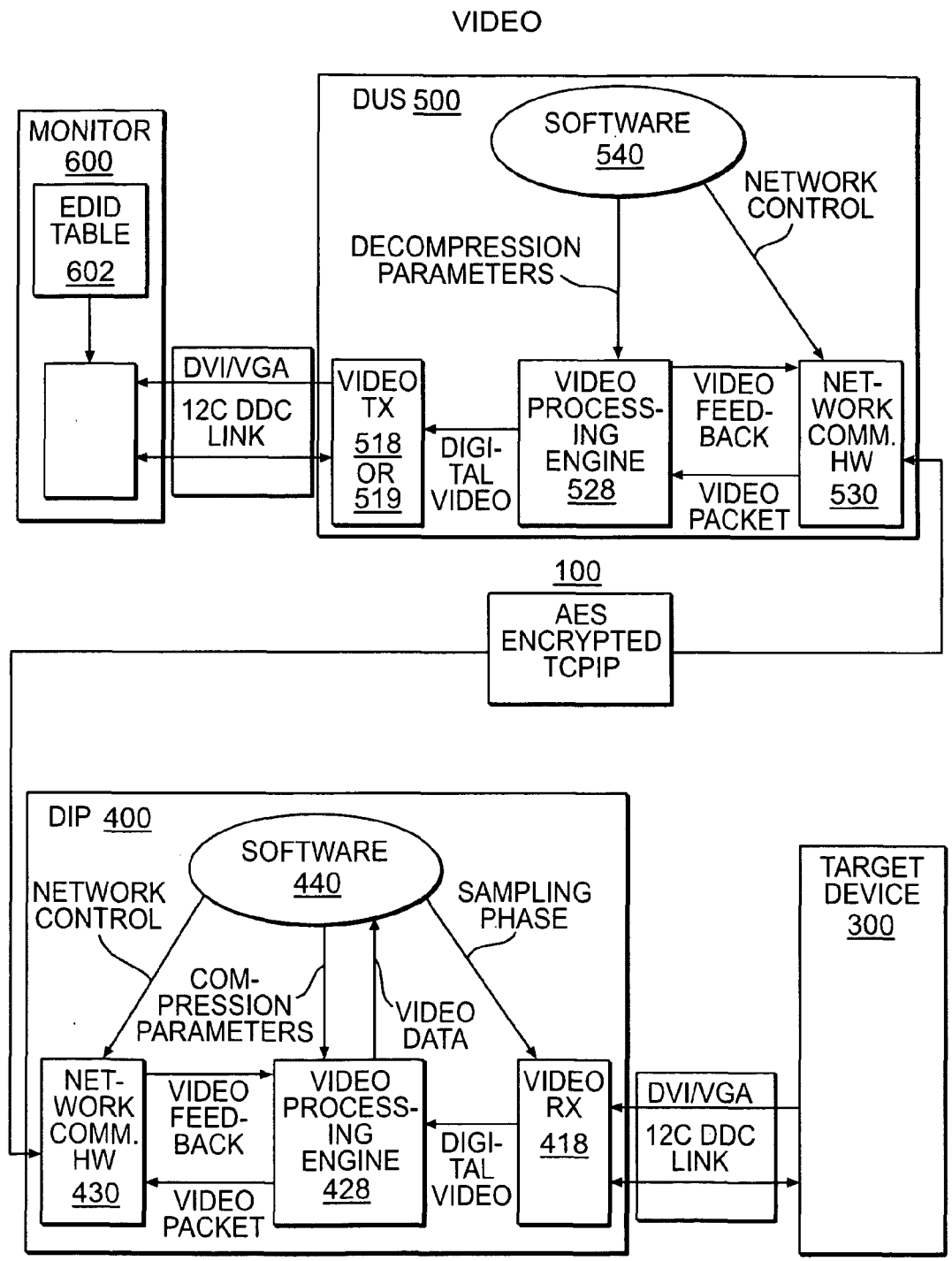
FIG. 8: an exemplary diagram illustrating components used with a video media stream.

The system components and behavior with respect to a video media stream are illustrated in FIG. 8.

DIP 400 presents a video interface to a target device 300. In the exemplary embodiment the video interface is a DVI-I interface. However, the video interface is not limited to a DVI-I interface and can include any number of video interfaces, including analog (e.g. component video, S-video, etc.) and digital interfaces or combinations thereof. The interface is connected to video receiver 418. Exemplary video receiver 418 is a DVI/VGA(RGB) video receiver capable of receiving both DVI and VGA-video data. Video receiver 418 can be adapted to receive various types of analog or digital video data.

On target device 300 power-up, target device 300 uses DDC to read the EDID table on the DIP 400. The DIP 400 has a hard-coded EDID table advertising the capabilities of the system.

Video receiver 418 can receive RGB video and supports resolutions up to at least 1280×1024 @ 75 Hz. When video receiver 418 receives RGB or another type of analog video, video receiver 418 will digitize the video and forward it to the video processing engine 428. Software 440 configures video receiver 418 by specifying the optimum sampling of the VGA input signal (sampling phase). Software 440 adjusts the phase of the sampling clock used by the video receiver 418 to optimize the sampling of the analog input. It does this by continuously adjusting the phasing and looking at the data reported by the video engine 428 to get the optimum setting.

When DIP 400 presents a DVI-I connector to a target device 300, the DVI I2C DDC interface is routed so that the serial interface is made available to software 440 for processing of DDC requests from the target device 300.

The video receiver 418 can automatically detect the active input interface. For example, when DVI-I is used, video receiver 418 can automatically detect if RGB or digital DVI is being received. When receiving VGA, video receiver 418 needs to be adjusted by software 440 to align the clocking "phase." Software 440 does this by monitoring data made available by the video engine 428 and configuring the video receiver 418, then monitoring the data available by the video engine 428. This cycle is repeated until the optimum setting is reached.

Software 440 determines when a video source is detected by the video receiver 418, identifies the source, and then informs the video processing engine 428. Video processing engine 428 receives video from the video receiver 418 and prepares the video for the network communications hardware 430 by encoding the digital video.

Video processing engine 428 is configured by software 440. When the video processing engine 428 receives digitized video it makes available a number of observed/measured video characterizing data in its registers. Software 440 reads this data and based on pre-configured ranges deduces the VESA Video operating mode (table lookup for resolution, settings, etc.) after which it programs the video processing engine 428 for the chosen video mode.

In the exemplary embodiment, video processing engine 428 compresses the video by using a scheme based on the directional algorithm concepts previously developed with some newly added enhancements to compress frames of video. Its specific application is to reduce the bandwidth used in transmitting a video frame buffer across an Ethernet LAN. Video processing engine 428 uses the compression algorithm to create video packets.

The key to the algorithm is that each side of the link has a version of the previous frame to use as a reference. This allows each pixel in subsequent frames to be defined in one of the following several ways:

1. No change from pixel in previous frame (NO_CHANGE)
2. Same as pixel in line above (COPY_ABOVE)
3. Same as pixel as immediately to the left (COPY_LEFT)
4. Series of pixels from a preceding known subset (MAKE_SERIES)
5. Make new pixel (NEW_PIXEL or MAKE_PIXEL)
6. Delta from the same pixel in the previous frame (DELTA_NC)
7. Delta from the pixel immediately above (DELTA_CA)
8. Delta from the pixel immediately preceding to the left (DELTA_CL)
9. Short Delta from the same pixel in the previous frame (Short_Delta_NC)
10. Short Delta from the pixel immediately preceding (Short_Delta_CL)
11. Make Pixel using fewer bits (Short_Make_Pixel)

The compression algorithm is described in greater detail in co-pending U.S. application Ser. No. 11/707,879, entitled "Video Compression Algorithm" filed Feb. 20, 2007.

In the exemplary embodiment when video processing engine 428 compresses video, software 440 configures video processing engine 428 by specifying the following parameters: video mode (resolution) when VGA is used, the # of Intermediate frames used for color depth (range 0 to 7), the color depth on the reference and intermediate frames. (9, 12, 15, 18, 21, 24 bit color), the watermark for latency between DIP 400 and DUS 500 for frame dropping in units of 256 lines, the max frame rate expressed as a ratio with respect to the frame rate being received from the video receiver 418. Frame dropping can be set to drop all frames, drop every second frame (take a 60 fps video stream to a 30 fps video stream), or 1 in every 3 frames (takes a 60 fps stream to a 40 fps stream).

The video processing engine 428 compresses the video based on parameters set by software 440 and feedback from DUS 500. The compressed video is forwarded to network communication hardware 430 where network communication hardware 430 prepares compressed video for transmission over the IP network 100 to DUS 500.

The DUS 500 presents a video connector for connection to a monitor 600. The DUS 500 can present any appropriate video connector (e.g. component, S-video, DVI, VGA, etc.). In the exemplary embodiment, DUS 500 presents a DVI-I connector to a monitor 600. When the DUS 500 presents a DVI-I connector to a monitor 600, a VGA-to-DVI-I adaptor may be required depending on the cable available with the monitor 600. Further, when DUS 500 presents a DVI-I connection to a monitor 600. The I2C DDC channel on the DVI connector is presented to software 540 so it can query the monitor 600 for its EDID table. The DUS 500 on power-up reads the monitor 600 EDID table. If monitor 600 cannot support the full capabilities as advertised by the DIP 400 to the target device 300, a warning message is presented on the monitor 600.

Video engine 528 processes video data received over the IP network 100 and forwards it to the appropriate video transmitters 518 and/or 519 (depending on the video connector). Software 540 will need to configure the video engine 528 with the video mode (resolution) being used when VGA is used. The DIP 400 will inform the DUS 500 using an in-band command. On notification of the mode, software 540 looks up a table to find the setting associated with the mode. In the exemplary embodiment, software 540 will also specify the # of intermediate frames used for color depth (range 0 to 7), and the color depth on the reference and intermediate frames (9, 12, 15, 18, 21, 24 bit color) to video processing engine 528.

The DVI transmitter 519 receives digital video from video processing engine 528 and encodes and transmits the data on the DVI link to a monitor 600 without requiring involvement or any explicit configuration from software 540.

The RBG/VGA transmitter 518 receives digital video from video processing engine 528 and converts to RGB format for transmission to an attached monitor 600 without requiring involvement or any explicit configuration from software 540. DVI-I interface used in the exemplary embodiment supports H and V sync. In alternative embodiments sync on green is can also be supported.

Video packets created by video processing engine 428 are encapsulated in SSL/TCP packets of a fixed size for transmission across the network 100. Using fixed size packets enables the hardware based TCP transport engine 434 to be optimized to retransmit on a TCP packet basis rather than on a pure byte stream basis, thereby by maintaining a consistent bounded video frame received by video processing engine 528 without the need to manage byte stream re-transmit and associated packet reassembly in hardware.

TCP will guarantee the delivery of video packets in the correct order to video processing engine 528. Video processing engine 528 generates an explicit acknowledgement for each video packet received. The acknowledgement contains the current Frame# and Line# received by the video processing engine 528 for processing.

The acknowledgement is sent across network 100 to video processing engine 428. The DIP 400 is the controlling source for video flow control. An important aspect is to monitor the video latency across the system and adjust the video frame rate to the DUS 500 to maintain an acceptable latency. The DUS 500 displays all video frames sent to it. Video processing engine 428 uses the acknowledgment to understand how many lines the video receiver 418 is behind the video transmitter 518 or 519, this is a measure of the latency of the video between the video processing engine 528 and the video processing engine 428, and is a measure of the latency caused by each ends' encryption/TCP transport stack and network link. The DIP 400 monitors the Frame# and line# within the frame being processed by the DUS 500 with respect to the current Frame# and line# being processed by it. If these exceed specific thresholds the DIP 400 reduces the Frame rate to the DUS 500.

When the latency difference between the line being processed by the DUS video processing engine 528 and the line being processed by the DIP video processing engine 428 is greater than a configurable watermark then a frame will be dropped by DIP video processing engine 428, effectively reducing the frame rate until the latency is below the defined watermark. This mechanism minimizes the latency on the DIP-DUS video path which is important for mouse performance.

Software 440 can configure the color depth to be used by video processing engine 428 to manage the video experience and associated network bandwidth. The management of bandwidth is maximized by the use of reference and intermediate frames from the perspective of color depth, where software 440 can specify a number of frames (intermediate frames) between core references frames that carry a specified lower color depth.

When receiving VGA video, software 440 needs to monitor specific network engine data 434, and use it to deduce the video VESA mode settings from a table and then program video processing engine 428.

On setting the VESA mode in video processing engine 428, the video processing engine 428 sends an in-band video mode command to the DUS 500 informing it of the mode change. The DUS software 540 will read the mode change event, lookup the mode data, and program the DUS video processing engine 528 accordingly.

Figure 9:
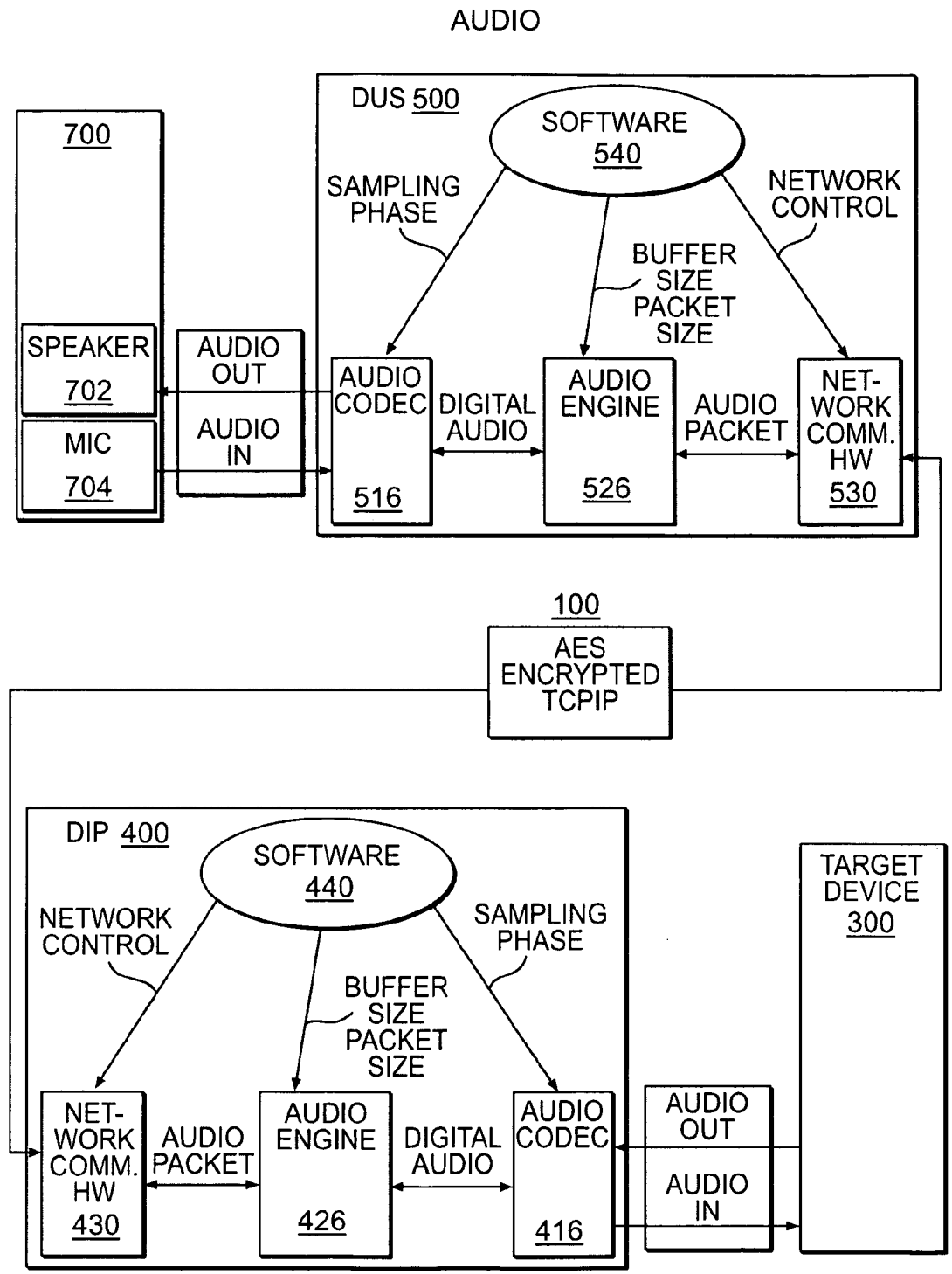
FIG. 9: an exemplary diagram illustrating components used with a audio media stream.

The system components and behavior with respect to an audio media stream are illustrated in FIG. 9.

DIP 400 presents audio connectors to a target device 300. In the exemplary embodiment the audio connector comprises a stereo connector (e.g. a 3.5 mm mini jack, a pair of RCA jacks, etc.) for audio output from target device 300 and a mono connector (e.g. a 3.5 mm mini jack or an RCA jack) for audio input to target device 300. The audio connectors present audio signals output from target device 300 to audio codec 416 and receives audio signals to be input to the target device 300. Audio codec 416 uses a basic linear quantization scheme to convert analog audio out signals into digital signals and forwards the digital signals to audio engine 426. Audio codec 416 also receives digital signals from audio engine 426. Audio codec 416 stores received digital signals in a playout buffer and converts the digital signals to analog signals which are presented to target device 300. In the exemplary embodiment, audio engine 426 and audio codec 416 are FPGA based.

DUS 500 presents audio ports to an audio peripheral 700. In the exemplary embodiment the audio ports comprises a stereo port (e.g. a 3.5 mm mini port, a pair of RCA ports, etc.) for a pair of speakers 702 and a mono port (e.g. a 3.5 mm mini jack or an RCA jack) for a microphone 704 or an audio input device. Audio codec 516 uses the audio ports to present audio signals to speakers 702 and receive audio signals from microphone 704. Audio codec 516 uses a basic linear quantization scheme to convert analog audio signals from microphone 704 into digital signals and forwards the digital signals to audio engine 526. Audio codec 516 also receives digital signals from audio engine 526. Audio codec stores the received digital signals in a playout buffer and convert the digital signals to analog signals which are presented to speakers 702. In the exemplary embodiment audio engine 526 and audio codec 516 are FPGA based.

In the exemplary embodiment, the system provides two 44.1 KHz sampled 16-bit channels (stereo) from a target device 300 to an audio peripheral 700 and a single 44.1 KHz sampled 16-bit channel from the audio peripheral 700 to the target device 300 (i.e. mono only transport). A 44.1 KHz sampling rate will provide transport of audio signals with frequency components up to 22 KHz. Because the audio peripheral 700 to target device 300 transport is a single channel, stereo microphones plugged into DUS 500 will result in transmission of a single channel to DIP 400, where the same signal is sent on each of the two channels to target device 300.

Audio engine 426 and 526 transmit and receive digitized audio over the IP network 100 using a system specific audio packet format. A transmit side takes the digitized audio stream from its codec, constructs an audio packet and forwards it to its network engine for transmission over the TCP link. The receiver side obtains the audio packets from its network engine and adds the data to the playout (jitter) buffer. The playout buffer makes a stream of samples available to its audio codec which converts the sample to analog form and plays out the audio. The audio packets transmitted on network 100 will have a structure that enables the transport of specified number of samples for up to two channels in a single packet.

It should be noted that although exemplary DIP 400 is described as receiving two audio channels from target device 300, such a description is for exemplary purposes only and is not intended to limit the number of audio channels DIP 400 can receive. DIP 400 can receive any number of audio channels (e.g. 5, 6, or 7 as used in surround sound systems). Likewise, DIP 400 can have multiple audio input channels. Further, although DIP 400 is described as sending/receiving analog audio signals to/from a target device 300, DIP 400 can be configured to receive digital audio signals and combinations of digital and analog audio signals.

Management of the playout buffer to accommodate variances in the received packet interval (network jitter) is vital to quality playout. The algorithm shall work in principle as follows.

After the connection is established, the receiver will commence playout of audio samples when it has the playout buffer 50% full. This enables the receiver to tolerate variances in the received audio samples of plus or minus the number of samples that are contained in 50% of the playout buffer.

If the playout buffer depletes, the previous sample is replayed until the next sample arrives. If the playout buffer is full, the playout recommences at the center of the playout buffer (the playout is reset to center of the playout buffer again).

To mitigate against having to take such abrupt actions that may result in an audible interference, the playout buffer has low and high water marks, set at 20% and 80% respectively. If the playout buffer goes below the 20% mark each sample is played out twice, until the buffer fills above 20% after which normal sample playout recommences. If the playout buffer goes above 80% every second sample is discarded until the buffer goes below 80% after which normal playout re-commences.

DVD playout requires the audio playout to be within plus or minus 80 ms of the video to maintain lip sync. The exemplary system takes no explicit action to attempt to keep audio and video in sync as the processing of network latencies are such that lip sync should be maintained. However, a mechanism can be added in alternative embodiments.

The performance of the audio streaming connection is primarily a function of the audio packet size, variance in network latency, and playout buffer (jitter) size. The playout buffer size can be configured on an audio engine to accommodate 10 ms to 250 ms network jitter. An audio engine shall send 5 ms of audio for two streams in each packet. This is the minimum packet size to effectively operate with a 10 ms jitter buffer. The size of the audio packet determines the granularity of the jitter experienced by the receiver, the larger the packet the greater the efficiency of the transmission. However, there is also an increase in the impact to the audio quality due to changes in packet latency due to packet loss or congestion in the network 100.

To contain 5 ms of audio, an audio packet will need to be capable of carrying 882 bytes of raw sample data (excluding audio packet header, TCP, IP, and Ethernet headers). The playout buffer (jitter) size can be modified under software control. The buffer sizes required at the receiver to accommodate network jitter in the 10 to 250 ms range will be between 1764 bytes and 88200 bytes.

Playout buffer sizes for the exemplary embodiment can be calculated as follows:

44100×2 bytes=88200 bytes per second (88.2 bytes per ms) digitized audio stream. Stereo has two streams providing a total of 176.4 bytes per ms of audio.

5 ms of Audio=5×176.4=882 bytes

To accommodate +−10 ms network jitter, will require a buffer of 1764 bytes×2=3528 bytes.

To accommodate +−250 ms network jitter, will require a buffer of 44100 bytes×2=88200 bytes.

The system components and behavior with respect to a keyboard & mouse media stream and a mass storage media stream are illustrated in FIGS. 10-13.

Figure 10:
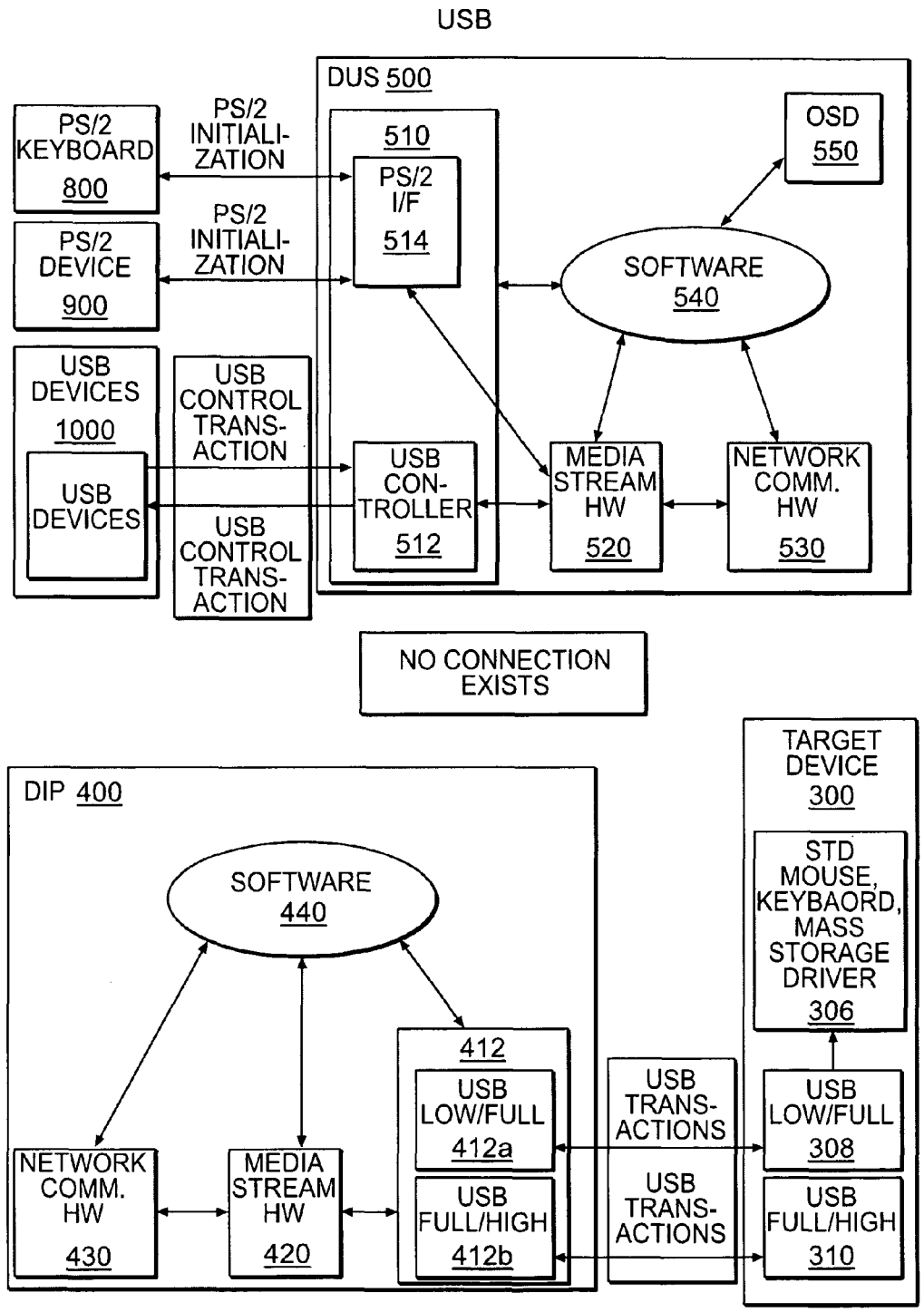
FIG. 10: an exemplary diagram illustrating components used with a USB and PS/2 peripherals at power up (no connection)

FIG. 10 illustrates the behavior on powerup of DUS 500 and DIP 400 before a connection between DUS 500 and DIP 400 is established.

DIP 400 presents a low/full speed capable USB port 412a and a full/high speed capable USB port to a target device 300. In the exemplary embodiment, the DIP/target device interface 412 is comprised of two peripheral controllers: low/full speed capable USB port 412a and a full/high speed capable USB port 412b.

The DIP 400 on power-up enumerates to a target device 300. Port 412a enumerates itself to a target device 300 as a composite USB device containing the following: a keyboard device with one interrupt endpoint for traffic from the keyboard that will provide a report descriptor describing a standard keyboard report format and a mouse device with one interrupt endpoint for traffic from the mouse that will provide a report descriptor describing a standard mouse report format. Port 412b enumerates itself to a target device as a mass storage device, using bulk only transport class with a subclass of "Transparent SCSI" command blocks. Target device 300 will load its standard keyboard, mouse and mass storage device drivers in response to this enumeration. The DIP 400 must be able power up and be in a state to let the target device 300 know that a keyboard is present before the target device 300 determines that it cannot see a keyboard.

The DUS 500 presents the following peripheral ports: a PS/2 mouse, PS/2 keyboard, and four USB ports where each USB port will accept low, full, or high speed USB peripherals.

The USB ports of DUS 500 interface a USB controller 512. USB controller 512 can be a commercial off-the-shelf host controller capable of low, full, and high speeds. In the exemplary embodiment, the USB ports will be four USB type-A connectors. However, another number or other types of USB connectors can also be used. In the exemplary embodiment, controller 512 is required at a minimum to be capable of simultaneously supporting three low/full speed devices and one high speed device. The USB driver implementation can be simplify by not supporting split USB transfers. This will mean that a high speed hub cannot be used to connect low/full speed devices to the DUS 500. The PS/2 ports of DUS 500 interface PS/2 interface 514. The PS/2 interface 514 can be implemented using a standard FPGA PS/2 implementation.

The DUS 500 on powerup will enumerate attached USB devices 1000 and initialize attached PS/2 keyboard 800 and mouse 900 peripherals. Devices 1000 are also enumerated on insertion post powerup. DUS 500 assigns an address to the device 1000 and reads its descriptors to identify and configure itself for the specific device.

Standard "keyboard/mouse" report descriptors are stored (hard coded) on the DUS 500 to be made available to the DIP 400 when a connection is established. PS/2 keyboard/mouse commands are translated to USB format on DUS 500.

Keyboard and Mouse data is made available to the OSD 550 when activated. When an OSD 550 is not activated all received keyboard and mouse data is discarded until a connection is established.

From the target device 300 perspective there is no mass storage device attached until a connection is made between DIP 400 and DUS 500. This way DIP 400 does not have to dummy SCSI responses to the target device 300 until a connection is established. Because on making a connection the target device 300 is forced to re-enumerate, it will re-issue the keyboard status on enumeration. LED and Caps lock settings or data packets for a keyboard or mouse sent from the target device 300 will not need to be stored for sending to the DUS 500 when the connection is made.

USB peripherals 1000 can be inserted into any one of the USB ports including low/full speed HUBs 412a. When DUS USB driver is not capable of handling split speed transactions (i.e. a mix of low/full and High speed devices can be inserted into the Hub, which will need to share one High speed link to the DUS), the insertion of high speed USB HUBs will not be available. For simplicity, support for HUBs on the DUS 500 can be excluded.

Figure 11:
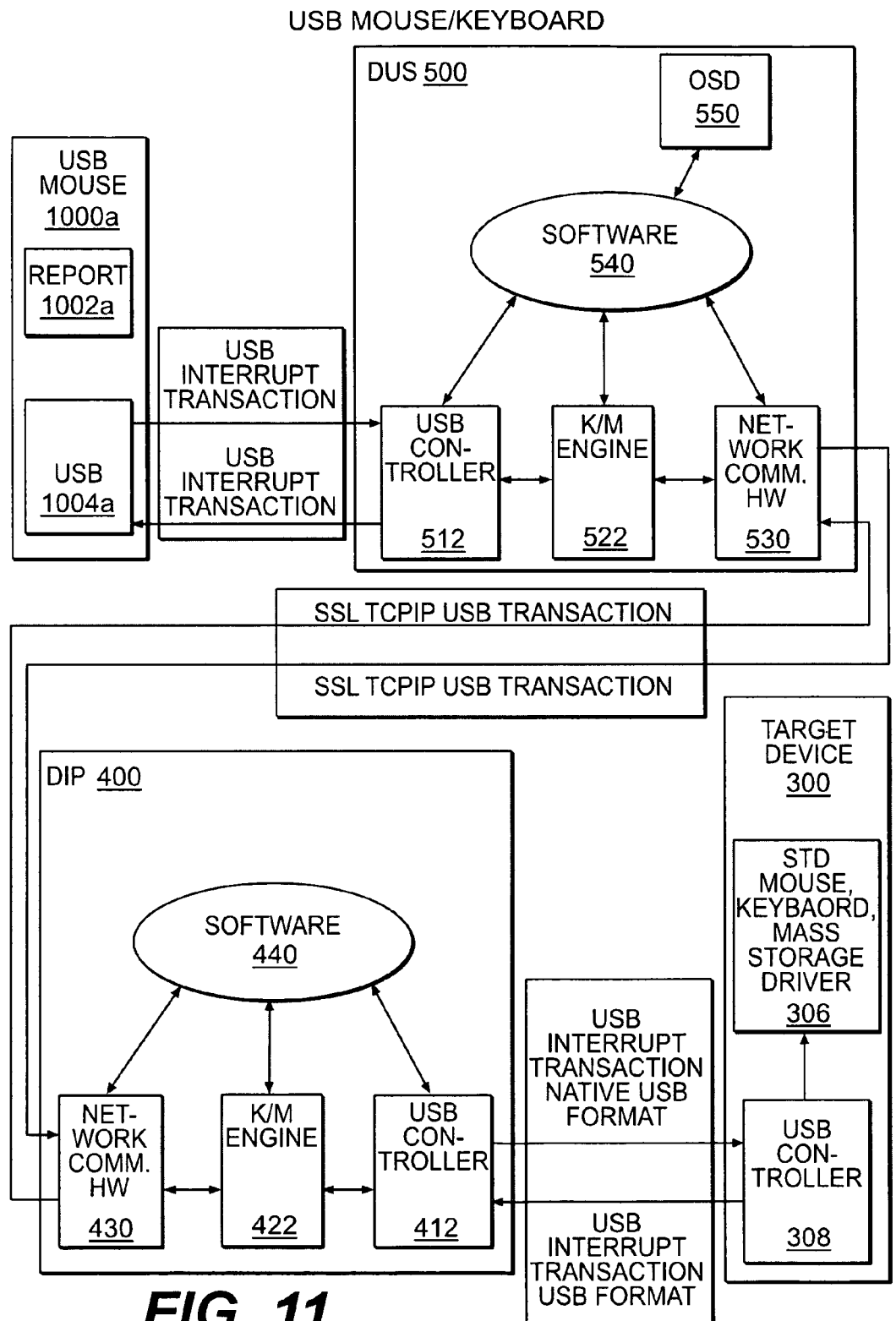
FIG. 11: an exemplary diagram illustrating components used with a USB Keyboard and Mouse media stream.

The exemplary system behavior with respect to USB Keyboard and Mouse connection control and data flow is illustrated in FIG. 11.

Before establishing a USB keyboard and mouse session the following conditions must be satisfied: DUS 500 and DIP 400 have been powered up, a USB keyboard and mouse have been enumerated by DUS 500, DUS 500 has established the AVSP control session with DIP 400, the network engines 434 and 534 have been enabled, and the keyboard and mouse session has been enabled on the session cert.

The DUS 500 sends the native report descriptors 904 for the enumerated keyboard and mouse to the DIP 400 over SSL/TCPIP using an extended AVSP command. Software 550 manages the transfer of keyboard and mouse data from USB controller 512 to network communication hardware 530. Implementations may choose to transfer the actual keyboard and mouse reports with software 550.

The DIP 400 receives the report descriptor 904 and forces re-enumeration of the composite keyboard & mouse USB port 308, reporting the new report descriptor to target device 300 in the enumeration. This will ensure that the native peripheral keyboard or mouse reports can be transported from a peripheral to target devices 300 without translation. This minimizes the processing of keyboard and mouse data, and can facilitate hardware to assist in the implementation. Other than control of the session software 440 is not involved in keyboard and mouse report transfer. Power is not removed from the peripheral 900 when the DIP 400 forces the target device 300 to re-enumerate after a connection is established. This means that it is feasible to transfer device or report 904 from the DUS 500 and report to the target device 300 by the DIP 400 by the time of connection establishment. It also means that the second port (first port has keyboard, mouse, mass storage) can be used for generic HID devices that use the keyboard and mouse protocol, enabling the correct driver to be loaded on the target device 300.

The DIP 400 having completed enumeration enables the keyboard and mouse data path. The DIP 400 will need to send the keyboard settings sent by target device 300 to DUS 500, so that the DUS 500 can initialize the keyboard LEDs, Cap Lock, Num Lock, etc. settings to be consistent with target device 300. The DUS 500 on receiving acknowledgement from DIP 400 of enumeration completion enables its keyboard and mouse path. Keyboard and mouse data now to flows between peripherals and the target device 300.

If a keyboard or mouse was not inserted on the DIP 400 prior to a DUS-DIP connection being made, the peripherals are enumerated on insertion and the sequence described above is followed once the report descriptors 904 are known to DUS 500. Removal of a keyboard or mouse does not result in an interaction with the DIP 400, it simply sees no keyboard or mouse data. The DIP 400 only re-enumerates as described when a device is inserted. The DUS 500 monitors each key stroke for the OSD activation key sequence. When the OSD activation key sequence is detected, the OSD 550 is activated and all keyboard and mouse traffic received from peripherals on the DUS 500 is directed to the OSD 550. When OSD 550 is dismissed, keyboard and mouse data flow on the DUS 500 is re-enabled.

DUS USB controller 512 must poll the device at the advertised rate. Typically max rate of every 8 ms for mouse/keyboard=125 transactions per second. Target device USB controller 308 must poll mouse and keyboard endpoints at the advertised rate. For example, 8 ms for mouse and 10 ms for keyboard may be advertised so as to never get a build up of packets. Alternatively a rate reported by the peripheral 900 to the DUS 500, can be advertised.

The USB keyboard report modifier byte can be scanned by hardware to detect active modifier key presses. An implementation may choose to implement this functionality in hardware for efficiency. OSD hot keys on the system can be one or more of the available modifier keys (shift, ctrl, etc.) pressed two times in sequence.

It is critical that the latency in sending mouse reports 904 from the peripheral 900 to the target device 300 is minimized to optimize the mouse latency as observed by the DUS 500 user. Reducing software involved in the mouse 900 to target device 300 path will greatly reduce the latency in this direction.

However, there is a natural latency introduced by virtue of the USB interrupt transfer device polling mechanism. A typical USB mouse attached to a PC could see the worst case up to 8 to 10 ms (assuming 8 or 10 ms polling of mouse by PC) latency from peripheral to PC. When the present system is added to the path the following latency is added to the peripheral to PC path: latency in DUS 500 (<1 ms worst case), latency in network 100 (assume <0.5 ms worst case), latency in DIP 400 (<1 ms worst case), and target device 300 to DIP 400 polling interval (worst case 8 to 10 ms).

Thus, the overall worst case latency of 12.5 ms is added, assuming DIP 400 is advertising a 10 ms poll interval. The latency in the video path from target device 300 to monitor 600 needs to be added to get the overall round trip mouse latency.

The number of video frames per second affects mouse performance. As described in accordance with FIG. 8, video engine 428 contains an algorithm to automatically adjust the frames per second if the latency between the DUS 500 and DIP 400 exceed a specific value. A monitor 600 connected directly to a target device 300 using 60 frames per second, means a frame is updated every 16.66 ms. There could be a worst case latency of 16.66 ms from the time a target device 300 updating the mouse on the video and the video being displayed on the monitor.

When the present system is added to the path the following add example latency to the target device 300 to monitor 300 path: latency in DIP 400 (<1 ms worst case), latency in network 100 (assuming 60 fps through network <0.5 ms worst case), latency in DUS 500 (<1 ms worst case), DIP 400 to target device video based on 60 Hz monitor display, (worst case <=16.66 ms). Thus, the overall worst case additional latency on target device 300 to DUS 500 path is approximately 19 ms assuming video at 60 fps.

An overall worst case round trip delay added by the present system is 31.5 ms. This is: peripheral 900 to target device 300 path (worst case 12.5 ms)+target device 300 to peripheral 900 path (worst case 19 ms).

An overall average round trip delay added by the present system is 18 ms. That is: peripheral 900 to target device 300 path (average 7 ms)+target device 300 to peripheral 900 path (average 11 ms). 18 ms is comparable to the mouse latency added by prior art products.

The DIP 400 will have reported a standard system keyboard and mouse report format and polling rate to the target device 300. Therefore, when an AVSP control channel is created between the DUS 500 and DIP 400, no transfer of descriptor information is required.

The keyboard and mouse flows will need to be translated to the USB format on the DUS 500, however hardware assist to be employed in the USB keyboard and Mouse flows through DIP 400 as for native USB peripherals.

Establishing the connection with the DUS 500 and DIP 400 can force the target device 300 to re-enumerate the USB port and will report the full set of descriptor information gleaned from the generic device on the DUS. This will cause the target device 300 to load the device specific driver and enable the device to operate. Such devices include joysticks, tablet based controllers, drawing tools, etc.

Figure 12:
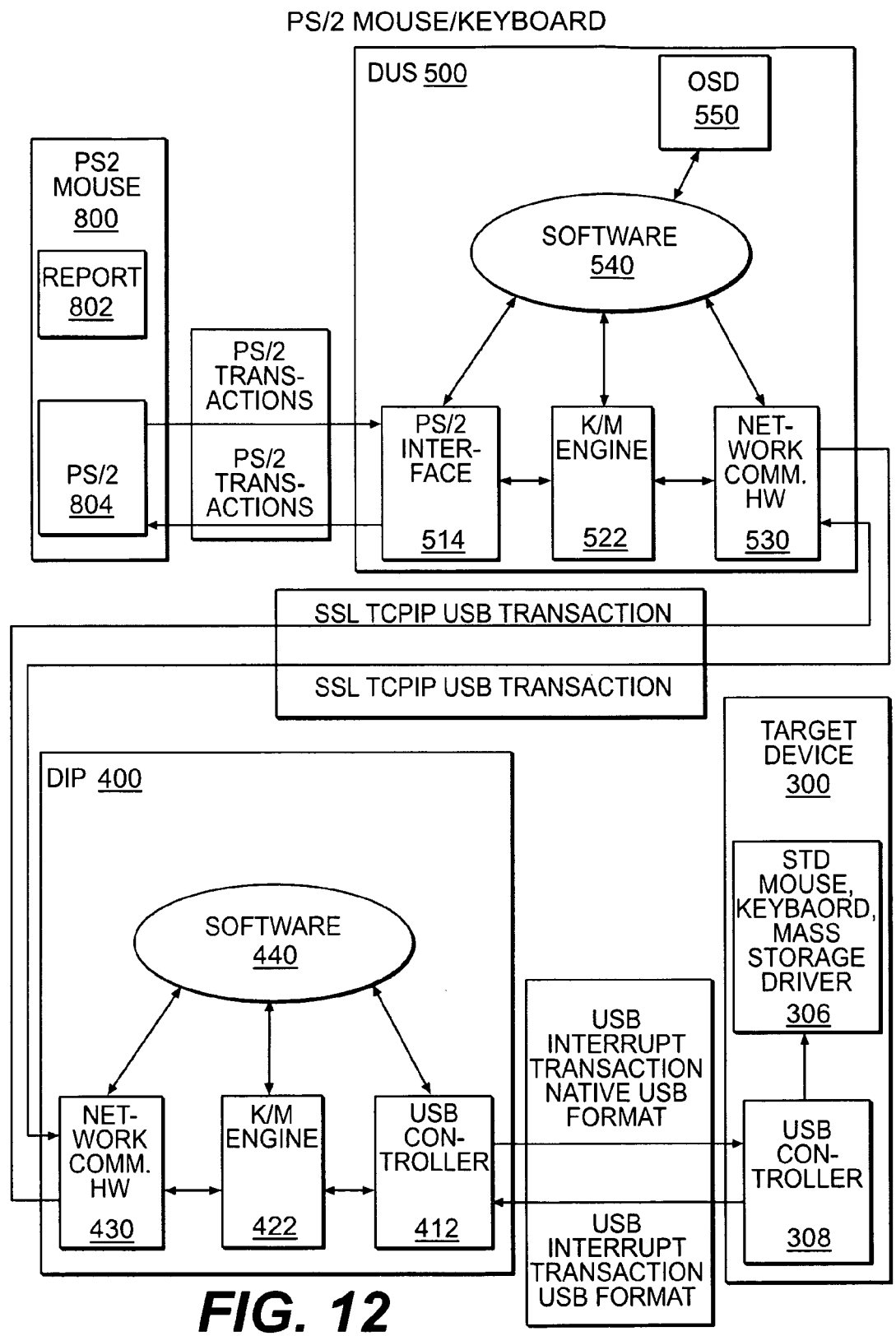
FIG. 12: an exemplary diagram illustrating components used with a PS/2 Keyboard and Mouse Connection media stream.

The exemplary system behavior with respect to PS/2 Keyboard and Mouse connection control and data flow is illustrated in FIG. 12.

Before establishing a PS/2 keyboard and mouse session the following conditions can be satisfied: DUS 500 and DIP 400 have been powered up, a PS/2 keyboard and mouse have been initialized by DUS 500, DUS 500 has established the AVSP control session with DIP 400, the network engines 434 and 534 have been enabled, and the keyboard and mouse session has been enabled on the session cert. The DUS 500 can configure the mouse report rate to a value that enables it time to process each key make and break code and translate to USB (i.e. every 20-25 ms or more).

The DUS 500 sends report descriptors to the DIP 400 over SSL/TCPIP using an extended AVSP command. The report describes the USB format into which the PS/2 keyboard/mouse data is translated to by the software 540.

The DIP 400 receives the report descriptor and forces re-enumeration on the composite keyboard and mouse USB port, reporting the new report descriptor to the target device 300 in the enumeration. This will ensure that the keyboard and mouse report formats can be interpreted by the target device 300. The DIP 400 having completed enumeration enables the keyboard and mouse data path. The DIP 400 will need to send the keyboard settings sent by the target device 300 to the DUS 500 so that the DUS 500 can initialize the keyboard LEDs, Cap Lock, Num Lock, etc. settings can be consistent with target device 300. The DUS 500 on receiving acknowledgement from the DIP 400 of enumeration completion enables its keyboard and mouse path. Keyboard and mouse data now flows between peripherals and the target device 300. Other than control of the session software 440 is not involved in keyboard and mouse report transfer.

Power is not removed from the peripheral when the DIP 400 forces the target device 300 to re-enumerate after a connection is established. This means that it is feasible to transfer device or report descriptors from the DUS and report to the target device 300 by the DIP 400 at the time of connection establishment. In the case of PS/2 this can be used to setup the DIP 400 correctly for PS/2 mouse report rate, report format.

PS USB HC must poll mouse and keyboard endpoints at an advertised rate. For example, 8 ms for mouse and 10 ms for keyboard may be advertised so as to never get buildup of packets. Alternatively a rate reported by the peripheral to the DUS 500 can be advertised, in this case every 25 ms. The keyboard/mouse USB port 308 (low/full) is re-enumerated using the report descriptors obtained from the DUS 500.

If a keyboard or mouse was inserted on the DUS 500 prior to the DUS-DIP connection being made, the PS/2 peripheral is initialized on insertion and the sequences as described are followed once the report descriptors are known to the DUS 500. Removal of a keyboard or mouse does not result in an interaction with the DIP 400, it simply sees no keyboard or mouse data. The DIP 400 only re-enumerates as described when a device is inserted.

Figure 13:
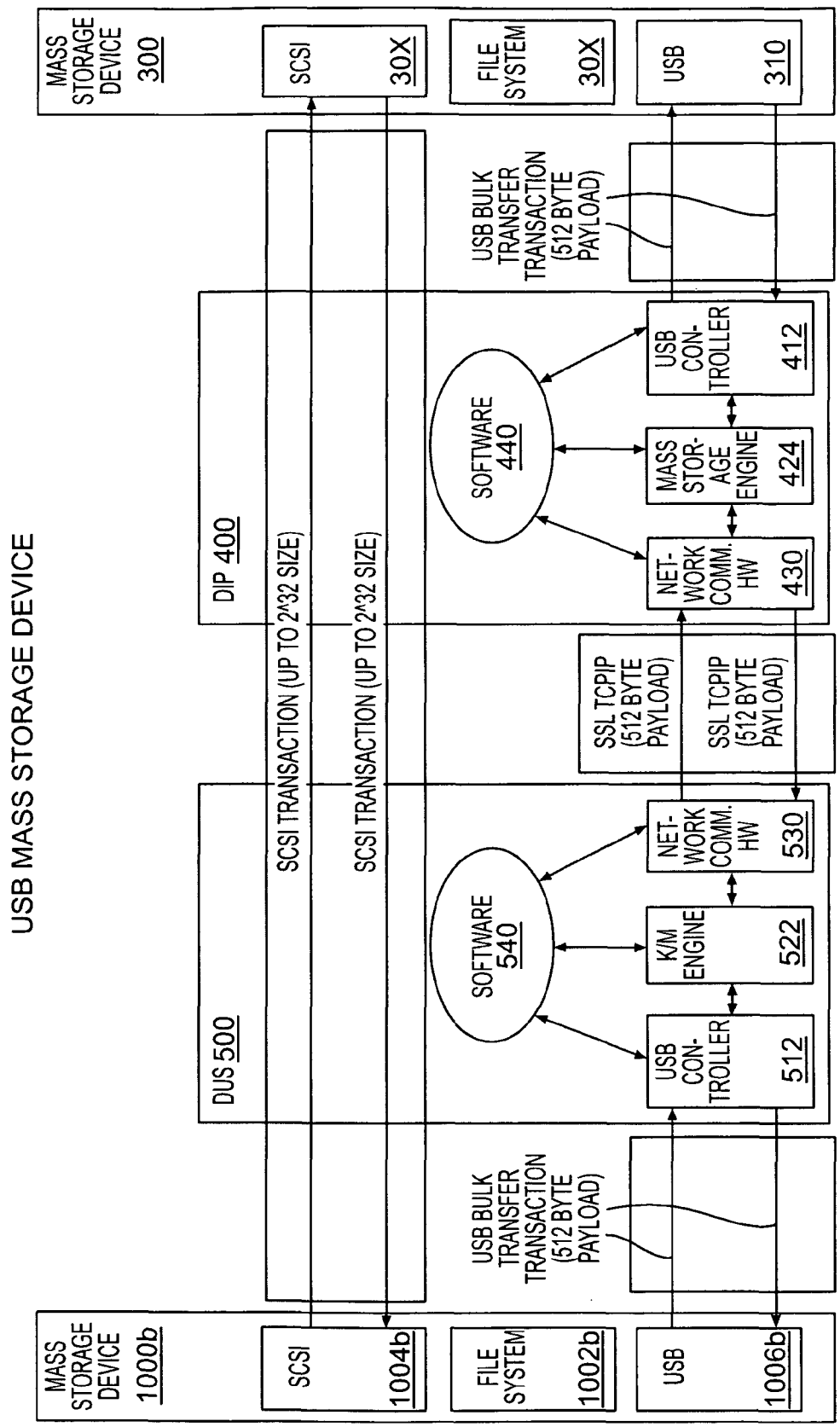
FIG. 13: an exemplary diagram illustrating components used with a mass storage media stream.

The exemplary system behavior with respect to Mass Storage (Virtual Media) connection control and data flow is illustrated in FIG. 13.

On power up the DIP 400 will have reported a standard Mass Storage bulk transfer only device to target device 300. However, when an AVSP control channel is created between the DUS 500 and DIP 400 on establishment of a DUS-DIP connection, the target device 300 SCSI requests can be transported across the system to/from the peripheral.

Similar to the Keyboard and Mouse connection establishment, the opportunity exists to modify the descriptor reported by the DIP 400 by obtaining the report descriptor from the DUS 500 and forcing the target device 300 to re-enumerate the full/high speed port.

The system transfers the SCSI transactions without copying or translating the transactions. The standard Mass Storage PC device driver will use a common set of SCSI commands that all Mass Storage compliant devices support. This level of support can handle all the required functionality provided by memory sticks, however with CD/DVDs special functions like drawer open and CD selection functions would not be available.

However, reporting the actual peripherals report descriptor will mean that the actual real device driver will be loaded on the PC and the full functionality of the driver could be utilized, provided the system can handle the SCSI command set. This should be possible provided the implementation can "transport" SCSI commands with interpreting them (other than to extract length and direction indicators).

Before establishing a USB mass storage session the following conditions should be satisfied: DUS 500 and DIP 400 have been powered up, a mass storage device 1000 has been enumerated by DUS 500, DUS 500 has established the AVSP control session with DIP 400, mass storage session has been enabled on the session cert. The implementation simply transports SCSI commands, and does not need to interpret or interact/spoof with the target device 300 driver.

The DUS 500 sends the device and interface descriptors for the enumerated mass storage device 1000 to the DIP 400 using an extended AVSP command. The DIP 400 receives the report descriptors and forces re-enumeration of the full/high speed port 310, reporting the new report descriptor to the target device 300 in the enumeration. The DIP 400 having completed enumeration enables the mass storage data path. The DUS 500 on receiving acknowledgement from the DIP 400 of enumeration completion enables its data path. Mass storage data now flows between peripherals and the target device 300. All data is transferred by hardware under software control. If no mass storage device was inserted on the DIP 400 prior to a DUS-DIP connection being made, the mass storage device 1000 is enumerated on insertion and the sequence described above is followed once the report descriptors are known to the DUS 500. Removal of a device results in the removal of the data path on the DIP 400. The DIP 400 only re-enumerates as described when a device is inserted, as it must keep a device there to guarantee maintenance of power.

Software 550 does not copy or translate data SCSI media transfer packets. Other than initial connection establishment, software is not involved in the data transfer. Other than initial connection establishment, software 450 is not involved in the SCSI packet transfer.

The DUS 500 will require software involved in each 512 byte block of the SCSI transaction to facilitate transfer from the host controller 512 to the network engine 534 and from the network engine 534 to the host controller 512, the data buffer shared by each side.

For the system to provide a good throughput 512 USB transactions of a SCSI transaction are to be grouped by hardware into a larger data block for each software interaction. The grouping should be such that software interactions are required not more than every 5 ms to 10 ms. 5 ms requires a shared buffer of 13.6 Kbytes for each side (HC, Network engine buffers are required to remain receiving at one side and transmitting at other side at the same time), i.e. 27.2 Kbytes {5/0.189=26.5 intervals (512 packets)=13.568 K transaction sizes required}. 8 ms requires a shared buffer of 21.5 Kbytes for each side (HC, Network engine), i.e. 43 Kbytes {8/0.189=42 intervals (512 packets)=21.504 K transaction sizes required}.

The buffering, as described, assumes a single mass storage device, adding another mass storage device will require twice the buffer space to maintain a similar throughput.

In this scheme the DIP 400 is not aware or SCSI level transactions. It is simply transferring data blocks from USB to network 100 and from network 100 to USB. The DUS 500 needs to have minimal awareness of the SCSI transactions. It needs to know the SCSI request type (CMD, Data, Status), its length, and if its an IN or OUT request so it can manage the HC USB scheduling correctly. The memory HC and network engine FPGA should be dual port shared memory.

The transfer of media between a DIP 400 and DUS 500 can occur within any of the following three modes of operation: extender, desktop and matrix. Regardless of the mode of operation, the DIP 400 is a slave device and has no awareness of the configuration it is operating in.

FIGS. 14-18 illustrate the extender configuration. In the extender configuration a single DUS 500 and DIP 400 are present and a DUS 500 connects to a specific DIP 400 based on a direct physical connection—no login is required. The DUS 500 and DIP 400 establish media sessions between one another without the use of a trusted third party. Thus, a central authentication, authorization and administration engine, i.e. MgmtApp 200, is not required in the extender configuration. Extender mode does not have the concept of users. In a point-to-point extender configuration all administration and configuration shall be achieved through the DUS OSD 550 or serial interface 560. The OSD 550 on the DUS 500 shall enable user and administrator level configuration. The serial interface on the DUS 500 shall provide commissioning, general administration and debug capabilities.

Figure 14:
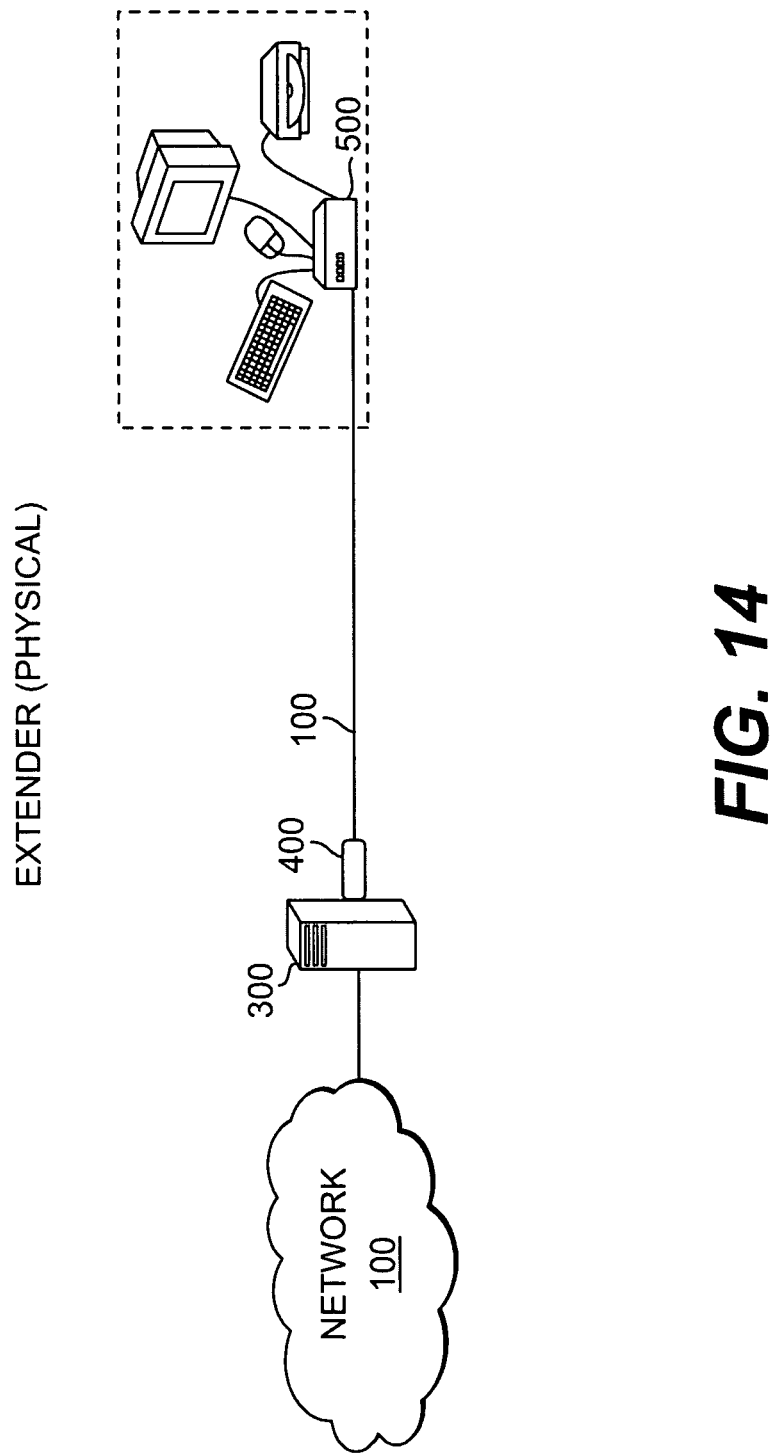
FIG. 14: an exemplary diagram illustrating physical extender configuration.
Figure 15:
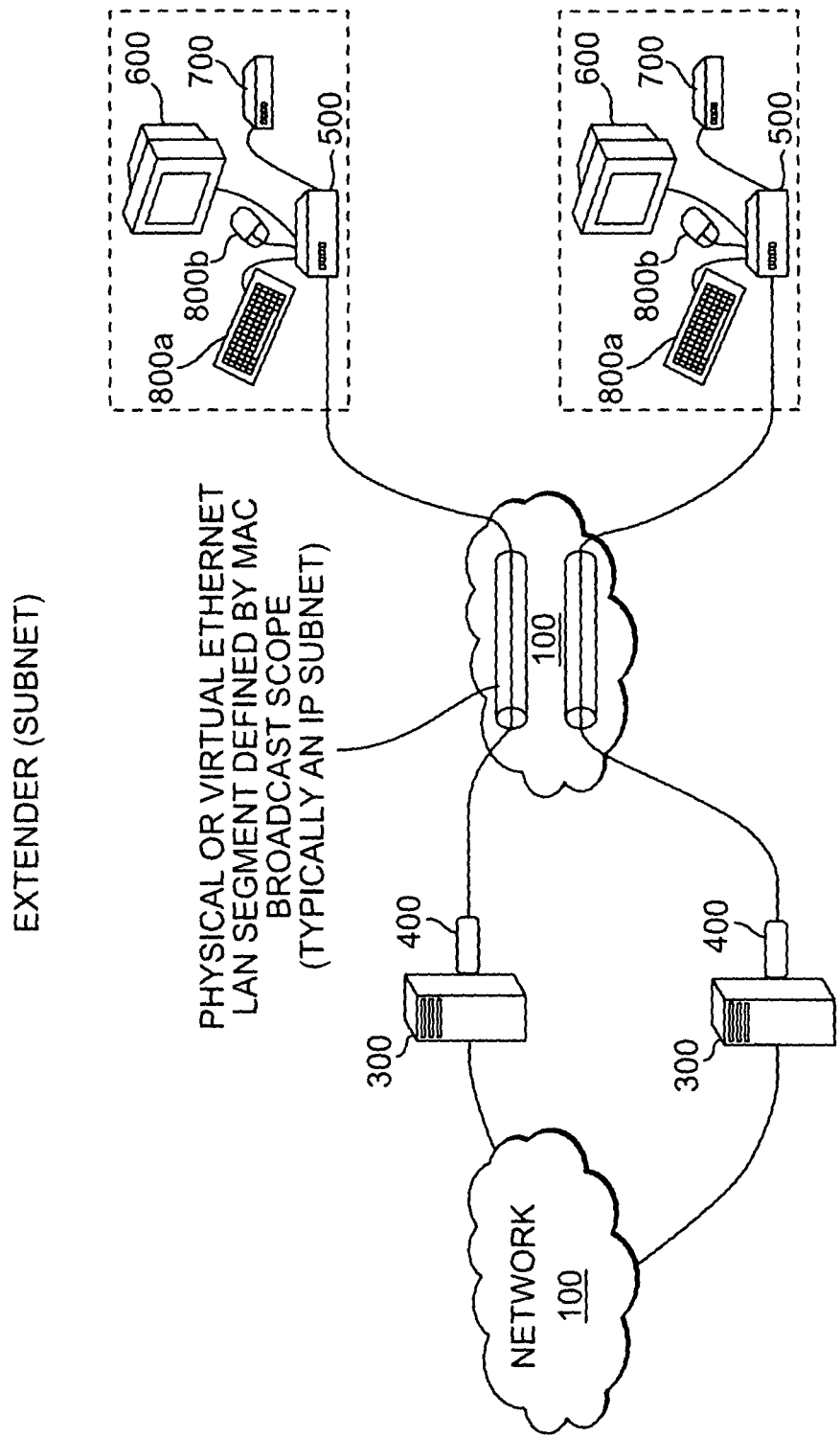
FIG. 15: an exemplary diagram illustrating subnet extender configuration.

The extender configuration is employed when a DUS 500 and DIP 400 are connected directly using a single cable, as shown in FIG. 14, or when the DUS 500 and DIP 400 are connected via a physical or virtual Ethernet LAN segment defined by MAC broadcast scope (e.g. an IP subnet), as shown in FIG. 15.

Once powered on, a DUS 500 automatically connects to a partner DIP 400, where partner DIP 400 is a single DIP 400 directly connected to DUS 500 or a single DIP 400 on the IP subnet of the DUS 500. DUS 500-DIP 400 connections are over SSL authenticated connections. When used in a direct cable configuration the DUS 500-DIP 400 association is defined and protected by the physical wire connection.

When used on a physical subnet, the implementation utilizes broadcast auto-discovery. The DUS 500 will only connect and remain connected to a DIP 400 provided one DUS 500 and one DIP 400 are present on the subnet. Otherwise, a DUS 500 will not connect to a DIP 400 (it enters desktop mode). If the implementation does not utilize auto-discovery, the DUS 500 will only connect to a DIP 400 configured with the same IP address to which the DUS 500 is configured to connect to. The DUS 500 can be configured to connect to any DIP 400 IP address. This IP address can be changed via the DUS 500 serial port.

Minimal administration is required in extender mode. The appliances will operate "straight-out-of-the-box." That is, the administrator simply needs to install a DUS 500 and DIP 400 with default settings in an extender configuration as illustrated in FIGS. 14 and 15. If the appliances do not have default settings the settings can be reset via the DUS 500 serial port 560.

An administrator installs the appliances by connecting peripherals to the DUS 500, connecting DUS 500 to an Ethernet 10/100/1000 cable, connecting DIP 400 to the cable, connecting DIP 400 to target device 300, powering on the target device 300 which powers up the DIP 400 via USB ports, and powering up the DUS 500.

Once the DIP 400 is powered on, it initializes itself by using its factory default IP addressing mechanism (e.g. DHCP) to search for an IP address. In extender mode no DHCP server is available. Once a DUS 500 is powered on, it displays an initialization screen and initializes itself using its static IP address data.

Figure 16:
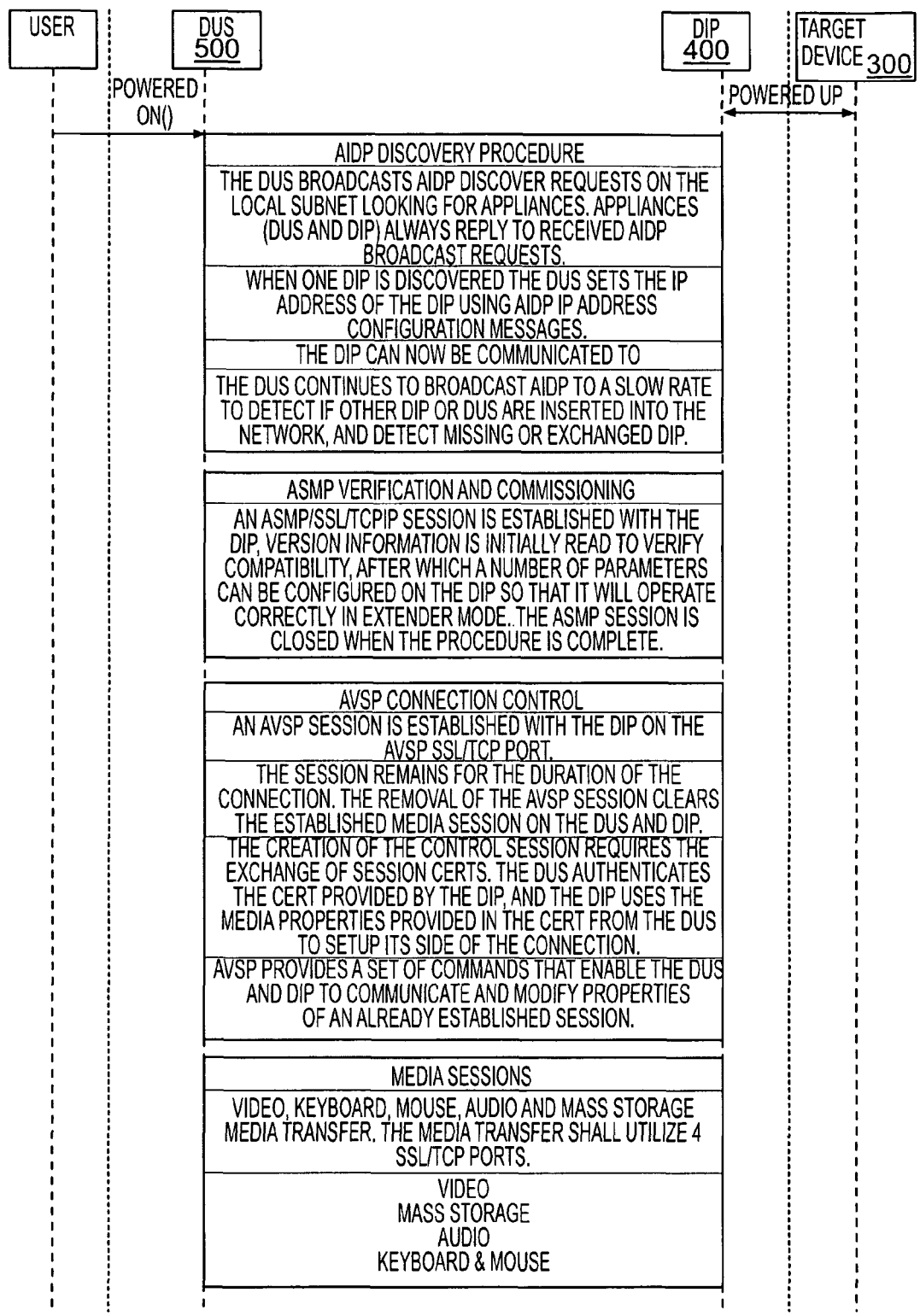
FIG. 16: an exemplary diagram illustrating power up of DUS in extender configuration.

Once DUS 500 and DIP 400 are installed, the DUS 500 begins the process of establishing a connection with the DIP 400. This process is illustrated in FIG. 16. In the exemplary embodiment, the DUS 500 and DIP 400 utilize AIDP (Avocent Install Discovery Protocol) broadcast discovery. An IP configuration protocol (e.g., ASMP (Avocent Secure Management Protocol)) is used by the DUS 500 to obtain DIP 400 information. The DUS 500 looks for a partner DIP 400 by broadcasting AIDP discovery packets. The DUS 500 will remain searching until it finds a DIP 400 or DUS 500, sending a broadcast every second. When an initialized DIP 400 receives an AIDP discovery protocol request it responds by identifying itself. This allows the DUS 500 to know of its existence. When a single DIP 400 is detected, the DUS 500 uses the AIDP protocol to program it with the IP address it has for the DIP 400 and continues to search for other DUSs and DIPs but at a slower rate (e.g. every 10 seconds). The DIP 400 receives AIDP protocol messages sequence to configure IP address data. The DIP 400 stores the IP data persistently and configures itself to use static IP addressing. When DIP 400 is inserted into a network 100 it stays quiet and only responds to requests. The exception being SNMP traps if they are enabled. In this case, the DIP 400 will send an SNMP trap on startup to the configured destination address.

Once a single DIP 400 is detected and programmed with an IP address, the DUS 500 verifies that the DIP 400 is compatible and configures the DIP 400 by establishing an ASMP session with the DIP 400. The persistent session certs on the DUS 500 and DIP 400 are used to authenticate an ASMP SSL session. The DIP 400 receives and responds to ASMP requests for version and other information from DUS 500. The DUS 500 will obtain the DIP 400 revision information using the ASMP protocol and verify it is compatible. The DUS 500 may choose to configure specific parameters on the DIP 400 using ASMP. The DIP 400 may receive and respond to ASMP requests to configure data. Once the configuration procedure is complete, the DUS 500 closes the ASMP session with the DIP 400 and establishes an AVSP control SSL connection with the DIP 400 using the AVSP protocol as described in accordance with FIG. 6.

The DUS 500 activates AVSP keep alive transmission/reply checking on the session control connection between DUS 500 and DIP 400. The DUS 500 configures and enables its media sessions as indicated in the session cert. The DIP 400 configures and activates its media streams on detection of an AVSP keep alive response from the DIP 400. The DIP 400 responds to requests to establish an AVSP session control SSL connection, exchanging the session cert. maintained persistently on the DIP 400. When the DIP 400 receives an AVSP keep alive on the session control connection, it configures its media sessions as indicated in the session cert received from the DUS 500 (the DUS 500 will enable its media streams on reception of the keep alive response). The DUS 500 sends a keep alive response to the DUS 500. The DUS 500 user is now connected to the target device 300.

If more than one DIP 400 or another DUS 500 is detected at anytime the DUS 500 resets open associations it has and enters desktop mode. Until the DUS 500 has been explicitly provisioned to be in desktop mode, it will always attempt to start in extender mode on power cycle.

If the AIDP discovery procedure after finding a DIP 400, misses three consecutive discovery replies from the DIP 400 it assumes the DIP 400 is missing and enters the fast discovery mode to either detect the DIP 400 returning or detect a new DIP 400 having been inserted. If AIDP discovery procedure having found a DIP 400, finds a subsequent discovery response indicates a DIP 400 with a different MAC address (i.e. DIP 400 has been switched), the discovery procedure initiates reset of all open associations the DUS 500 and restarts this procedure at the point when a single DIP 400 is discovered. An implementation may choose not to use the AIDP discovery protocol. An implementation may choose not to use ASMP for retrieval of DIP 400 information by the DUS 500. Extensions to AVSP can be used to retrieve the required information on connection establishment.

Figure 17:
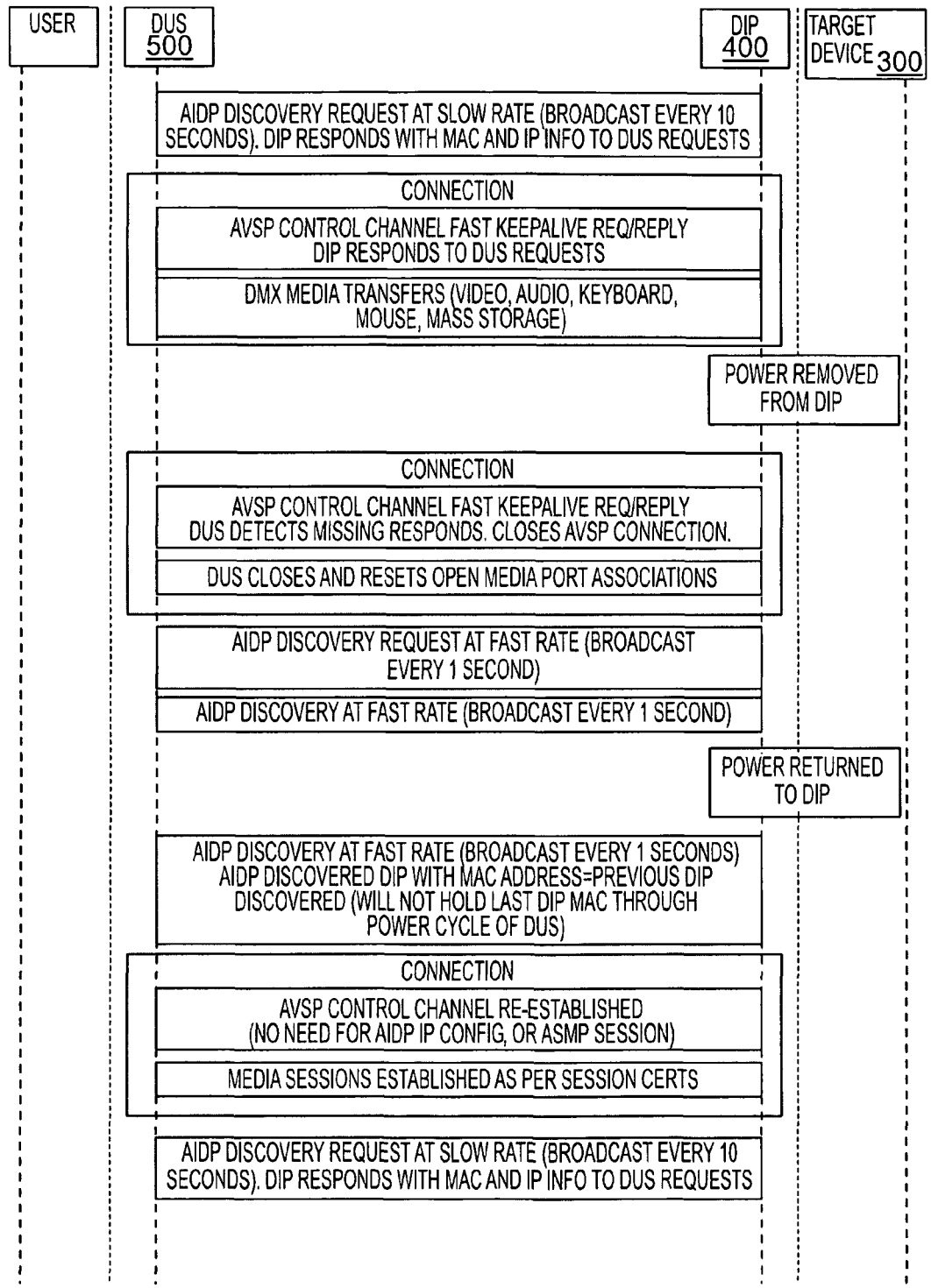
FIG. 17: an exemplary diagram illustrating power down of DIP in extender configuration.

FIG. 17 illustrates the architectural behavior and broad protocol usage for a DUS 500 and a DIP 400 in an extender mode configuration. When a connection is established, the DUS 500 needs to be able to accommodate the possibility of a target device 300 being reset or the DIP 400 being replaced. When this occurs, the connection needs to be re-established rapidly.

The DUS 500 shall complete the powerup sequence within 20 seconds, including any self test diagnostics it may run. The DUS 500 shall during powerup keep the DUS 500 user informed of its activities via an OSD message display on monitor 600. The DUS 500 and DIP 400 each shall have a persistently stored session cert (factory default shipped with product) for use in extender mode. The certs are used in SSL link establishment. DUS 500 session cert shall have media session property extensions that are used to determine the media session and session properties to connect. At power up DUS 500 always responds to AIDP discovery requests irrespective of operating mode.

When the target device 300 is powered down, resulting in abrupt power down of the DIP 400. The DUS 500 stops receiving AVSP keep alive replies (every 500 ms). After missing three consecutive replies the DUS 500 declares the connection with the DIP 400 broken. The DUS 500 resets its open SSL/TCPIP associations with the DIP 400 (media streams and AVSP control session), and displays a message indicating that the connection is broken with the DIP 400. The DUS 500 places the AIDP discovery procedure into fast detection mode (1 second interval instead of 10 seconds). When the DUS 500 AIDP procedure detects a DIP 400 again, it indicates if it is the same DIP 400 that was lost (based on MAC address). If the same DIP 400 is discovered the DUS 500 follows the DUS 500 powerup usecase sequence after the point where the ASMP session is closed. That is, the DUS 500 re-establishes the AVSP control session with the DIP 400 and the media session are re-established.

If AIDP discovery procedure having found a DIP 400, finds that a subsequent discovery response indicates a DIP 400 with a different MAC address (i.e. DIP 400 has been switched), the discovery procedure initiates reset of all open associations with the DUS 500 (as in the case they may already be reset if another application detects problems communicating with a DIP 400 more quickly) and restarts at the DUS 500 at the point after a single DIP 400 is discovered for the first time. The implementation may choose not to use the AIDP auto discovery and IP configuration protocol.

On restart of the target device 300 and the subsequent DIP 400 powerup the time it takes to establish a connection on the DUS 500 and DIP 400 again needs to be fast enough to be able to have a DUS 500 user access the target device bios. This concern is mitigated by the fact that if the same DIP 400 is re-discovered (having been lost) the connection re-establishment is immediate.

When a connection is established, it is possible that the DUS 500 is powered down. On power down of a DUS 500 a connection present is effectively removed totally and must be re-established in full. The DIP 400 on detecting loss of a connection with a DUS 500, clears any open associations with the DUS 500 and readies itself for another connection attempt. This process is as follows:

The target DUS 500 is powered down, resulting in abrupt power down of the DUS 500. The DIP 400 stops receiving AVSP keep alive requests (every 500 ms). After missing three consecutive requests the DIP 400 declares the connection with the DUS 500 broken. The DIP 400 resets its open SSL/TCPIP associations with the DUS 500 (media streams and AVSP control session). The DIP 400 is now ready to accept another AVSP control session establishment request (re-establish the connection again). An implementation may choose not to use ASMP between DUS 500 and DIP 400 instead using an AVSP extension to retrieve data from the DIP 400.

Once a connection is established a cable fault breaking communication in both directions is also possible. A network or cable fault will result in the DUS 500 missing keep alive responses and the DIP 400 missing keep alive requests. The DUS 500 behaves as indicated when the DIP 400 is powered down. The DIP 400 behaves as indicated when the DUS 500 is powered down. On resumption of the network/cable connectivity, the DUS 500 will re-discover the DIP 400 within one second (the fast discovery interval). The AIDP discovery procedure recognizes that it's the same DIP 400 (MAC address returned in discovery response) and re-establishes the AVSP control connection and associated media sessions with the DIP 400.

A network/cable fault that breaks communication in the DUS 500 to DIP 400 direction will cause the DIP 400 to behave as indicated in when the DUS 500 is powered down. A network/cable fault that breaks communications in the DIP 400 to DUS 500 direction will cause the DUS 500 to behave as indicated when the DIP 400 is powered down.

Another aspect of the extender configuration is the capabilities of a DUS 500 with respect to items presented on the OSD (on-screen display) 550. All items presented on the OSD 550 are assumed to be modifiable by the DUS 500. Administration items are carried out through the password protected serial port 560. The DUS 500 user hits the OSD 550 hotkey sequence, after which the OSD 550 is displayed and all keyboard and mouse transactions are directed to the OSD 550. The user can navigate the OSD 550 as required. When a connection is made, OSD 550 shall, as well as providing the capability to view and perform actions locally on the DUS 500, provide the ability to view and perform actions that require data retrieval or modification on the DIP 400. The ASMP protocol is used to view version and addressing data on the DIP 400. The AVSP protocol is used to modify the characteristics of the media sessions. Implementations may choose not to use ASMP, instead using an extension to AVSP.

When the serial interface 560 is password protected, the administrator inserts a password and is presented with a serial menu from which configuration can be achieved. Menu options include setting IP address, download of image file via xmodem, firmware upgrade of DUS 500, firmware upgrade of DIP 400, etc. Hidden menu options will exist for manufacturing development and tech support debugging purposes.

Figure 18:
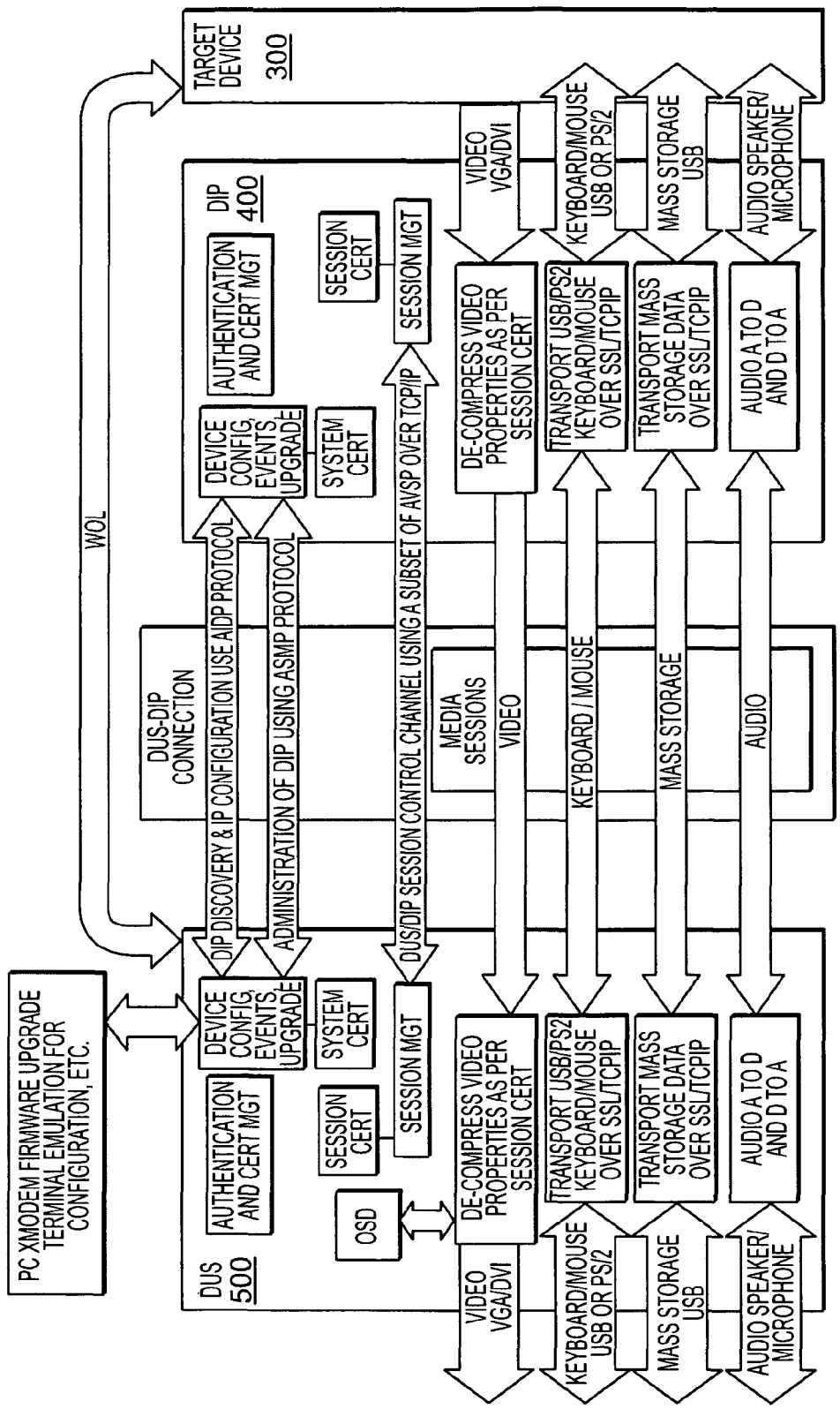
FIG. 18: an exemplary functional model of extender configuration.

FIG. 18 is an exemplary functional model of extender configuration. FIG. 18 summarizes operation of DUS 500 and DIP 400 in extender mode as previously described. As shown in FIG. 18 for the exemplary embodiment, DUS 500 discovers DIP 400 using AIDP, DUS 500 administers a DIP 400 using ASMP, DUS 500 and DIP 400 establish a control channel using AVSP, and media sessions are created. Further, as shown in FIG. 18 DUS 500 can use WOL (wake on LAN) to power on a target device 300 when an appropriate network connection is established. This process is described in greater detail in accordance with the desktop/matrix configuration.

FIGS. 19-25 illustrate the desktop/matrix configuration.

Figure 19:
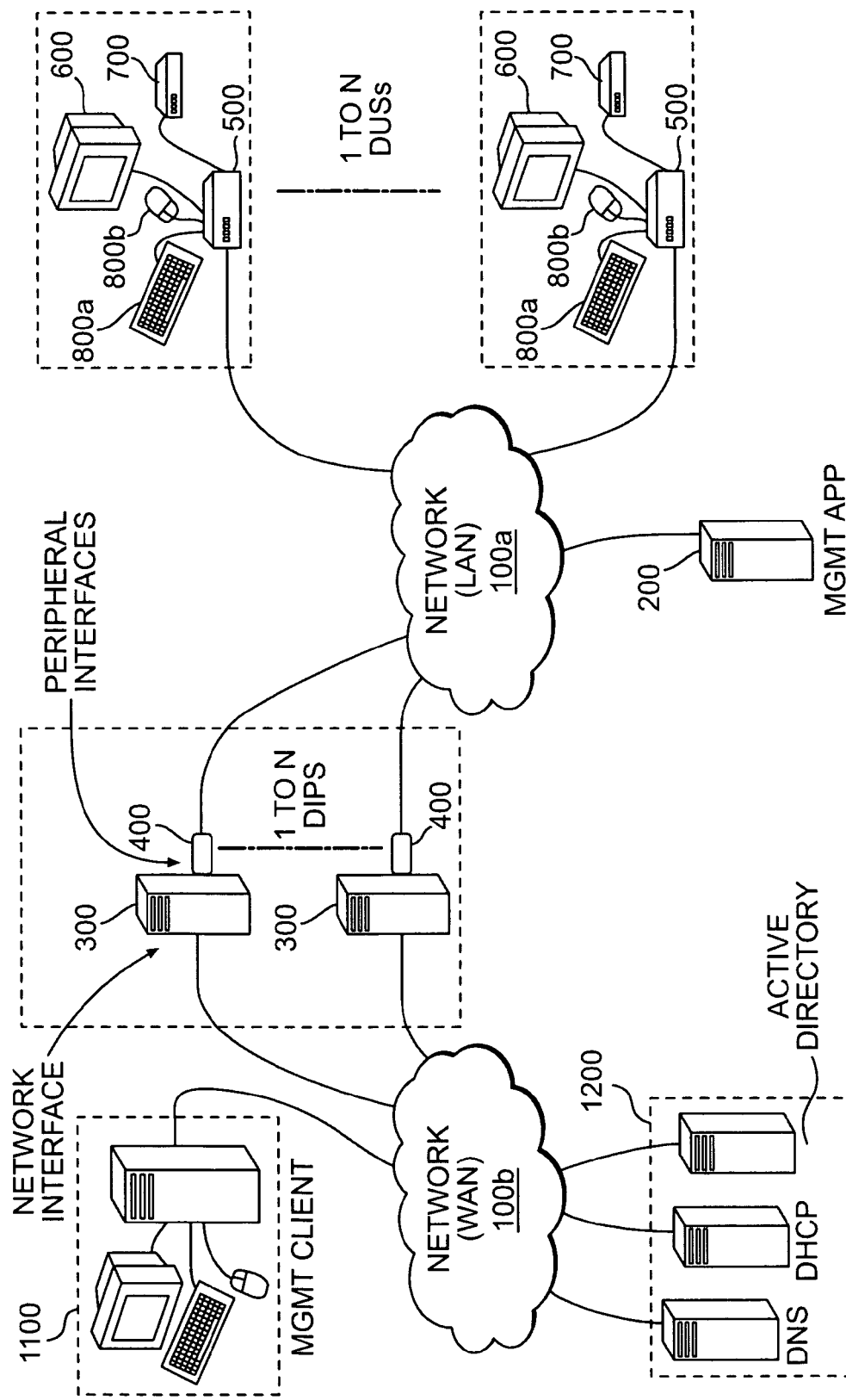
FIG. 19: an exemplary diagram illustrating desktop and matrix configuration.

FIG. 19 illustrates an exemplary desktop/matrix configuration. As shown in FIG. 19, any number of DUSs 500 and any number of DIPs 400 are connected to a local area network 100a. As such, a particular DUS 500 and DIP 400 establish media sessions between one another with the use of a trusted third party, the Management Application (MgmtApp) 200 connected to local area network 100a. Further, target devices 300 and local area network 100a are connected a wide area network 100b. A management client 1100 and network 1200 are also connected to wide area network 100b.

Desktop and matrix modes both involve a user logging into a DUS 500 and connecting to a DIP 400. The difference between the two modes is that in desktop mode the user will automatically be connected to a predetermined DIP 400. Matrix mode is similar to desktop mode except that when a user logins to the DUS 500, a user obtains a list of target devices 300 (or DIPs 400). The user then selects a target device 300 and a specific connection is established. Login and Auto login modes are available in both modes.

The MgmtApp 200 provides the following functions: administration, authentication, and authorization. The core MgmtApp 200 administration functions include the ability to: administer a database of target device users, system administrators, and administer appliances (e.g. DUSs 500 and DIPs 400). The MgmtApp 200 can configure appliances by: upgrading/downgrading appliance firmware versions, configuring appliance addressing information, configuring the login mode used by the DUSs 500 (i.e. Login or AutoLogin). MgmtApp 200 can also administer user access session data. This includes the DUSs a specific user is allowed to login from, the operating mode to be used when accessing from a specific DUS (e.g. desktop or matrix), the media sessions allowed for a specific user (e.g. video, vMedia, keyboard/mouse, or audio). Further, an administrator can use MgmtApp. 200 to enable and disable media sessions on a per user basis. An administrator can set the maximum media session properties allowed for a specific user. An administrator can set the maximum quality and performance experience required by a user. This provides a mechanism to manage the network bandwidth utilized by users. The following are configurable by an administrator to manage network bandwidth: video properties (e.g. frames per second and color depth), vMedia properties (the ratio of bandwidth usage between the high bandwidth users video and vMedia) and audio properties (e.g. The jitter/playback buffer size). The ratio of bandwidth usage setting effectively guarantees a specific minimum percentage of the bandwidth for Video. The jitter/playback buffer size is a characteristic of network latency rather than bandwidth.

The MgmtApp 200 provides authentication of: administrators access to the MgmtApp 200 through a web browser (i.e. Mgmt Client 1100 access) and target device user access to a DUS 500. Target device user access to a DUS 500 authentication includes: Internal Authentication (MgmtApp 200 authenticates users/passwords) and External Authentication through the use of a third party authentication servers (LDAP, Active Directory, etc).

The MgmtApp 200 authorization functions include: authorizing system administrators and DUS-Target PC user system access rights, and media sessions definition and connectivity.

The general system level principles of desktop/matrix configurations are described by describing the following usecases: (1) Installation/Administration which includes: Appliance Installation/Administration (described in accordance with FIG. 20), target device administration (described in accordance with FIG. 21), and user administration, (2) Power-up of installed DUS and DIP (described in accordance with FIGS. 23 and 24, respectively) (3) Connection Establishment and Removal (FIG. 22), (4) Power-down of installed DUS and DIP, and (5) Cable or network fault.

Figure 20:
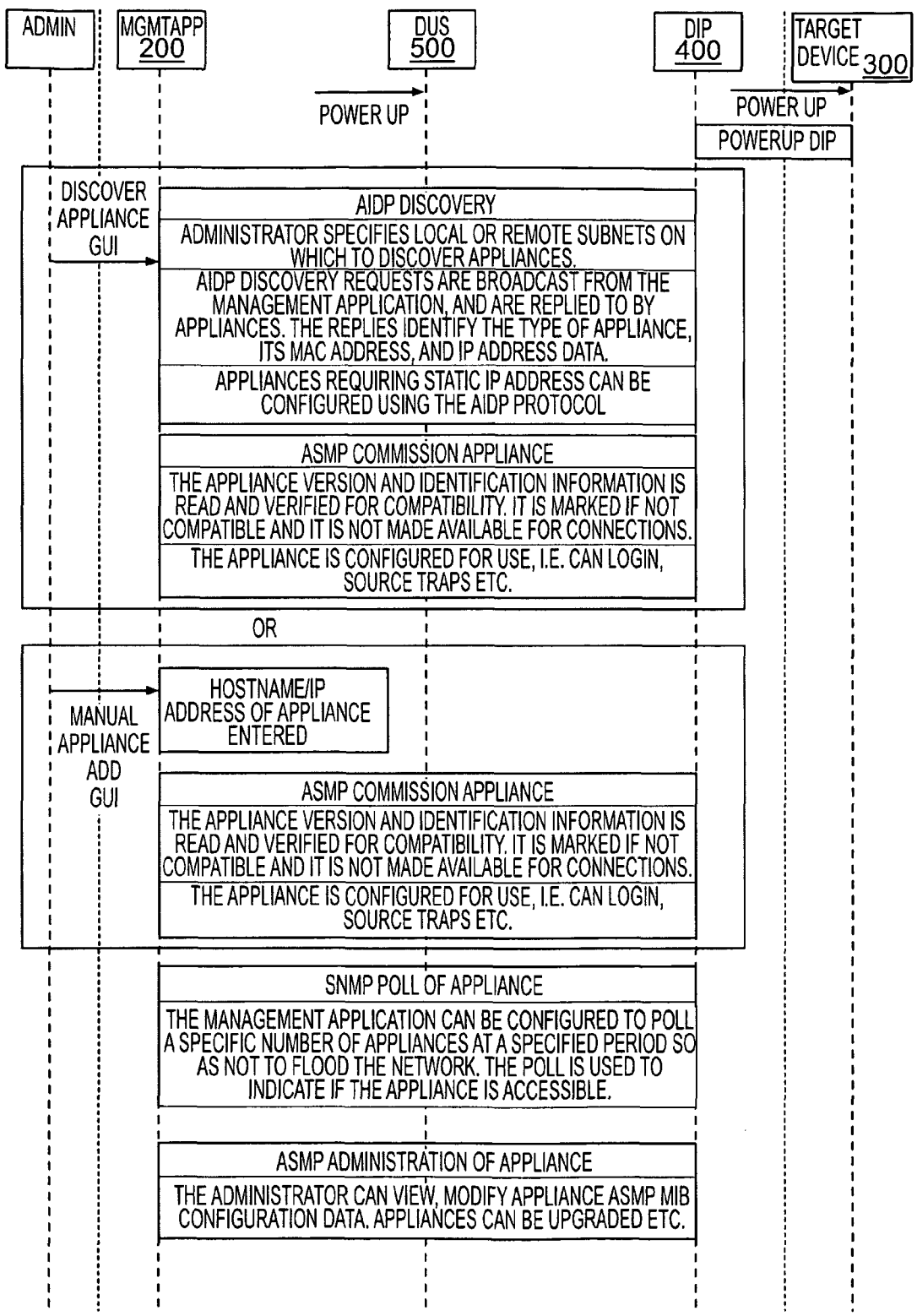
FIG. 20: an exemplary diagram illustrating the initial installation/commission and administration of appliances in desktop/matrix configuration.

The initial installation and commissioning of appliances to bring the system to a state ready to establish media sessions between a DUS 500 and DIP 400 is described in accordance with FIG. 20.

For the initial installation it is assumed that DUSs 500 and DIPs 400 have default factory settings and DUSs 500 by default have login enabled and are connected according to FIG. 19. It is also assumed that explorer software that includes MgmtApp 200 is installed on a dedicated server. The MgmtApp 200 is used to setup a standard configuration that needs to be performed on each newly discovered appliance (set SNMP trap address, set management IP address, etc.).

The MgmtApp 200 discovers DIPs 400 and DUSs 500 on the network 100 using one or more of the following methods: automatically using AIDP broadcasts to the local subnet, automatically using directed AIDP broadcasts to specified remote subnets, or manually by entering the specific a DIP 400 or DUS 500 hostname or IP address. If static IP addressing is required, MgmtApp 200 is used to configure static IP address data on discovered DIPs 400 and DUSs 500. The AIDP protocol is used to achieve this.

The MgmtApp 200 establishes an ASMP session with each of the discovered DIPs 400 and DUSs 500 to "commission" the devices and add them to its database. MgmtApp 200 verifies that the DIPs 400, DUSs 500, and explorer software versions are compatible (flagging incompatible appliances) and auto configures DIPs 400 and DUSs 500, if auto configuration items are setup. The MgmtApp 200 closes the ASMP session with the DIPs 400 and DUSs 500 on completion of "commissioning."

The MgmtApp 200 polls DIPs 400 and DUSs 500 in its database to determine availability (SNMP/UDP poll of MIB variable). The MgmtApp 200 listens for SNMP traps to augment its polling of DIPs 400 and DUSs 500 to determine availability. The DIPs 400 and DUSs 500 can now be configured, administered, and upgraded using ASMP. The appliances are ready for connections to be established.

DUSs 500 can alternatively be locally configured via their serial ports 560 to be in desktop mode. DUS 500 appliances can be configured for autologin access. When a DUS 500 is configured for autologin, the MgmtApp 200 adds the DUS 500 specific "autologin" user to its database. The user is administered on the MgmtApp 200 just like other users. The DUS 500 resets itself on setting to autologin mode, and continually attempts to login on power up.

The DUS 500 and DIP 400 hostnames can be modified via the ASMP MIB interface. The factory default host names are "DUS xxxxxx" and "DIP xxxxxx," where xxxxxx is the appliance MAC address. The default IP addressing mechanism used by the DUS 500 in Desktop/Matrix mode is DHCP, unless configured to operate using static IP addressing. The default access mode of a DUS 500 is login. A DUS 500 login access mode (login/auto login) can only be configured via its. ASMP interface. The username and password to be used in autologin mode can be configured on the DUS 500 via its ASMP interface only.

After DIPs 400 and DUSs 500 have been installed and commissioned as described in accordance with FIG. 20, the MgmtApp 200 must associate each DIP 400 with a target device 300. Target devices 300 are the primary reference used by administrators. At a user interface level the DUS 500 user is associated with one or more target devices 300. Target device 300 host names can be automatically or manually associated with DIPs 400 by the administrator. To automatically associate a DIP 400 and target device 300, the MgmtApp 200 can automatically discover target devices 300 that have DIPs 400 attached and by using a unique identifier of the DIP 400 and target device 300 (MAC addresses) and auto associated the two. The auto association procedure can be run on installation and run at defined intervals subsequently. The administration of the target device 300 is described in accordance with FIG. 21.

It should be noted that it is assumed that auto discovery using WMI will detect target devices 300 using a Microsoft Windows OS. On starting the target device 300 discovery GUI, the administrator tells the GUI where and how to discover target devices 300 by entering: the subnets to search and the Microsoft Domain to search. For each subnet specified, MgmtApp 200 polls each IP address using WMI query to detect target devices 300. For each Microsoft Domain specified, MgmtApp 200 queries the Domain controller for the list of target devices 300. The MgmtApp 200 searches for target devices 300 and queries target devices 300 using WMI for the following matches: a USB device with an appropriate Vendor ID is attached and for devices with an appropriate Vendor ID, a device ID that identifies it as a DIP 400. Target devices 300 with DIPs 400 attached, have the following information retrieved and stored in the target device list on the Mgt. App. 200: PC hostname and MAC address, PC MAC address (required for remote wakeup), PC OS type (can be used for auto logout marco selection etc.), and DIP MAC address. The MgmtApp 200 looks up the DIPs in its database and matches it with the MAC address reported from the target device 300. The DIP 400 is then automatically associated with the target device 300 and stored in the MgmtApp 200 database. The OS type can be used to select the login and logout macros and have them provisioned on the DIP 400 using ASMP. The MgmtApp can at a preconfigured time or specified intervals repeat the auto discovery procedure to maintain an updated view of target device 300 and DIP 400 associations. Changes in the DIP-Target device associations are flagged to the administrator.

Figure 21:
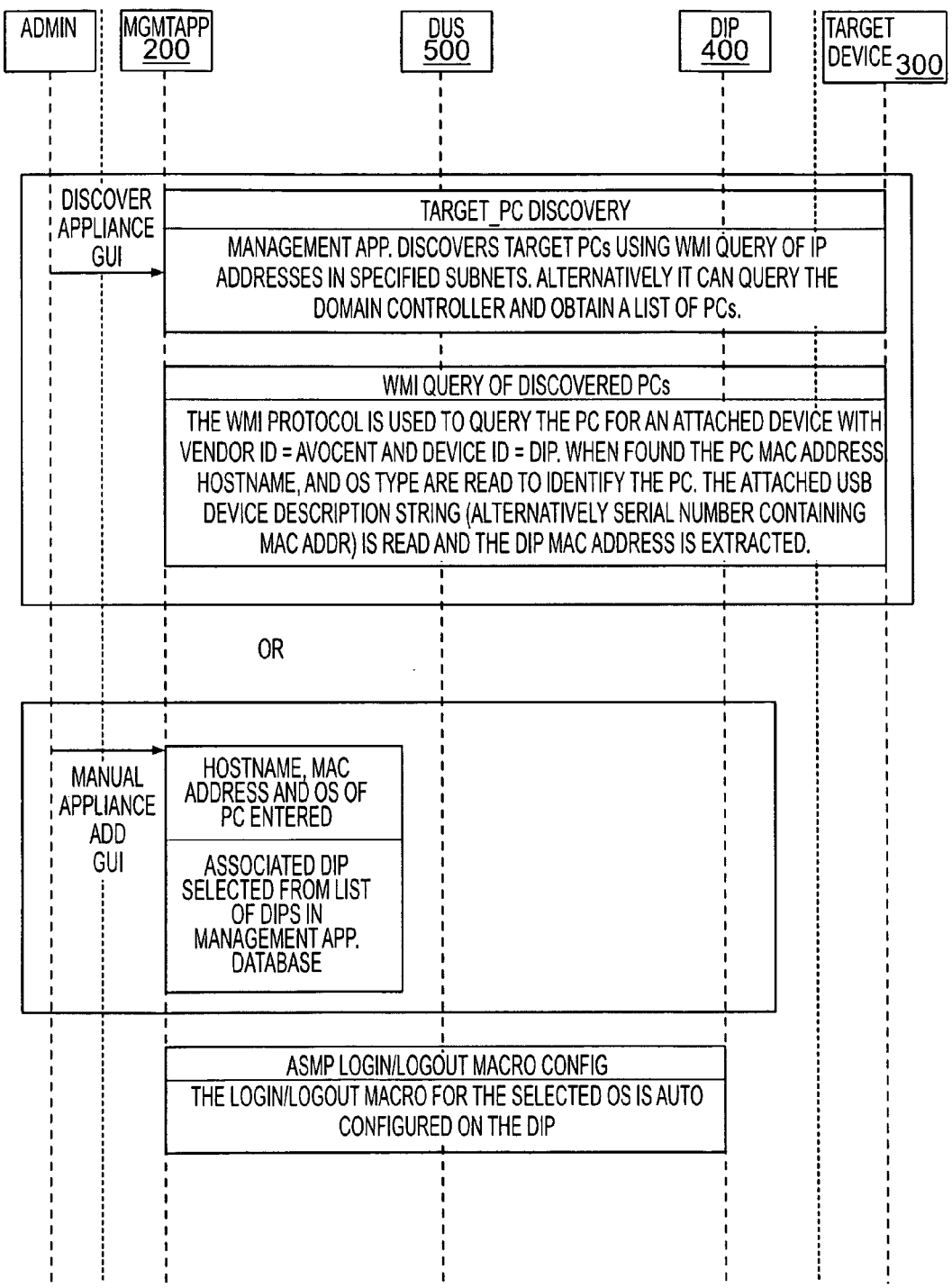
FIG. 21: an exemplary diagram illustrating administration of a target device in desktop/matrix configuration.

FIG. 21 also shows that the administrator can manually associate a DIP 400 with a target device 300 by using the manual target device add GUI. This takes place entirely on the MgmtApp 200. The administrator enters the target device host name, and selects the DIP 400 from the list of DIPs in MgmtApp 200 database.

Once target device administration occurs, user administration can occur. For user administration in the exemplary embodiment the database of users and their associated configuration data is maintained in MgmtApp 200 database and DUS 500 and DIP 400 do not store user information. Further, the following description describes a user is being configured for internal authentication in desktop mode.

The first step of user configuration is the administrator configuring the password policy. This includes configuring: required password fields (numeric, capital, etc), minimum password length, and password expiry. The administrator then creates a user account. The administrator then configures the user as being internally authenticated. The administrator configures the following connection associated information: DUSs 500 from which the user is allowed to login from, the mode used when logging in from specific DUS 500 is set as desktop. The desktop mode data is configured for the user. Desktop mode data includes: a primary target device selected from list of known target devices, and secondary target device selected from list of known target devices. After the administrator completes these steps, a user is ready to participate in connections.

It should be noted that in alternative embodiments a user can be configured as using an external authentication service. It should be noted that although FIG. 21 describes configuration for desktop mode matrix mode can also be configured. Further, in the exemplary embodiment the database can contain up to 200 user accounts.

Figure 22:
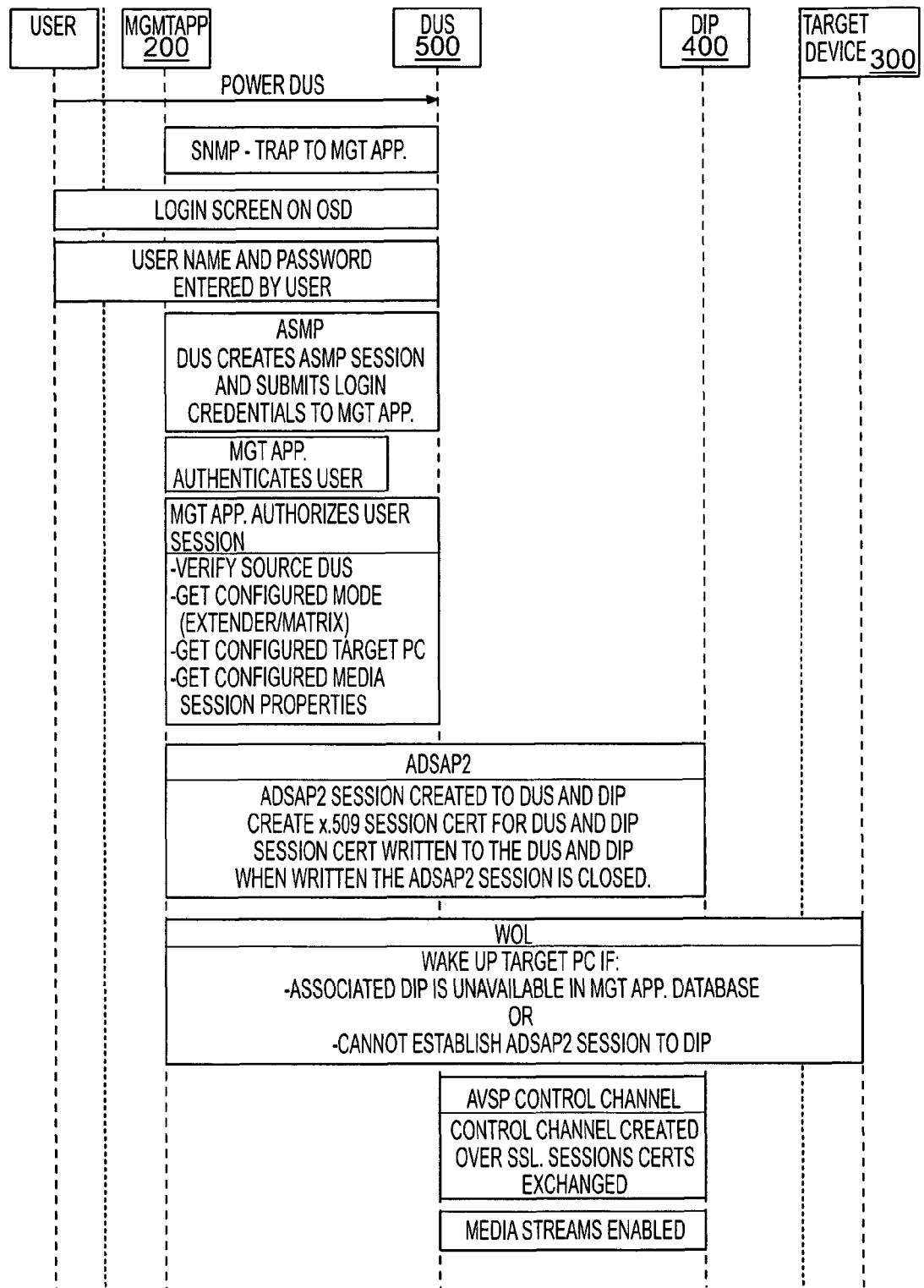
FIG. 22: an exemplary diagram illustrating login and connection establishment in desktop/matrix configuration.

The desktop mode login and associated connection is described in accordance with FIG. 22.

Prior to login it is assumed that necessary Installation/Administration steps have occurred. In addition the following description assumes that DUS 500 is powered down and DUS 500 used DHCP. As shown in FIG. 22, the DUS 500 user powers up the DUS 500. The DUS 500 displays an initializing OSD message or message sequence to inform the user of powerup progress. The DUS 500 configures its IP address using DHCP. The DUS 500 can now respond to the MgmtApp 200 SNMP polls (to determine availability). The DUS 500 sends an SNMP "cold boot" trap to the configured trap destination IP addresses (at least one being the MgmtApp 200). The DUS 500 displays OSD login screen. The DUS 500 user submits username and password. The DUS 500 establishes an ASMP session with the MgmtApp 200 and submits the username and password for authentication using the ASNP login messages. The MgmtApp 200 authenticates the username and password. The MgmtApp 200 verifies if the user is allowed login from the DUS 500. The MgmtApp 200 looks up the mode the user is configured to use for this DUS 500 (assumed desktop in this usecase). The MgmtApp 200 reads the primary target device 300 and looks up the associated DIP 400. If the DIP 400 is marked as unavailable an attempt to wake up the target device 300 using WOL protocol is attempted threes times. The MgmtApp 200 opens an ADSAP2 session with the DUS 500 and DIP 400. The MgmtApp 200 looks up the media session properties configured for the user. The MgmtApp 200 builds an X.509 Cert for the Session. One for the DUS 500 and one for the DIP 400. The cert contains amongst other items: DUS/DIP IP address, Session Retry Timeout value, Session Retry Count, Media Session Properties. The MgmtApp 200 writes the cert to the DIP 400 and DUS 500 using ADSAP2 protocol. The MgmtApp 200 closes the ADSAP2 session. The DIP 400 stores the Session Cert persistently, so that it can accommodate fast re-connection on power cycling/reset on the target device 300. The MgmtApp 200 sends an ASMP Login reply with successful status to the DUS 500. The DUS 500 on receiving the successful login response, informs the user and establishes an AVSP control channel with the DIP 400 exchanging X.509 session certs. On establishment of the AVSP control channel, the DUS 500 and DIP 400 configure their respective media transfer hardware sessions, but do not enable them yet. The DUS 500 starts a fast keepalive request on the channel. The DIP 400 on receiving the keepalive from the DUS 500 enables its media streams. The DUS 500 on receiving the initial keepalive reply enables its media streams. The media session is now established.

It should be noted that DUS 500 may have been powered up already and have been used for previous connections. In this case, to establish a connection the DUS 500 user brings up the DUS 500 OSD and logins from there. If DUS 500 is configured for Auto login access, then the login OSD is not displayed, the configured autologin username and password is submitted by the DUS 500 to the MgmtApp. 200.

If there was an error the MgmtApp 200 returns a login response indicating the error to the DUS 500. The DUS 500 displays the appropriate message to the user. In the event of a connection failure, the DUS 500 will attempt to re-establish the AVSP control channel with the DIP 400 for the "Timeout Period" indicated in the cert. If the attempt fails it will retry the connection attempt (after a back off for the same time period), the number of times it retries is indicated in the "Session Retry Count." An unavailable DIP 400, or failure to open an ADSAP2 session with the DIP 400 associated with the target device 300, the MgmtApp 200 will check if the target device 300 responds to a poll, if not it sends a WOL packet to the target device 300 and will make three attempts to wake up the target device 300, if the DIP 400 is unresponsive after three attempts the secondary target device is attempted. The DUS 500 is informed of progress with an ASMP login reply (indicating status and that login is still in progress). AVSP keepalive are sent by the DUS 500 every 500 ms.

Figure 23:
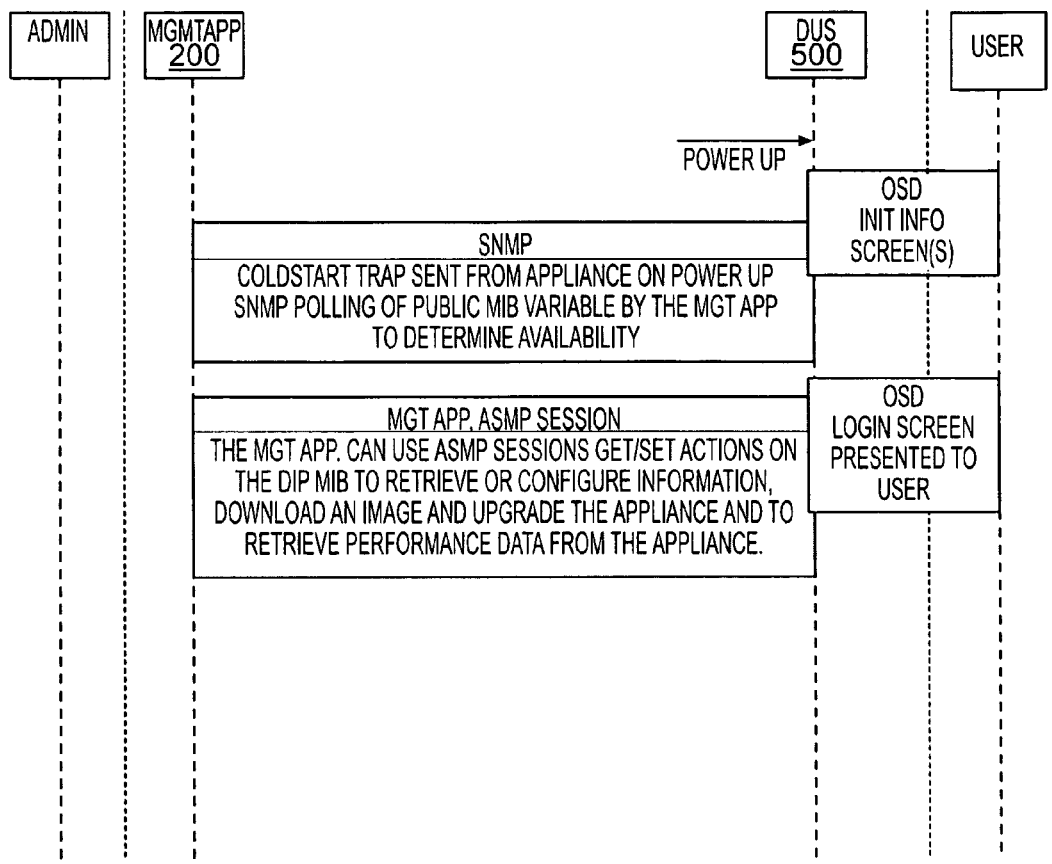
FIG. 23: an exemplary diagram illustrating power-up of a DUS (login) in desktop/matrix configuration.

The procedures involved with power up of a DUS 500 are illustrated in FIG. 23. In FIG. 23, it is assumed that DUS 500 has been installed and commissioned as previously described. It is also assumed that the DUS 500 has been configured for desktop mode with login access and the DUS 500 uses the default DHCP IP addressing mode.

As shown in FIG. 23, the process begins by a DUS 500 user powering up the DUS 500. The DUS 500 displays an initializing OSD message sequence to inform the user of powerup progress. The DUS 500 initialization completes and searches for an IP address through DHCP. The DUS 500 configures its IP address data. The DUS 500 can now respond to MgmtApp 200 SNMP polls (to determine availability). The DUS 500 sends an SNMP "cold boot" trap to the configured trap destination IP addresses (at least one being the MgmtApp 200). The MgmtApp 200 can update its availability status for the DUS 500. The DUS 500 displays the OSD login screen. The DUS 500 may receive and respond to ASMP requests to configure or retrieve data. The DUS 500 is ready to initiate login and subsequent connection establishment. It should be noted that if DUS 500 is configured for autologin, then the login OSD is not displayed.

Figure 24:
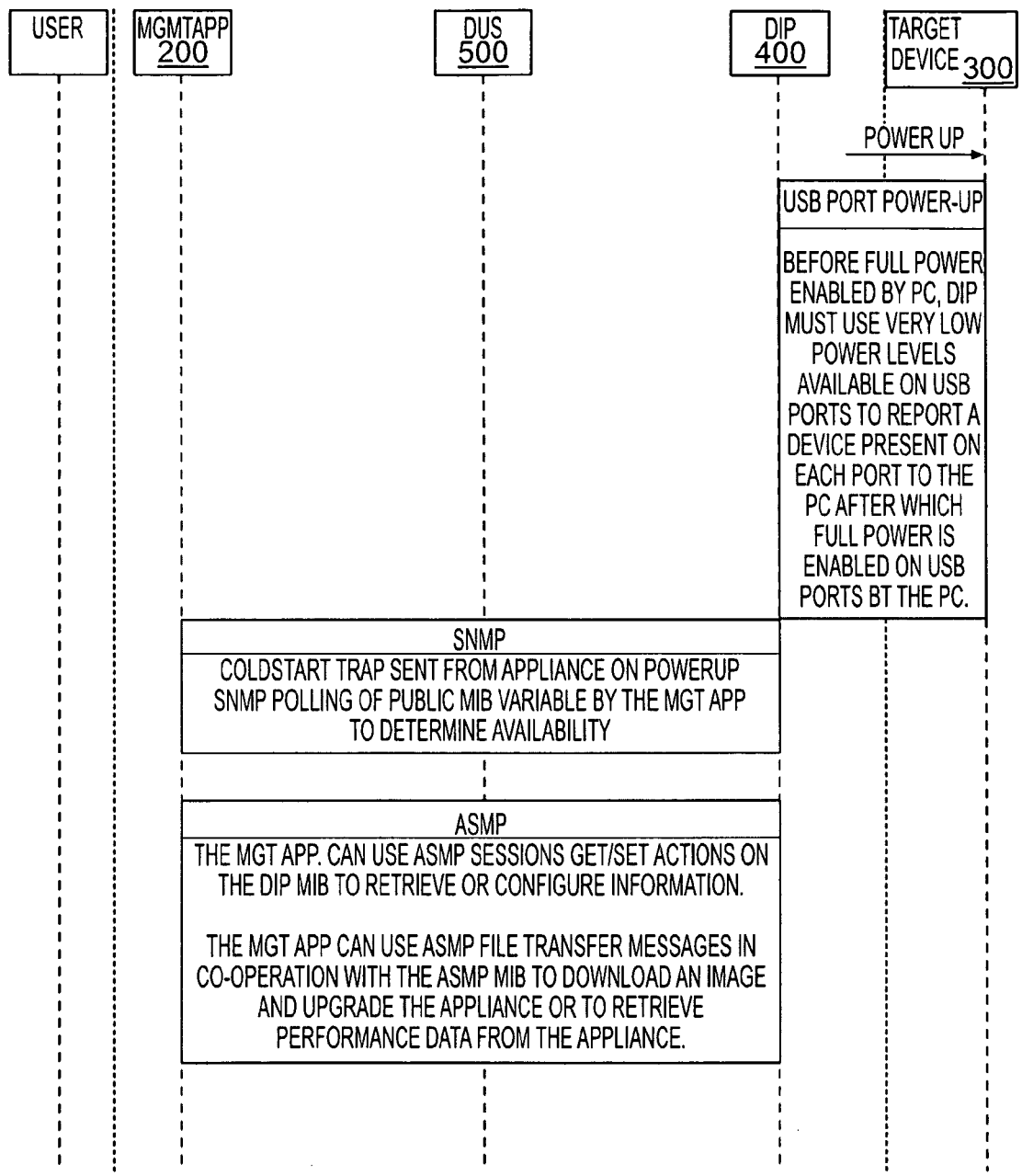
FIG. 24: an exemplary diagram illustrating power-up of a DIP in desktop/matrix configuration.

The behavior on power up of the DIP 400 is described in accordance with FIG. 24. In FIG. 24, it is assumes that the DIP 400 has been installed and commissioned as described previously described. The DIP 400 is a slave device and has no awareness to the configuration it is operating in (e.g. extender or desktop/matrix). The DIP 400 uses the default DHCP IP addressing mode.

As shown in FIG. 24 the process begins by target device 300 being powered up. The DIP 400 powers up as soon as it has obtained power from the target device 300 via its USB ports. The DIP 400 initialization completes and searches for an IP address through DHCP. The DIP 400 configures its IP address data. The DIP 400 can now respond to MgntApp 200 SNMP polls (to determine availability). The DIP 400 sends an SNMP "cold boot" trap to the configured trap destination IP addresses (at least one being the MgmtApp 200). The MgmtApp 200 updates its availability status for the DIP 400. The DIP 400 may receive and respond to ASMP requests to configure or retrieve data. The DIP 400 is ready to accept connection requests.

It should be noted that the DIP 400 must be able to powerup and be in a state to let the target device 300 know that a keyboard is present before the target device 300 determines that it cannot see a keyboard. Further it should be noted that the DIP 400 may need to have an independent power supply as it may draw too much current to be supplied through two USB port connections.

The system needs to be able to accommodate the possibility of a target device 300 being reset, requiring rapid connection re-establishment or the possibility of the DIP 400 being replaced. The following description describes what happens when a target device 300 is power cycled when a DUS 500 and DIP 400 are connected a desktop or extender configuration.

The target device 300 is powered down (or reset), resulting in abrupt power down of the DIP 400. The DUS 500 stops receiving AVSP keepalive replies (every 500 ms). After missing three consecutive replies the DUS 500 declares the connection with the DIP 400 broken. The DUS 500 resets its open SSL/TCPIP associations with the DIP 400 (media streams and AVSP control session), and displays a message indicating that the connection is broken with the DIP 400. If the session cert "Session retry Count" is non zero, the DUS 500 will backoff for a time indicated by the Session Cert "Session retry timeout" value and then attempts to re-establish the AVSP control session with the DIP 400. The DUS 500 will keep retrying the establishment of the AVSP control session for the "Session Retry Timeout" period, after which it will terminate the retry attempt. On terminating each retry attempt the DUS 500 sends an SNMP trap informing of the failed connection attempt. The DUS 500, after waiting for a period equal to the "session retry timeout" commences retrying the establishment of a connection with the DIP 400. The cycle repeats until the "Session Retry Count" have been reached or the AVSP control session has been established. When the AVSP control session has been established, the connection setup completes as described in the DUS login/connection usecase after the AVSP session is established.

It should be noted the if a DIP 400 had been replaced, the SSL authentication with the DIP 400 would fail and any attempt to re-establish the connection by the DUS 500 terminates and a message is displayed to inform the DUS 500 user. An SNMP trap is sent to the MgmtApp 200 informing it of the connection termination.

On restart of target device 300 and subsequent DIP 400 powerup the time it takes to re-establish a connection on the DUS 500 and DIP 400 should be fast enough to enable a DUS 500 user to access the target device BIOS.

The following description describes system behavior when a DUS 500 is power cycled when a connection is established. The DUS 500 is powered down, resulting in abrupt power down of the DUS 500. The DIP 400 stops receiving AVSP keep alive requests (every 500 ms). After missing three consecutive requests the DIP 400 declares the connection with the DUS 500 broken. The DIP 400 resets its open SSL/TCPIP associations with the DUS 500 (media streams and AVSP control session). The DIP 400 sends an SNMP trap to the configured trap destination addresses (at least one being the MgmtApp 200) indicating that the connection has terminated abruptly. The DIP 400 is now ready to accept another AVSP control session establishment request (re-establish the connection again).

The following description describes the behavior of DUS 500 and DIP 400 in the event of a cable or network failure when a connection exists. For this description, it is assumed that the network or cable fault breaks communication in both directions.

A network or cable fault occurs. The DUS 500 misses keepalive responses. After missing three consecutive responses, it will clear the open association with the DIP 400, and commences retrying the establishment of the AVSP control session. The DIP 400 misses keepalive requests, after missing three consecutive requests the DIP 400 will clear open associations so it can facilitate the re-establishment of the connection with the DUS 500. On resumption of the network/cable connectivity the DUS 500 will re-establish the AVSP control channel with the DIP 400 provided the network/cable fault was repaired before the DUS 500 "session retry" count was reached.

It should be noted that a network fault that has been recovered before the DUS 500 detects three consecutive missing keepalive replies (approx 1.5 seconds) will be tolerated without any interruption, other then any network level TCPIP retries that may occur. A network or cable failure that results in the DUS 500 having exhausted its session retry count will result in DUS 500 terminating the connection attempts. The DUS 500 will inform the DUS 500 user by displaying a message and send an SNMP trap to inform the MgmtApp 200. Similarly, the DIP 400 will have closed its open associations with the DUS 500 and informed the MgmtApp 200 of a failed connection. A network/cable fault break in communication in the DUS 500 to DIP 400 direction will cause the DIP 400 to behave as indicated in the DUS 500 power-down use case. A network/cable fault break in communication in the DIP 400 to DUS 500 direction will cause the DUS 500 to behave as indicated in the DIP 400 power-down usecase.

Figure 25:
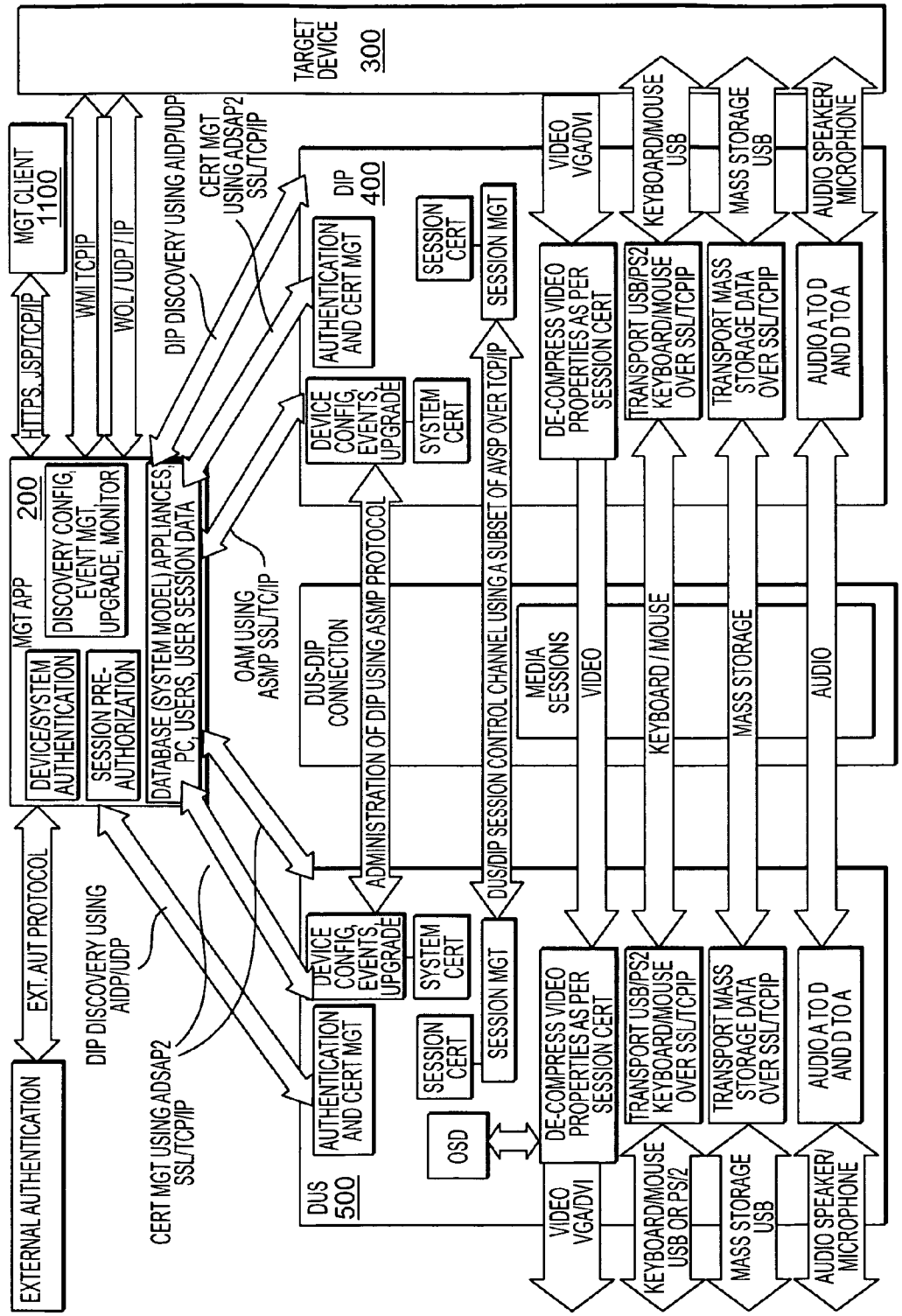
FIG. 25: an exemplary functional model of desktop and matrix configuration.

FIG. 25 is an exemplary functional model of desktop/matrix configuration. FIG. 25 summarizes operation of DUS 500 and DIP 400 in desktop/matrix configuration as previously described.

Figure 26:
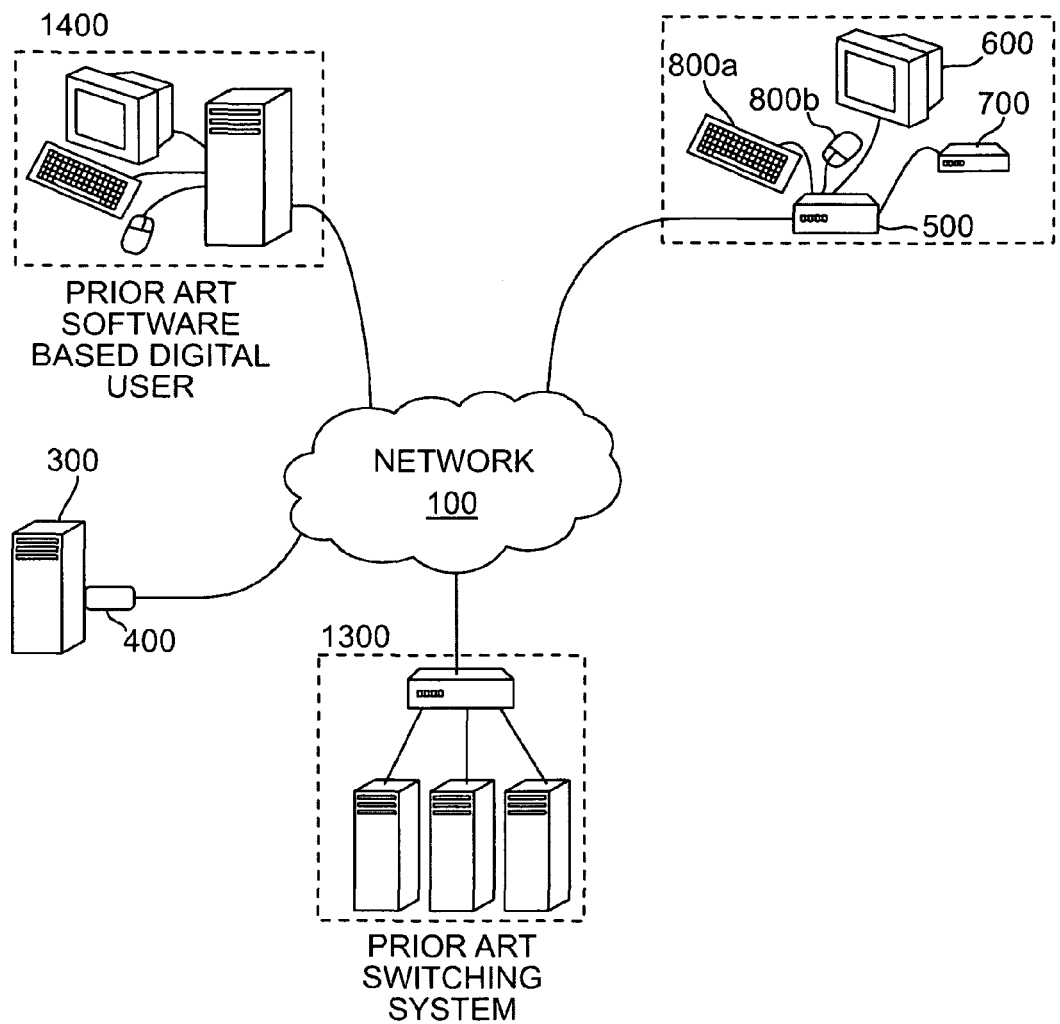
FIG. 26: an exemplary diagram illustrating interoperability of DUS and DIP with prior art KVM system.

FIG. 26 is a diagram illustrating the interoperability between prior art KVM switching products and DUS 500 and DIP 400. An example of prior art KVM switching products are Avocent DSR products. These products are described in submitted document entitled "DSR Switch Installer/User Guide" published by Avocent Corporation in 2005, Document No. 590-419-501B, which is incorporated by reference in its entirety. In this system, software allows digital user 1400 to access the switching system 1300 over network 100. The communication protocols used for DUS 500 and DIP 500 are different from those used the prior art system. However, a digital user 1400 will be able to access a DIP 400 by modifying software on the digital user station or by inserting a proxy server (not shown) between digital user 1400 and DIP 400. Likewise DUS 500 will be able to access the switching system 1300 by modifying the software installed on the switch in the switching system 1300 or by inserting a proxy server (not shown) between DUS 500 and switching system 1300. Further, DUS 500 and DIP 400 will be able to access any prior KVM system when a prior art communication protocol is able to be converted into a format acceptable to DUS 500 and DIP 400. For switch products with "local port" switching access DIP 400 can be modified to support seamless operation. This seamless operation allows a DIP 400 to "present" as a list of devices rather than a single device—thus a user can select which device to connect to and the DIP 400 plays out the local switch operation for the attached KVM switch. It should be noted that DUS 500 and DIP 400 can be coexist on a network 100 with prior art switching systems with out interference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A virtualized desktop system for communicating information between a target server of a plurality of target servers to a selected workstation of a plurality of workstations over a network, comprising:
corresponding digitizing interface pods (DIP) for corresponding ones of each of the plurality of target servers, each DIP connected between a corresponding one of the plurality of target servers and said network, each DIP including:
DIP network communications hardware including a DIP network engine communicating directly to the network, a DIP management port communicating with the DIP network engine, and a DIP encryption engine communicating with the DIP network engine;
DIP media processing hardware including DIP audio, DIP video, DIP mass storage, and DIP keyboard/mouse engines, each communicating with the DIP encryption engine of the DIP network communications hardware to access the network via the network engine; and
DIP target device hardware including a DIP video receiver communicating with the DIP video engine, a DIP audio codec communicating with the DIP audio engine, and a DIP USB controller communicating with the DIP keyboard/mouse engine and the DIP mass storage engine to access the network via the encryption engine and the network engine; and
corresponding digital user stations (DUS) for corresponding ones of each of the plurality of workstations, each DUS connected to said network and configured to be coupled to peripherals corresponding to peripheral ports of the workstation, including:
DUS network communications hardware including a DUS network engine communicating directly to the network, a DUS management port communicating with the DUS network engine, and a DUS encryption engine communicating with the DUS network engine;
DUS media processing hardware including DUS audio, DUS video, DUS mass storage, and DUS keyboard/mouse engines, each communicating with the DUS encryption engine of the DUS network communications hardware; and
DUS target device hardware including a DUS video receiver communicating with the DUS video engine, a DUS audio codec communicating with the DUS audio engine, a DUS USB controller communicating with the DUS mass storage engine, and a DUS PS/2 interface communicating with the DUS keyboard/mouse engine.

2. The virtualized desktop system according to claim 1, wherein the DUS video receiver includes a DUS digital video receiver and a DUS analog video receiver each communicating with the DUS video engine.

3. The virtualized desktop system according to claim 1, wherein the DIP USB controller has a low bandwidth USB portion communicating with the DIP keyboard/mouse engine and a high bandwidth USB portion communicating with the DIP mass storage engine.

4. A method of communicating data between a workstation to a server over a network, comprising:
connecting a digitizing interface pod (DIP) to the target server between the target server and the network, the DIP:
communicating with the network via a DIP network port according to a network protocol;
processing media information from the server including audio and video information and to the server including mass storage information and keyboard/mouse information engines; and
controlling the audio information at a DIP audio codec, the video information at a DIP video receiver, and the mass storage and keyboard/mouse information at a DIP USB controller; and
connecting a digital user station (DUS) to the network and to peripherals corresponding to peripheral ports of the workstation, the DUS:
communicating with the DIP over the network via a DUS network port according to the network protocol;
processing media information to and from the DIP including audio, video, mass storage, and keyboard/mouse information; and
controlling the audio information at a DUS audio codec, the video information at a DUS video receiver, and the mass storage and keyboard/mouse information at a DUS USB controller.

5. A method according to claim 4, wherein the DIP and DUS further communicating with a management entity via their respective network ports according to a management protocol.

* * * * *